(12) United States Patent
Wakasugi et al.

(10) Patent No.: US 12,533,862 B2
(45) Date of Patent: Jan. 27, 2026

(54) METHOD OF MANUFACTURING SHOE AND SHOE

(71) Applicant: ASICS CORPORATION, Kobe (JP)

(72) Inventors: Shinsaku Wakasugi, Kobe (JP); Satoru Abe, Kobe (JP); Genki Hatano, Kobe (JP); Norihiko Taniguchi, Kobe (JP); Shingo Takashima, Kobe (JP); Yuya Kozuka, Kobe (JP); Yousuke Atarashi, Kobe (JP); Masanori Sakaguchi, Kobe (JP); Kenta Takahama, Kobe (JP)

(73) Assignee: ASICS CORPORATION, Kobe (JP)

( * ) Notice: Subject to any disclaimer, the term of this patent is extended or adjusted under 35 U.S.C. 154(b) by 84 days.

(21) Appl. No.: 17/675,672

(22) Filed: Feb. 18, 2022

(65) Prior Publication Data

US 2022/0266561 A1 Aug. 25, 2022

(30) Foreign Application Priority Data

Feb. 19, 2021 (JP) .................................. 2021-025353

(51) Int. Cl.
| | |
|---|---|
| *B29D 35/10* | (2010.01) |
| *A43B 7/18* | (2006.01) |
| *A43B 13/14* | (2006.01) |
| *A43B 23/02* | (2006.01) |

(52) U.S. Cl.
CPC ................ *B29D 35/10* (2013.01); *A43B 7/18* (2013.01); *A43B 13/143* (2013.01); *A43B 23/0245* (2013.01)

(58) Field of Classification Search
CPC .......... A43B 1/04; A43B 13/14; A43B 13/122

USPC .................................. 12/145, 146 C, 142 R
See application file for complete search history.

(56) References Cited

U.S. PATENT DOCUMENTS

| | | | | |
|---|---|---|---|---|
| 3,525,110 | A | * | 8/1970 | Rubico .................. A43D 3/022 |
| | | | | 12/145 |
| 4,266,314 | A | * | 5/1981 | Londner epouse Ours ................. |
| | | | | A43B 3/0084 |
| | | | | 12/142 P |
| 10,241,498 | B1 | | 3/2019 | Beard et al. |
| 11,540,596 | B2 | * | 1/2023 | Bruce ...................... A43D 3/02 |

(Continued)

FOREIGN PATENT DOCUMENTS

WO 2019/234374 A1 12/2019

OTHER PUBLICATIONS

The extended European search report issued by the European Patent Office on Jun. 30, 2022, which corresponds to European Patent Application No. 22156864.5-1015 and is related to U.S. Appl. No. 17/675,672.

*Primary Examiner* — Alissa L Hoey
*Assistant Examiner* — Akwokwo Olabisi Redhead
(74) *Attorney, Agent, or Firm* — Studebaker Brackett PLLC

(57) ABSTRACT

A method of manufacturing a shoe includes preparing a flexible shell having an internal space, preparing an upper body in a form of a bag, the upper body being provided with an opening in a portion corresponding to a topline, preparing a sole body, accommodating the upper in the shell, partially fixing the shell and the upper body, and forming the upper body with a last being located in the upper body accommodated in the shell, taking the last out of the formed upper body, and inserting the sole body in the shell.

12 Claims, 49 Drawing Sheets

(56) References Cited

U.S. PATENT DOCUMENTS

| | | | |
|---|---|---|---|
| 2016/0113356 A1* | 4/2016 | Clough | A41B 11/00 36/71.5 |
| 2016/0166010 A1* | 6/2016 | Bruce | D04C 3/48 12/145 |
| 2016/0206039 A1 | 7/2016 | Cross et al. | |
| 2017/0042280 A1* | 2/2017 | Bacino | A43B 23/026 |
| 2017/0068774 A1* | 3/2017 | Cluckers | A61B 5/112 |
| 2017/0325546 A1* | 11/2017 | Becker | B29C 51/28 |
| 2019/0343216 A1* | 11/2019 | Huffa | A43B 1/04 |
| 2021/0037913 A1* | 2/2021 | Bessho | A43B 1/04 |
| 2021/0145128 A1* | 5/2021 | Bruce | A43D 3/022 |
| 2021/0219659 A1 | 7/2021 | Ventenat | |
| 2023/0130760 A1* | 4/2023 | Frazier | D06M 15/70 36/30 A |

\* cited by examiner

METHOD OF MANUFACTURING SHOE AND SHOE

This nonprovisional application is based on Japanese Patent Application No. 2021-025353 filed with the Japan Patent Office on Feb. 19, 2021, the entire contents of which are hereby incorporated by reference.

BACKGROUND OF THE INVENTION

Field of the Invention

The present invention relates to a method of manufacturing a shoe and a shoe, and more particularly to a shoe comprising a sole body and a shell accommodating the sole body and a method of manufacturing the same.

Description of the Background Art

U.S. Pat. No. 10,241,498 discloses a shoe comprising a sole body, an upper body, and a shell in which the sole body and the upper body are accommodated, as shown in FIGS. 6E and 6F.

SUMMARY OF THE INVENTION

Normally, a sole body is less likely to significantly lose its shape, although it is excellent in cushioning property. Therefore, even when the sole body is accommodated in a shell as in the shoe disclosed in the literature, the sole body is basically not significantly displaced in position.

When an upper body is made from a flexible member for better fit and the upper body is accommodated in a shell without being fixed, however, the upper body may significantly be displaced in position. Such significant position displacement of the upper body may result not only in poorer fit but also in impairment of the function itself as the shoe.

In a general shoe composed of an upper and a sole and not provided with a shell, the upper and the sole are often fixed to each other in their entirety with an adhesive. Therefore, in accommodating the upper body in the shell as in the shoe disclosed in the literature as well, the upper body and the sole body may be fixed to each other in their entirety with an adhesive or the upper body and the shell are fixed to each other in their entirety with an adhesive. Such a construction, however, leads not only to a longer tact time required for manufacturing but also to a significantly more complicated manufacturing process.

Therefore, in the shoe in which the sole body and the upper body are accommodated in the shell as disclosed in the literature, in particular, how to fix the upper body and the shell to each other becomes an issue.

In addition, in the shoe in which the sole body and the upper body are accommodated in the shell as disclosed in the literature, how to ensure fit to a foot of a wearer is an important issue.

Therefore, the present invention has been made in order to address the above issues, and an object thereof is to enhance fit of a shoe in which a sole body and an upper body are accommodated in a shell while preventing poor fit and impairment of a function as the shoe due to position displacement of the upper body from the shell and to allow easy manufacturing of such a shoe in a short period of time.

A method of manufacturing a shoe according to a first aspect of the present invention includes preparing a flexible shell having an internal space, preparing an upper body in a form of a bag, the upper body being provided with an opening in a portion corresponding to a topline, preparing a sole body, accommodating the upper body in the shell, partially fixing the shell and the upper body, and forming the upper body with a last being located in the upper body accommodated in the shell, taking the last out of the formed upper body, and inserting the sole body in the shell.

A method of manufacturing a shoe according to a second aspect of the present invention includes preparing a flexible shell having an internal space, preparing an upper body in a form of a bag, the upper body being provided with an opening in a portion corresponding to a topline, preparing a sole body, forming the upper body with a last being located in the upper body, taking the last out of the formed upper body, accommodating the formed upper body in the shell and partially fixing the shell and the formed upper body, and inserting the sole body in the shell.

A shoe according to the present invention comprises a shell, an upper body, and a sole body. The shell is formed of a flexible member having an internal space to receive a foot of a wearer. The upper body is in a form of a bag, accommodated in the shell, and provided with an opening in a portion corresponding to a topline through which the foot of the wearer is inserted. The sole body is accommodated in the shell and supports the sole of the foot of the wearer. The shell includes a bottom wall portion and a peripheral wall portion erected from a peripheral edge of the bottom wall portion. In the shoe according to the present invention, the bottom wall portion and a portion of the peripheral wall portion adjacent to the bottom wall portion define a lower space of the internal space in which the sole body is disposed, and a portion of the peripheral wall portion located above the portion adjacent to the bottom wall portion defines at least a portion of an upper space of the internal space in which the foot of the wearer is inserted. In the shoe according to the present invention, the shell and the upper body are partially fixed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
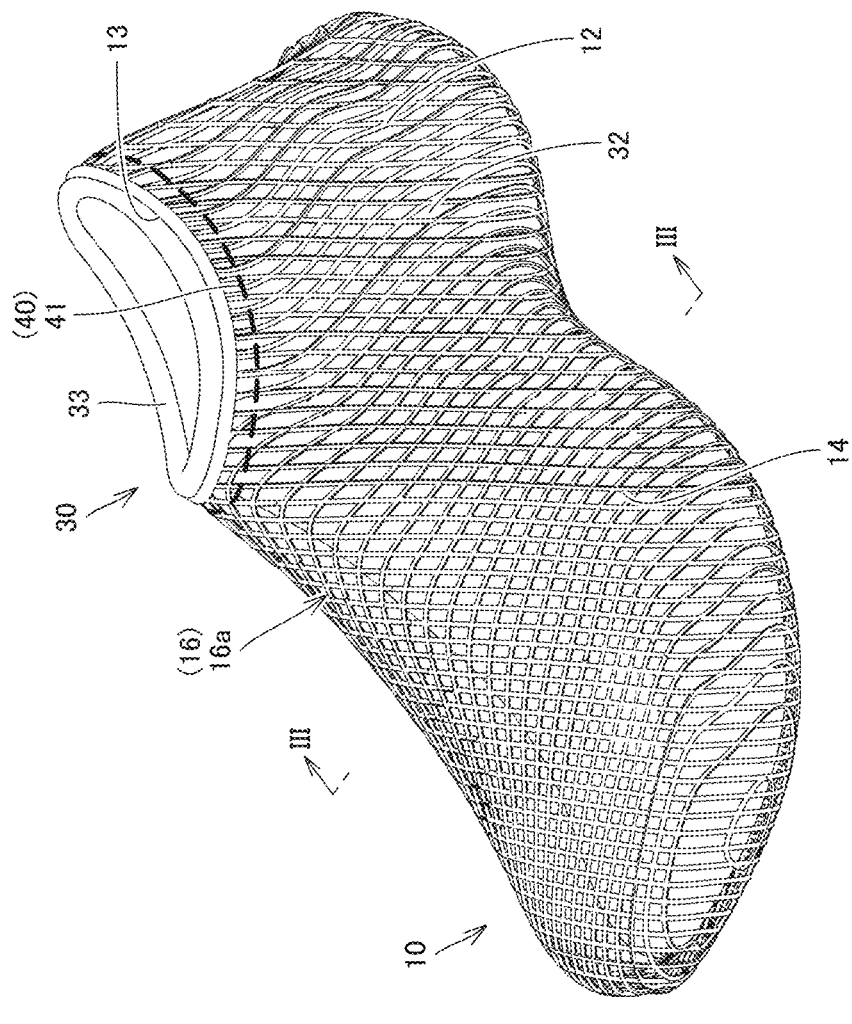
FIG. 1 is a perspective view of a shoe according to a first embodiment.

An embodiment of the present invention will be described in detail below with reference to the drawings. In embodiments shown below, identical elements or elements in common have the same reference characters allotted in the drawings and description thereof will not be repeated.

First Embodiment

Figure 2:
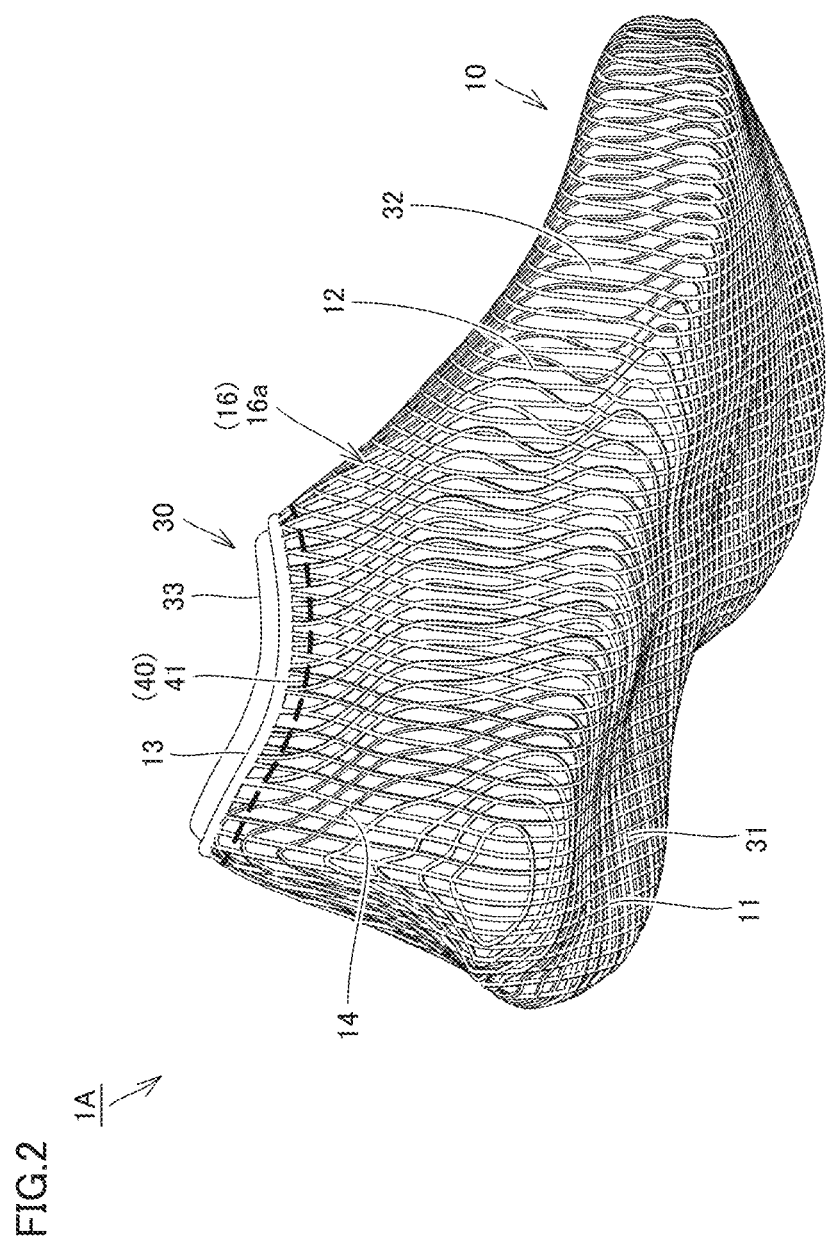
FIG. 2 is a perspective view of the shoe shown in FIG. 1, as seen in a different direction.
Figure 3:
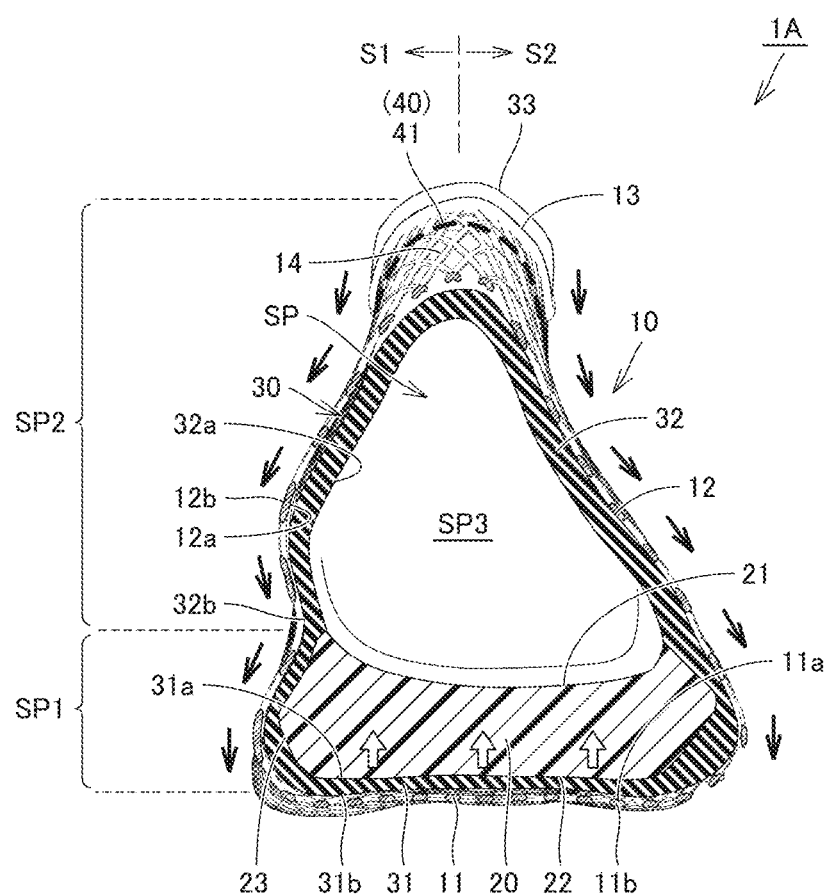
FIG. 3 is a cross-sectional view of the shoe shown in FIG. 1.
Figure 4:
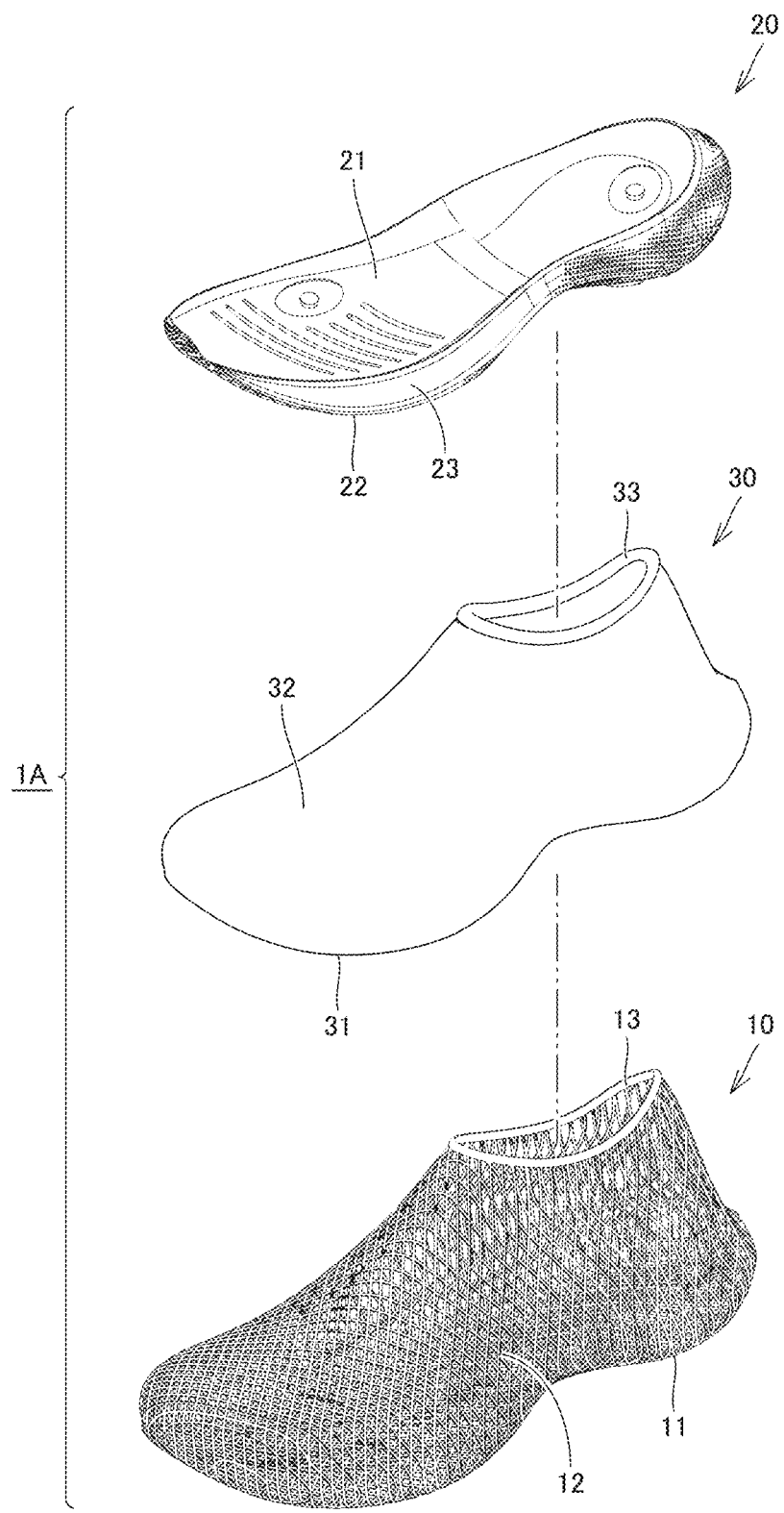
FIG. 4 is an exploded perspective view for illustrating a structure for assembling the shoe shown in FIG. 1.

FIG. 1 is a perspective view of a shoe according to a first embodiment and FIG. 2 is a perspective view of the shoe shown in FIG. 1, as seen in a different direction. FIG. 3 is a cross-sectional view along a line III-III indicated in FIG. 1 and FIG. 4 is an exploded perspective view for illustrating a structure for assembling the shoe shown in FIG. 1. Initially, a construction of a shoe 1A according to the present embodiment will be described with reference to FIGS. 1 to 4.

As shown in FIGS. 1 to 4, the shoe 1A according to the present embodiment is in the form of a sock substantially entirely covering a foot of a wearer (that is, a portion on the side of the distal end as seen at an ankle) and comprises a shell 10, a sole body 20, and an upper body 30. An upper portion of the shoe 1A is provided with a topline 33 through which the foot is inserted, and an internal space SP (see FIG.

3) into which the foot of the wearer is inserted when the shoe 1A is worn is formed inside the shoe 1A.

Prior to describing a specific construction of the shoe 1A, the names of parts of the shoe 1A will be described with reference to FIG. 5 described hereinafter. Although the FIG. 5 plan view only shows the shell 10 for convenience of illustration, similar names are used also when the shoe 1A is viewed as a whole.

Figure 5:
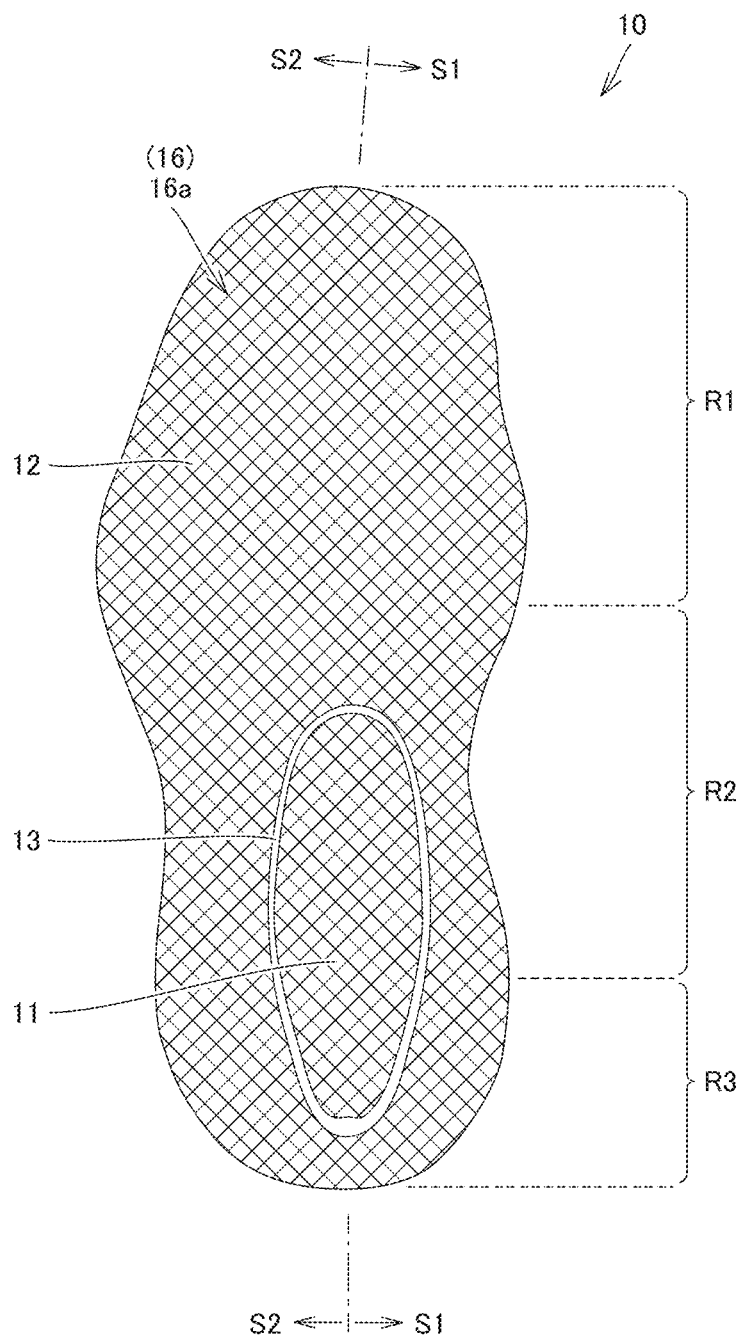
FIG. 5 is a schematic plan view of a shell shown in FIG. 1.

As shown in FIG. 5, in a lateral direction (a generally lateral direction in FIG. 5) that is a direction matching the direction of the width of the foot of the wearer in plan view, the shoe 1A is divided into a portion on a medial foot side representing a medial side of the foot in anatomical position (that is, a side closer to the median) (i.e., a portion on a side S1 in FIG. 5) and a portion on a lateral foot side representing a lateral side of the foot in anatomical position (that is, a side farther from the median) (i.e., a portion on a side S2 in FIG. 5).

Further, in a longitudinal direction (a generally vertical direction in FIG. 5) that is a direction matching the direction of the length of the foot of the wearer in plan view, the shoe 1A is divided into a forefoot portion R1 located to correspond to the toes and ball of the foot of the wearer, a midfoot portion R2 located to correspond to the arch of the foot of the wearer, and a rearfoot portion R3 located to correspond the heel of the foot of the wearer.

Herein, with reference to the front end of the shoe 1A, when a position corresponding to a dimension of 40% of a dimension of the shoe 1A in the longitudinal direction of the shoe 1A from the front end is defined as a first boundary position, and a position corresponding to a dimension of 80% of the dimension of the shoe 1A in the longitudinal direction of the shoe 1A from the front end is defined as a second boundary position, the forefoot portion R1 corresponds to a portion included between the front end and the first boundary position in the longitudinal direction, the midfoot portion R2 corresponds to a portion included between the first boundary position and the second boundary position in the longitudinal direction, and the rearfoot portion R3 corresponds to a portion included between the second boundary position and the rear end of the shoe 1A in the longitudinal direction.

As shown in FIGS. 1 to 4, for the shoe 1A according to the present embodiment, the sole body 20 is accommodated in the upper body 30, and the upper body 30 with the sole body 20 accommodated therein is further accommodated in the shell 10. The shell 10, the sole body 20, and the upper body 30 are all located across the forefoot portion R1, the midfoot portion R2, and the rearfoot portion R3.

More specifically, the shell 10 constitutes an outermost shell of the shoe 1A, and is formed of a single flexible member in the form of a bag. The shell 10 includes a bottom wall portion 11 and a peripheral wall portion 12 erected to extend continuously upward from a peripheral edge of the bottom wall portion 11, and the bottom wall portion 11 defines an outermost surface of the shoe 1A located on a lower side of the shoe 1A in the vertical direction and the peripheral wall portion 12 defines an outermost surface of the shoe 1A located in the longitudinal direction and the lateral direction.

The bottom wall portion 11 has an inner surface 11a and an outer surface 11b serving as a pair of main surfaces, and the peripheral wall portion 12 has an inner surface 12a and an outer surface 12b serving as a pair of main surfaces. The shell 10 has the bottom wall portion 11 and the peripheral wall portion 12 composed of a meshy member 16a serving as a base structure portion 16, and accordingly, these portions of the shell 10 have numerous holes 14 formed to reach the inner surfaces 11a and 12a and the outer surfaces 11b and 12b. Details of the base structure portion 16 will be described hereinafter.

An insertion portion 13 in the form of an opening is provided at an upper end of the peripheral wall portion 12. The insertion portion 13 is provided across the midfoot portion R2 and the rearfoot portion R3.

As shown in FIG. 3, an internal space SP is formed in the shell 10. The internal space SP is defined by the inner surface 11a of the bottom wall portion 11 and the inner surface 12a of the peripheral wall portion 12, and communicates with the insertion portion 13 described above. The internal space SP is located across the forefoot portion R1, the midfoot portion R2, and the rearfoot portion R3. The internal space SP includes a space in which the sole body 20 and the upper body 30 are disposed as they are accommodated therein, and an insertion space SP3 that is a space in which a foot of the wearer is inserted.

As shown in FIGS. 1 to 4, the upper body 30 forms a part of a portion of the shoe 1A that comes into contact with the foot of the wearer to hold the foot of the wearer, and is composed of a flexibly deformable bag-shaped member. The upper body 30 is accommodated in the internal space SP of the shell 10. The upper body 30 includes a bottom portion 31 and a wall portion 32 erected to extend continuously upward from a peripheral edge of the bottom portion 31.

The bottom portion 31 has an inner surface 31a and an outer surface 31b serving as a pair of main surfaces, and the wall portion 32 has an inner surface 32a and an outer surface 32b serving as a pair of main surfaces. The outer surface 31b of the bottom portion 31 of the upper body 30 faces the inner surface 11a of the bottom wall portion 11 of the shell 10, and the outer surface 32b of the wall portion 32 of the upper body 30 faces the inner surface 12a of the peripheral wall portion 12 of the shell 10. Thus, the bottom portion 31 covers the inner surface 11a of the bottom wall portion 11 of the shell 10, and the wall portion 32 covers the inner surface 12a of the peripheral wall portion 12 of the shell 10.

In addition, the above-described topline 33 is provided at an upper end of the wall portion 32. The topline 33 is provided across the midfoot portion R2 and the rearfoot portion R3.

The sole body 20 forms a part of a portion of the shoe 1A that comes into contact with the foot of the wearer to support the sole of the foot of the wearer, and is composed of an elastically deformable flat member. The sole body 20 is accommodated in the internal space SP of the shell 10, and further accommodated in the upper body 30.

The sole body 20 has an upper surface 21 and a lower surface 22 serving as a pair of main surfaces, and a side surface 23 interconnecting the upper surface 21 and the lower surface 22. The lower surface 22 of the sole body 20 faces the inner surface 31a of the bottom portion 31 of the upper body 30, and the side surface 23 of the sole body 20 faces a portion of the inner surface 32a of the wall portion 32 of the upper body 30 closer to a lower end. Thus, the sole body 20 covers the inner surface 31a of the bottom portion 31 of the upper body 30 and the portion of the inner surface 32a of the wall portion 32 of the upper body 30 closer to the lower end.

As shown in FIG. 3, the above-described internal space SP of the shell 10 is divided into a lower space SP1 and an upper space SP2. The lower space SP1 is located at a lower portion of the shoe 1A in the vertical direction, and the upper space SP2 is located at an upper portion of the shoe 1A in the vertical direction.

The lower space SP1 is a space defined by the bottom wall portion 11 and a portion of the peripheral wall portion 12 adjacent to the bottom wall portion 11 (hereinafter, this portion of the peripheral wall portion 12 will be referred to as a "first portion"), and the entirety of the sole body 20 and a lower portion of the upper body 30 (that is, the bottom portion 31 and a portion of the wall portion 32 adjacent to the bottom portion 31) are disposed in the lower space SP1.

The upper space SP2 is a space defined by a portion of the peripheral wall portion 12 located above the first portion (hereinafter, this portion of the peripheral wall portion 12 will be referred to as a "second portion"), and an upper portion of the upper body 30 (that is, a portion of the wall portion 32 located above the portion of the wall portion 32 adjacent to the bottom portion 31) is disposed in the upper space SP2.

As described above, since the upper body 30 is accommodated in the internal space SP so as to cover the inner surfaces 11a and 12a of the shell 10, and the sole body 20 is accommodated in the internal space SP so as to cover the inner surface 31a of the bottom portion 31 of the upper body 30 and the portion of the inner surface 32a of the wall portion 32 of the upper body 30 closer to the lower end, the insertion space SP3 defined by the sole body 20 and the upper body 30 will be formed in the internal space SP of the shell 10.

As described above, the insertion space SP3 is a space in which the foot of the wearer is inserted when the shoe is worn, and more specifically, it is defined by the upper surface 21 of the sole body 20 and a portion of the inner surface 32a of the wall portion 32 of the upper body 30 uncovered with the sole body 20 (that is, the inner surface 32a of the wall portion 32 at a location corresponding to the second portion of the peripheral wall portion 12 of the shell 10 described above). The insertion space SP3 is included in the upper space SP2 of the internal space SP described above.

In the shoe 1A according to the present embodiment, the upper body 30 has a shape that entirely covers a portion of the foot of the wearer on the side of the distal end as seen at an ankle of the wearer, and a portion of the shell 10 that forms the upper space SP2, at a portion other than that corresponding to the topline 33 through which the foot of the wearer is inserted, entirely covers a portion of the foot of the wearer excluding the sole of the foot of the wearer.

Therefore, when a user wears the shoe 1A, a portion of the foot of the wearer excluding the wearer's sole (i.e., the instep and a peripheral surface of the heel, etc.) comes into contact with the inner surface 32a of the wall portion 32 of the flexibly deformable upper body 30, and the sole of the foot of the wearer comes into contact with the upper surface 21 of the elastically deformable sole body 20. Therefore, the shell 10 does not come into direct contact with the foot of the wearer, thereby ensuring that the user wears the shoe comfortably.

It is not a requirement that the upper body 30 and the sole body 20 entirely come into contact with the foot of the wearer, and the upper body 30 and the sole body 20 may be notched away or have a portion removed to have an opening insofar as the user can wear the shoe comfortably.

For the shoe 1A according to the present embodiment, as described above, an outermost shell of the shoe 1A is composed of the shell 10, and in particular, by covering the lower surface 22 of the sole body 20 with the bottom wall portion 11 of the shell 10, an outermost surface of the shoe 1A located on a lower side in the vertical direction is defined by the bottom wall portion 11 of the shell 10. Thus, the shoe 1A has a tread composed of the outer surface 11b of the bottom wall portion 11 of the shell 10.

Accordingly, by this construction, the sole body 20 does not form a tread, which significantly increases a room for selection of material for the sole body 20, and an optimal material can be selected for the sole body 20 for functions required for a general sole in view of improved foot comfort and ensured cushioning. Performance required for the tread, such as abrasion resistance and grip, can be ensured by selecting a material for the shell 10 or in addition selecting a shape therefor.

Further, for the shoe 1A according to the present embodiment, as described above, the outermost shell of the shoe 1A is composed of the shell 10, and the shell 10 includes the bottom wall portion 11 that defines the tread, and the peripheral wall portion 12 erected from a peripheral edge of the bottom wall portion 11 and including a portion that covers the instep of a foot of the wearer. By this construction, there is also an advantage in that the shoe presents higher performance than a conventional shoe having an outermost shell composed of a sole and an upper (that is, a shoe which does not comprise such a member as the shell 10 of the shoe 1A according to the present embodiment).

That is, the above-described conventional shoe is normally constructed such that the upper including a portion covering the instep of the foot of the wearer is composed only of a woven material, a knitted material, nonwoven fabric, or the like and furthermore, the upper is bonded or the like to the sole by adhesion or the like, and accordingly, a delay is easily caused in a period of time for which a load applied to the portion of the upper that covers the instep when the wearer of the shoe kicks the ground is transmitted to the sole via a side wall of the upper, and the shoe would poorly follow the foot for running or the like, in particular.

In contrast, the shoe 1A according to the present embodiment is constructed such that the peripheral wall portion 12 of the shell 10 including a portion covering the instep of the foot of the wearer is composed of a member composed of resin or rubber as will be described hereinafter, and in addition, composed of a harder material than a woven material, a knitted material, nonwoven fabric, and the like, and furthermore, the peripheral wall portion 12 including the portion covering the instep and the bottom wall portion 11 including a portion defining the tread are integrally composed of the shell 10 composed of a single member. This allows a load applied when kicking the ground to be transmitted faster, and the shoe can thus excellently follow the foot for running, in particular. A direction in which the shell 10 transmits a load is schematically indicated in FIG. 3 by solid arrows, and a direction of a load thereby applied to the bottom wall portion 11 of the shell 10 is schematically indicated in FIG. 3 by blank arrows.

The shoe 1A according to the present embodiment is provided with a sewn portion 41 as a fixed portion 40 where the shell 10 and the upper body 30 are partially fixed. The sewn portion 41 is provided in a portion of the shell 10 adjacent to the topline 33 through which the foot of the wearer is inserted, and more specifically, it is located to surround the topline 33 in the vicinity of the upper end of the peripheral wall portion 12 of the shell 10.

The sewn portion 41 is formed such that the shell 10 and the upper body 30 layered on each other are sewn by alternate passage of thread therethrough. Thus, in the portion adjacent to the topline 33, the upper body 30 is immovably fixed to the shell 10.

According to such a construction, the upper body 30 can be fixed to the shell 10 and position displacement of the upper body 30 from the shell 10 can be prevented, without bonding the shell 10 and the upper body 30 to each other in their entirety with an adhesive. Therefore, poor fit can be suppressed and a function as the shoe can be prevented from being impaired.

When such a construction is adopted, as compared with bonding between the shell 10 and the upper body 30 in their entirety with the adhesive, a tact time required for manufacturing can significantly be reduced, and furthermore, the manufacturing process is also simplified. Therefore, the shoe free from poor fit or impairment of the function as the shoe can relatively readily be manufactured in a short period of time.

In the shoe 1A according to the present embodiment, the upper body 30 is in the form of the bag as described above. Therefore, by providing the sewn portion 41 in the portion of the shell 10 adjacent to the topline 33 through which the foot of the wearer is inserted, it is not basically necessary to fix the shell 10 and the upper body 30 in another portion or to additionally fix them in that portion further with other means. The shell 10 and the upper body 30, however, may further be sewn in a portion other than the portion above, or so long as joint is partial, the shell 10 and the upper body 30 may be joined to each other with an adhesive in the above-mentioned portion or in a portion other than that portion. Furthermore, in the above-mentioned portion or in a portion other than that, the shell 10 and the upper body 30 may be fixed to each other by other means such as welding.

While the shell 10 may basically be formed of any material that is flexible, preferably, the shell 10 has appropriate strength. From this viewpoint, the shell 10 is preferably composed of a resin material or a rubber material. More specifically, when the shell 10 is composed of resin, for example, it can be made, for example, of polyolefin resin, an ethylene-vinyl acetate copolymer (EVA), a polyamide-based thermoplastic elastomer (TPA, TPAE), thermoplastic polyurethane (TPU), or a polyester-based thermoplastic elastomer (TPEE). When the shell 10 is composed of rubber, it can be made, for example, of butadiene rubber.

The shell 10 can also be composed of a polymer composition. In that case, examples of a polymer contained in the polymer composition include olefinic polymers such as olefinic elastomers and olefinic resins. Examples of the olefinic polymer include polyolefins of polyethylene (for example, linear low density polyethylene (LLDPE), high density polyethylene (HDPE), and the like), polypropylene, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methyl-pentene copolymer, an ethylene-1-butene copolymer, a 1-butene-1-hexene copolymer, 1-butene-4-methyl-pentene, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer (EVA), and a propylene-vinyl acetate copolymer.

The polymer may be an amide-based polymer such as an amide-based elastomer or an amide-based resin. Examples of the amide-based polymer include polyamide 6, polyamide 11, polyamide 12, polyamide 66, and polyamide 610.

The polymer may be an ester-based polymer such as an ester-based elastomer or an ester-based resin. Examples of the ester-based polymer include polyethylene terephthalate and polybutylene terephthalate.

The polymer may be a urethane-based polymer such as a urethane-based elastomer or a urethane-based resin. Examples of the urethane-based polymer include polyester-based polyurethane and polyether-based polyurethane, and particularly, urethane acrylate can be suitably used.

The polymer may be a styrene-based polymer such as a styrene-based elastomer or a styrene-based resin. Examples of the styrene-based elastomer include a styrene-ethylene-butylene copolymer (SEB), a styrene-butadiene-styrene copolymer (SBS), a hydrogenated product of SBS (a styrene-ethylene-butylene-styrene copolymer (SEBS)), a styrene-isoprene-styrene copolymer (SIS), a hydrogenated product of SIS (a styrene-ethylene-propylene-styrene copolymer (SEPS)), a styrene-isobutylene-styrene copolymer (SIBS), styrene-butadiene-styrene-butadiene (SBSB), and styrene-butadiene-styrene-butadiene-styrene (SBSBS). Examples of the styrene-based resin include polystyrene, acrylonitrile styrene resin (AS), and acrylonitrile butadiene styrene resin (ABS).

Examples of the polymer may include polymethylmethacrylate or similar urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, epoxy-based methacrylic polymers, conjugated diene polymer-based methacrylic polymers and hydrogenated products thereof, a polyvinyl chloride-based resin, a silicone-based elastomer, butadiene rubber (BR), isoprene rubber (IR), chloroprene rubber (CR), natural rubber (NR), styrene-butadiene rubber (SBR), acrylonitrile-butadiene rubber (NBR), butyl rubber (IIR), and the like.

While the sole body 20 may basically be composed of any material that is elastically deformable, preferably, the sole body 20 is composed of a member having an excellent cushioning effect while having appropriate strength. From this point of view, for example, a resin foam material including a resin material as a main component and a foaming agent, a crosslinking agent and the like as a subcomponent is used as the sole body 20. Alternatively, a rubber foam material including a rubber material as a main component and a plasticizer, a foaming agent, a reinforcing agent, and a crosslinking agent as subcomponents may be used.

Particularly suitably, the sole body 20 can be composed of a foam material such as polyolefin resin, an ethylene-vinyl acetate copolymer (EVA), a polyamide-based thermoplastic elastomer (TPA, TPAE), thermoplastic polyurethane (TPU), a polyester-based thermoplastic elastomer (TPEE) and the like. The sole body 20 is not necessarily formed of a foam material, and may be formed of a non-foam material.

A heat-shrinkable member is suitably employed for the upper body 30, and in particular, a woven material, a knitted material, nonwoven fabric, or the like of heat-shrinkable synthetic fibers is employed. Examples of the heat-shrinkable synthetic fibers include those including polyester, polyurethane, or the like as a main component.

By thus employing the heat-shrinkable member for the upper body 30, the upper body 30 can better fit the foot of the wearer, which will be described later in detail.

While the shell 10 may be made in any method, it can be made, for example, by injection molding, cast molding, or additive manufacturing using a three-dimensional additive manufacturing apparatus. In particular, when the shell 10 is additively manufactured using a three-dimensional additive manufacturing apparatus, the shell 10 can have a variety of structures which are difficult to make by injection molding or cast molding.

Figure 6:
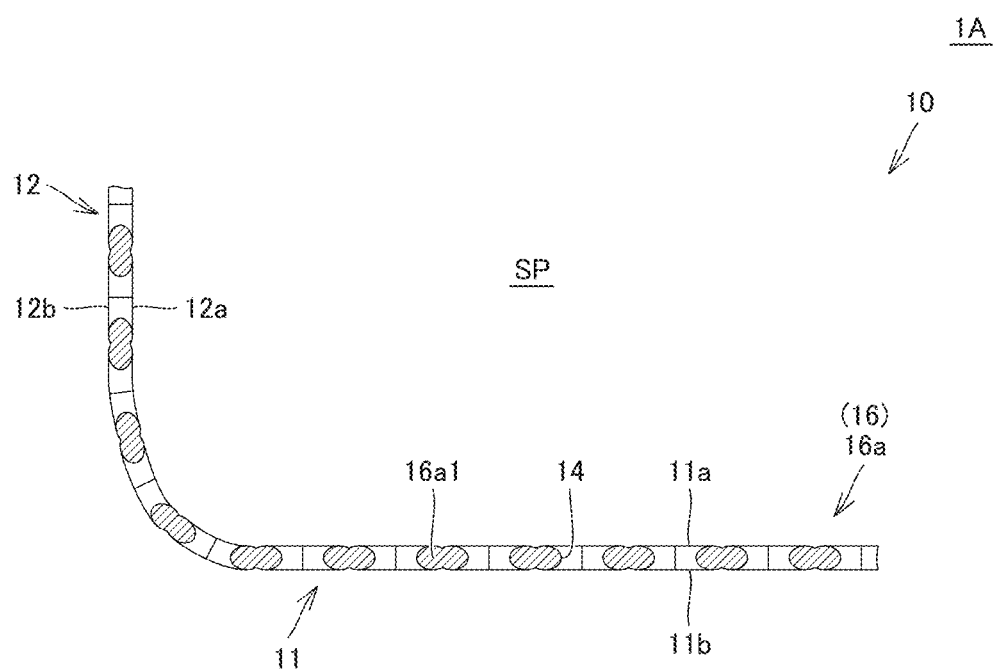
FIG. 6 is a partial cross-sectional view of the shell shown in FIG. 5.

FIG. 5 is a schematic plan view of a shell that the shoe according to the present embodiment comprises, and FIG. 6 is a partial cross-sectional view of the shell shown in FIG. 5. Hereinafter, a structure of the shell 10 that the shoe 1A according to the present embodiment comprises will be described in detail with reference to FIGS. 5 and 6 and FIGS. 1 to 4 described previously.

As shown in FIGS. 5 and 6, the shell 10 has the base structure portion 16 composed of a curved meshy member 16a. As shown in FIGS. 1 to 5, this base structure portion 16 is located throughout the bottom wall portion 11 and the peripheral wall portion 12 of the shell 10 (that is, throughout the shell 10 excluding the insertion portion 13).

Thus, the inner surface 11a and the outer surface 11b of the bottom wall portion 11 are composed of a pair of main surfaces of the base structure portion 16 composed of the meshy member 16a, and the inner surface 12a and the outer surface 12b of the peripheral wall portion 12 are also composed of a pair of main surfaces of the base structure portion 16 composed of the meshy member 16a. It is not a requirement that the meshy member 16a be entirely curved, and it may be partially uncurved.

The meshy member 16a includes a plurality of wire elements 16a1 connected so as to intersect with one another, and thereby has intersection points formed as the wire elements 16a1 intersect with one another, and a hole 14 located between adjacent wire elements 16a1. The cross section shown in FIG. 6 is a cross section including an intersection of the wire elements 16a1. For the shell 10, the plurality of wire elements 16a1 are disposed to be orthogonal to one another in the form of a lattice, and the plurality of wire elements 16a1 are each disposed to extend obliquely with respect to the longitudinal and lateral directions of the shoe 1A.

Providing the shell 10 with the numerous holes 14 thus reduces the shell 10 in weight, and the numerous holes 14 allowing the upper body 30 accommodated in the internal space SP of the shell 10 to be externally visible contribute to improvement in design.

While the shell 10 structured as such can be made also by injection molding or cast molding, in particular, the shell 10 can relatively readily be made by additive manufacturing using a three-dimensional additive manufacturing apparatus described above.

Figure 7:
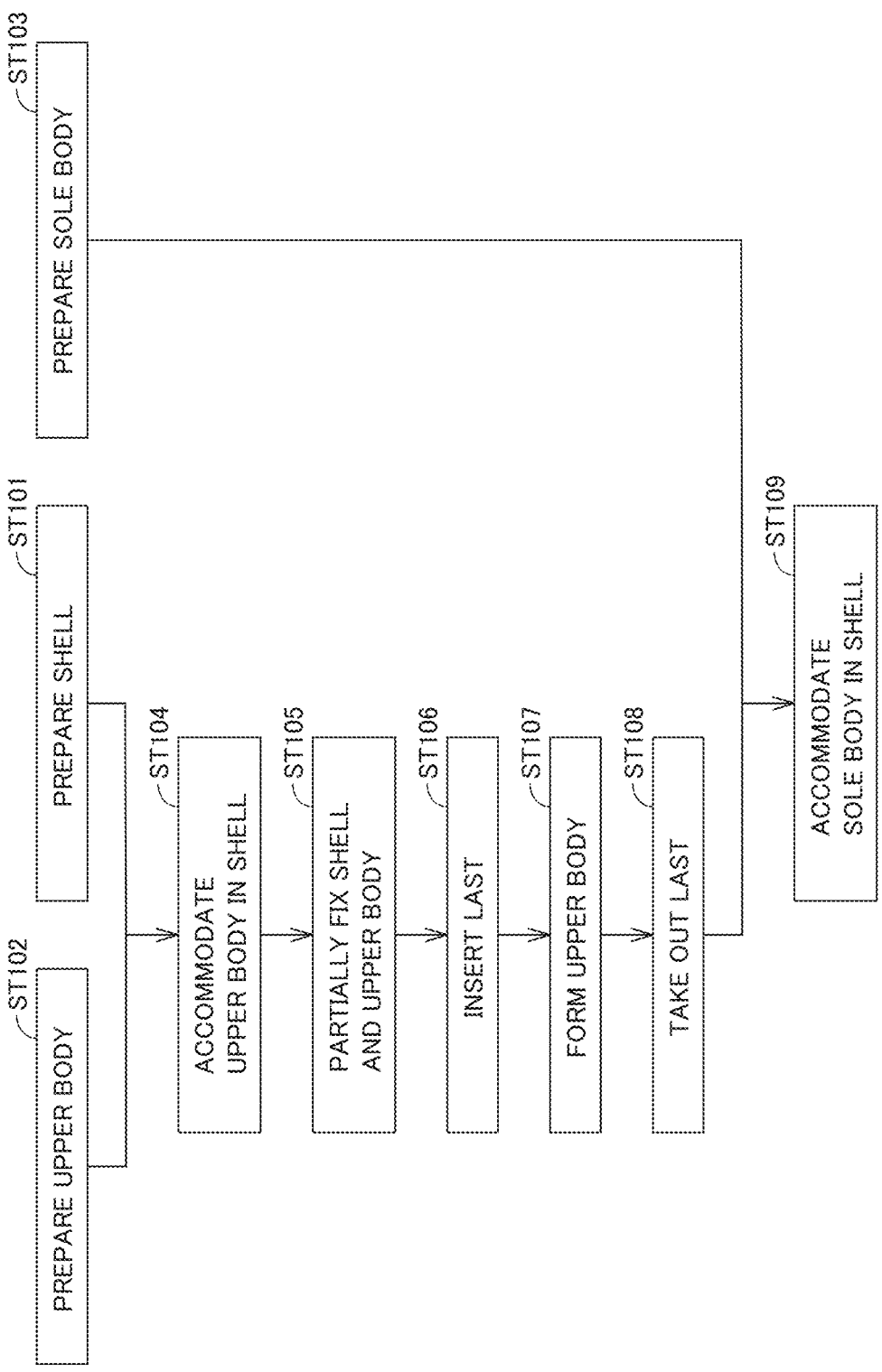
FIG. 7 is a flowchart showing a method of manufacturing a shoe according to the first embodiment.

FIG. 7 is a flowchart showing a method of manufacturing a shoe according to the first embodiment. FIGS. 8A, 8B, 9, 10A, 10B, 11, and 12 are schematic diagrams showing some steps in a manufacturing flow shown in FIG. 7. The method of manufacturing a shoe according to the present embodiment will now be described with reference to FIGS. 7 to 12. In FIGS. 8A, 8B, 9, 10A, 10B, 11, and 12, for distinction of the upper body between before and after forming by heating which will be described later, a yet-to-be-formed upper body has a reference numeral 30' allotted and a formed upper body has a reference numeral 30 allotted.

As shown in FIG. 7, in manufacturing the shoe 1A according to the present embodiment, initially, in step ST101, the shell 10 is prepared. Though the shell 10 may be made with any method, it is preferably made by additive manufacturing using a three-dimensional additive manufacturing apparatus described above. When the shell 10 is made by additive manufacturing using the three-dimensional additive manufacturing apparatus, the shape of the shell 10 to be made is further preferably determined based on foot shape data obtained by measuring the foot of the wearer. Fit of the manufactured shoe 1A to the foot of the wearer is thus further enhanced.

Then, in step ST102, the upper body 30' is prepared. Though the upper body 30' may be made with any method, for example, the upper body 30' in a form of a bag provided with an opening in a portion corresponding to the topline 33 can readily be made by rolling and sewing a sheet made from a woven material, a knitted material, nonwoven fabric, or the like of heat-shrinkable synthetic fibers.

Then, in step ST103, the sole body 20 is prepared. Though the sole body 20 may be made with any method, the sole body can be made, for example, by injection molding or press forming.

The shell 10, the upper body 30', and the sole body 20 may be made in any order or simultaneously in parallel. Furthermore, a plurality of shells, a plurality of upper bodies, and a plurality of sole bodies may be placed in stock in advance for each size, and one with an optimal size may be selected from among them and used as necessary.

Figure 8A:
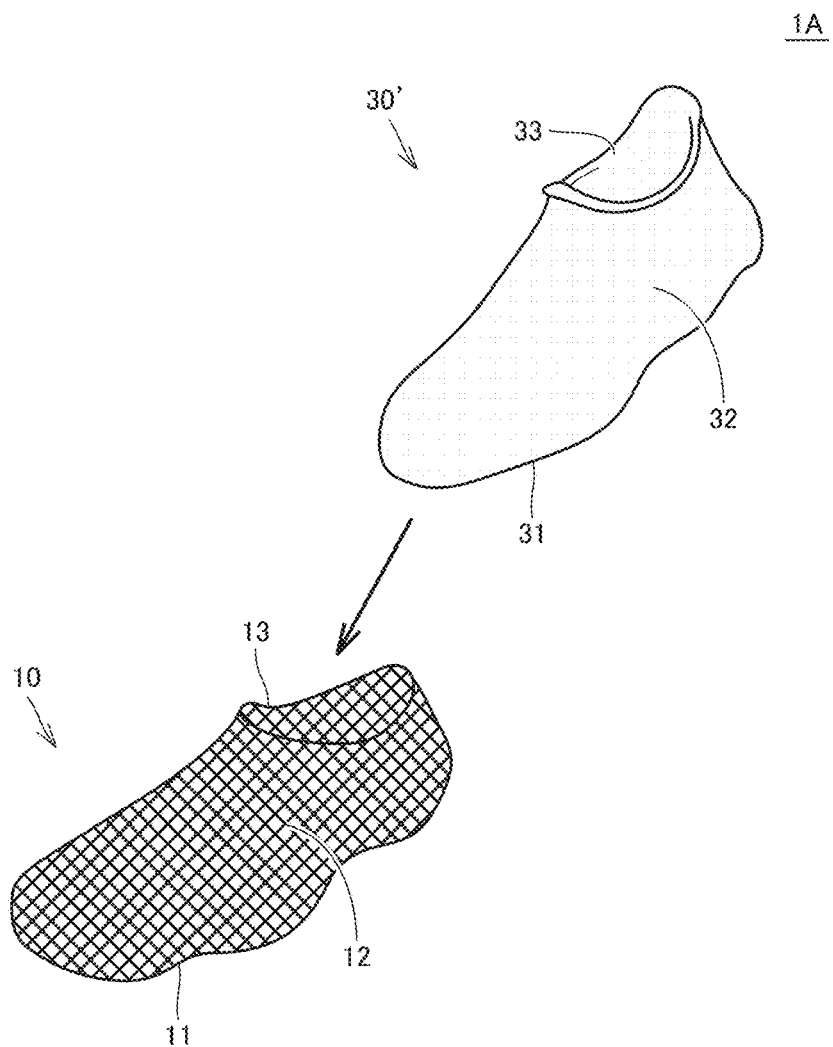
FIGS. 8A and 8B are schematic diagrams showing a step of accommodating an upper body in the shell in a manufacturing flow shown in FIG. 7.
Figure 8B:
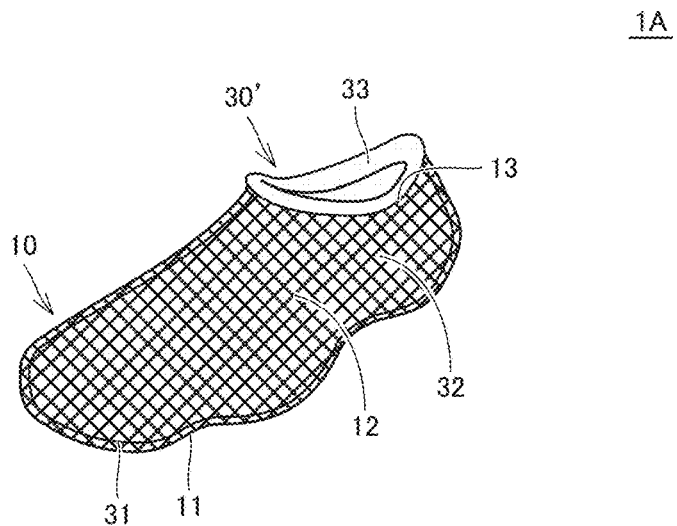

Then, as shown in FIGS. 7, 8A, and 8B, in step ST104, the upper body 30' is accommodated in the shell 10. Specifically, as shown in FIG. 8A, the upper body 30' is inserted in the internal space SP of the shell 10.

Since the upper body 30' is flexibly deformable, the upper body can be inserted in the internal space SP of the shell 10 through the insertion portion 13 in the form of the opening provided at the upper end of the shell 10. The inserted upper body 30' is arranged to extend along the inner surfaces 11a and 12a of the shell 10. The vicinity of the topline 33 of the upper body 30' is exposed to the outside through the insertion portion 13 of the shell 10.

As shown in FIG. 8B, the upper body 30' is thus accommodated in the shell 10.

Figure 9:
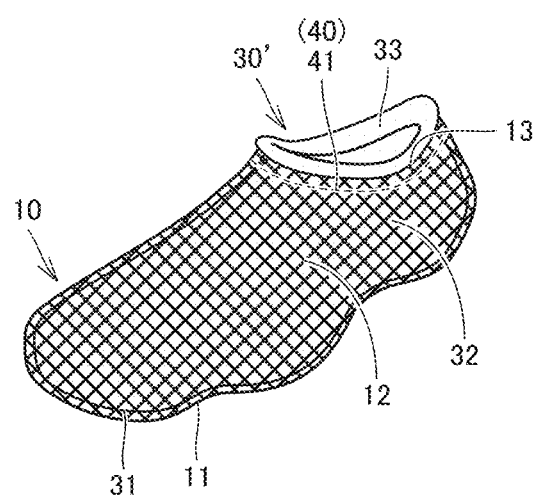
FIG. 9 is a schematic diagram showing a step of partially fixing the shell and the upper body in the manufacturing flow shown in FIG. 7.

Then, as shown in FIGS. 7 and 9, in step ST105, the shell 10 and the upper body 30' are partially fixed. Specifically, as shown in FIG. 9, in a portion of the shell 10 and the upper body 30' layered on each other, which is adjacent to the topline 33 as surrounding the topline 33, the sewn portion 41 as the fixed portion 40 where the shell and the upper body are fixed is provided to partially fix the shell 10 and the upper body 30'.

Figure 10A:
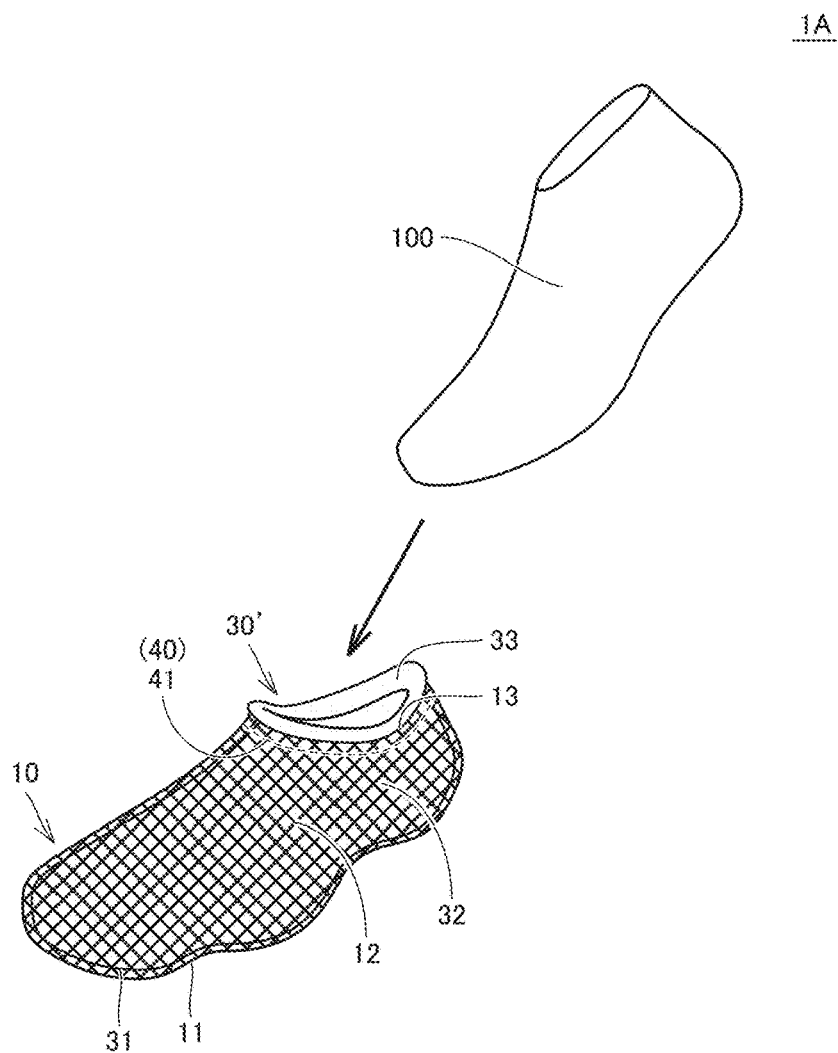
FIGS. 10A and 10B are schematic diagrams showing a step of inserting a last in the manufacturing flow shown in FIG. 7.
Figure 10B:
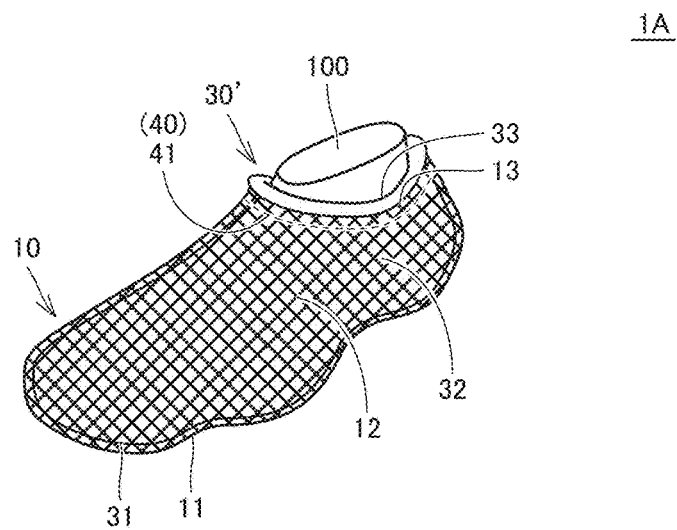

Then, as shown in FIGS. 7, 10A, and 10B, in step ST106, the last 100 is inserted. Specifically, as shown in FIG. 10A, the last 100 is inserted in the inside of the upper body 30' accommodated in the internal space SP of the shell 10.

The shell 10 is flexible and the upper body 30' is flexibly deformable. Therefore, the last 100 can be inserted in the inside of the upper body 30' through the topline 33 provided in the upper body 30'. The inner surfaces 31a and 32a of the upper body 30' are thus arranged to extend along the surface of the last 100.

As shown in FIG. 10B, the last 100 is thus located in the inside of the upper body 30' accommodated in the internal space SP of the shell 10.

Use of a last made based on foot shape data obtained by measuring the foot of the wearer as the last 100 allows the manufactured shoe 1A to further better fit the foot of the wearer. In addition, a last of a standard shape corresponding to the size of the foot of the wearer may be employed as the last 100.

Then, as shown in FIG. 7, in step ST107, the upper body 30' is formed. Specifically, the upper body 30' is accommodated in the shell 10, the shell 10 and the upper body 30' are partially fixed, and the upper body 30' is formed by being heated to a prescribed temperature with the last 100 being located in the upper body 30' accommodated in the shell 10 (that is, the state shown in FIG. 10B).

Since the upper body 30' is heat-shrinkable as described above, at this time, the upper body 30' is thermally shrunk as a whole by this heating. With this deformation by heat shrinkage, the outer surfaces 31b and 32b of the formed upper body 30 have an outer geometry in conformity with the inner surfaces 11a and 12a of the shell 10 and the inner surfaces 31a and 32a of the formed upper body 30 have an inner geometry in conformity with the surface of the last 100.

As described above, when a last made based on foot shape data obtained by measuring the foot of the wearer is employed as the last 100, the inner surface 32a of the formed upper body 30 is substantially in conformity with an outer contour of the foot of the wearer, and hence fit of the manufactured shoe 1A to the foot of the wearer is particularly enhanced.

Figure 11:
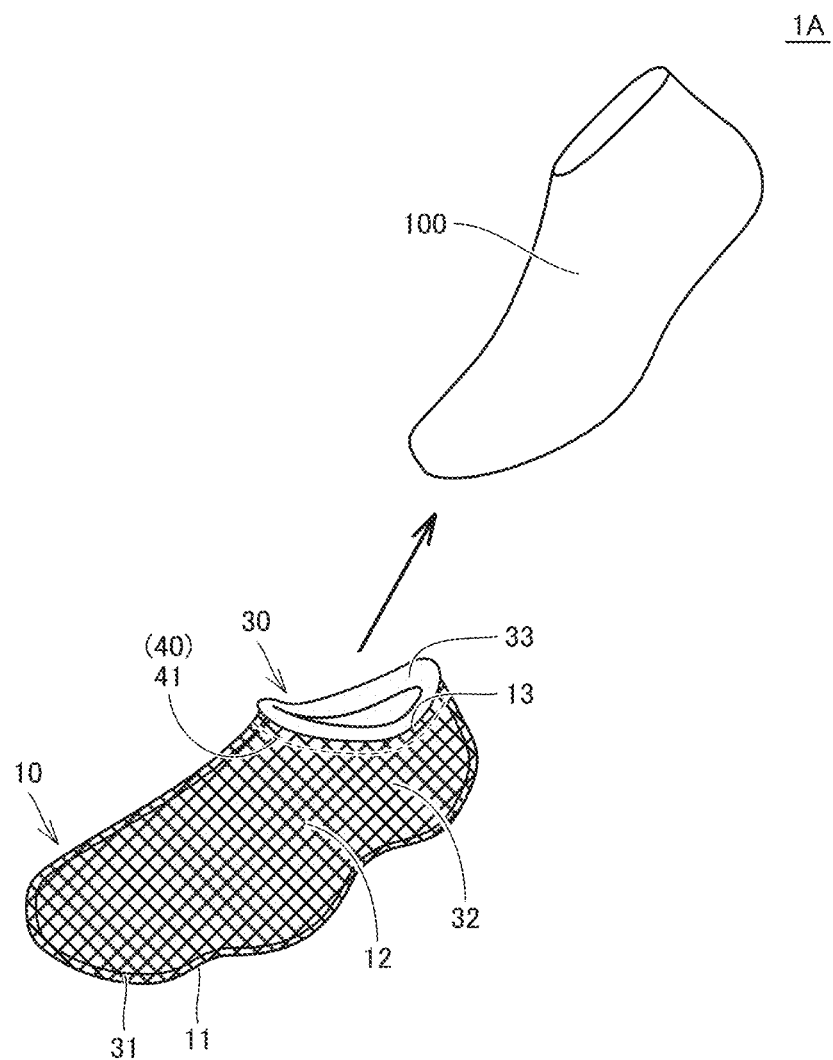
FIG. 11 is a schematic diagram showing a step of taking out the last in the manufacturing flow shown in FIG. 7.

Then, as shown in FIGS. 7 and 11, in step ST108, the last 100 is taken out. Specifically, as shown in FIG. 11, the last 100 is taken out of the inside of the upper body 30 accommodated in the internal space SP of the shell 10.

The shell 10 is flexible and the upper body 30 is flexibly deformable. Therefore, the last 100 can be taken out of the upper body 30 through the topline 33 provided in the upper body 30.

Figure 12:
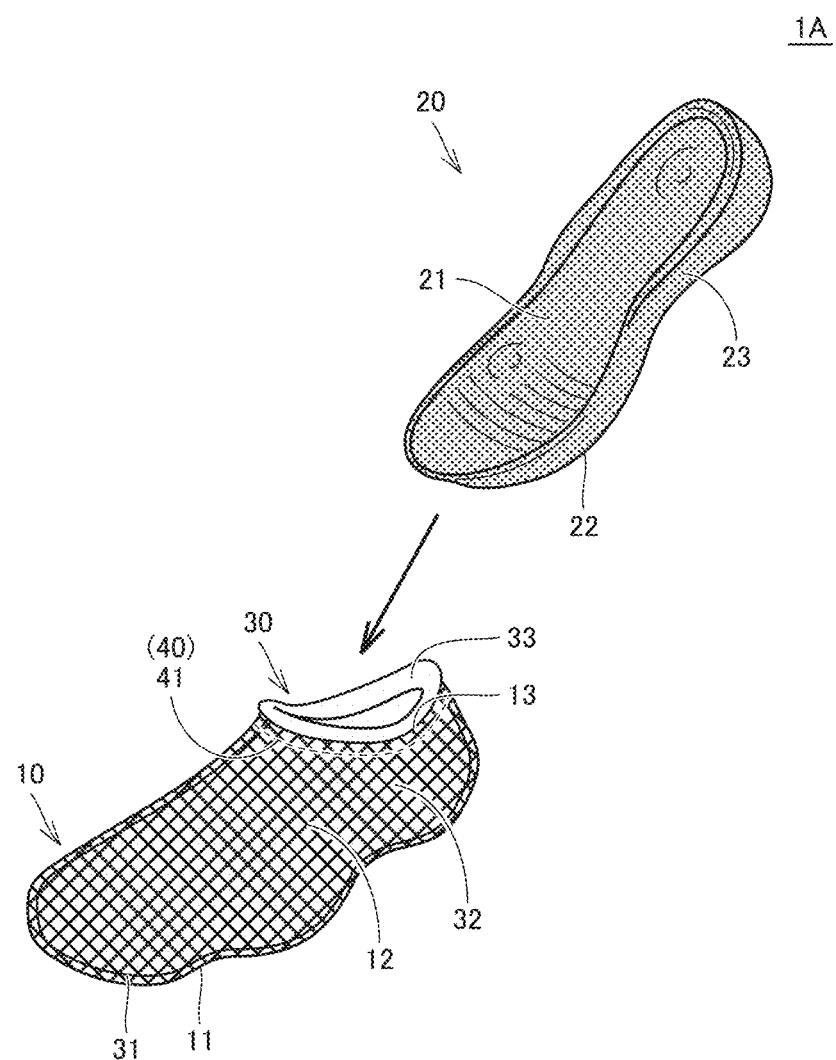
FIG. 12 is a schematic diagram showing a step of accommodating a sole body in the shell in the manufacturing flow shown in FIG. 7.

Then, as shown in FIGS. 7 and 12, in step ST109, the sole body 20 is accommodated in the shell 10. Specifically, as shown in FIG. 12, the sole body 20 is inserted in the inside of the upper body 30 accommodated in the internal space SP of the shell 10.

The shell 10 is flexible and the upper body 30 is flexibly deformable. Therefore, the sole body 20 can be inserted in the inside of the upper body 30 through the topline 33 provided in the upper body 30. Thus, the lower surface 22 and the side surface 23 of the sole body 20 are arranged to extend along the inner surfaces 31a and 32a of the upper body 30.

Through the procedure above, assembly of the shell 10, the sole body 20, and the upper body 30 is completed and thus manufacturing of the shoe 1A according to the present embodiment described above is completed.

Thus, according to the method of manufacturing a shoe according to the present embodiment, the shoe 1A can be manufactured through very simplified works to assemble the shell 10, the sole body 20, and the upper body 30' individually made in advance. Therefore, with the shoe 1A according to the present embodiment, not only poor fit or impairment of the function as the shoe due to position displacement of the upper body 30 from the shell 10 can be prevented but also the shoe 1A can readily be manufactured in a short period of time.

Though an example in which the sole body 20 and the upper body 30 are not fixed with special fixing means is illustrated and described in the method of manufacturing a shoe according to the present embodiment above, they may be fixed with fixing means as necessary. For fixing, for example, sewing, bonding, welding, clipping, or engagement by engaging portions provided in the sole body 20 and the upper body 30 can be used.

In the step of forming the upper body 30 described above, the upper body should only be formed such that the formed upper body 30 has at least any of the outer geometry in conformity with the shell 10 and the inner geometry in conformity with the last 100, and the upper body does not necessarily have to be formed such that the formed upper body 30 has both of the outer geometry in conformity with the shell 10 and the inner geometry in conformity with the surface of the last 100 as described above.

First Modification

Figure 13:
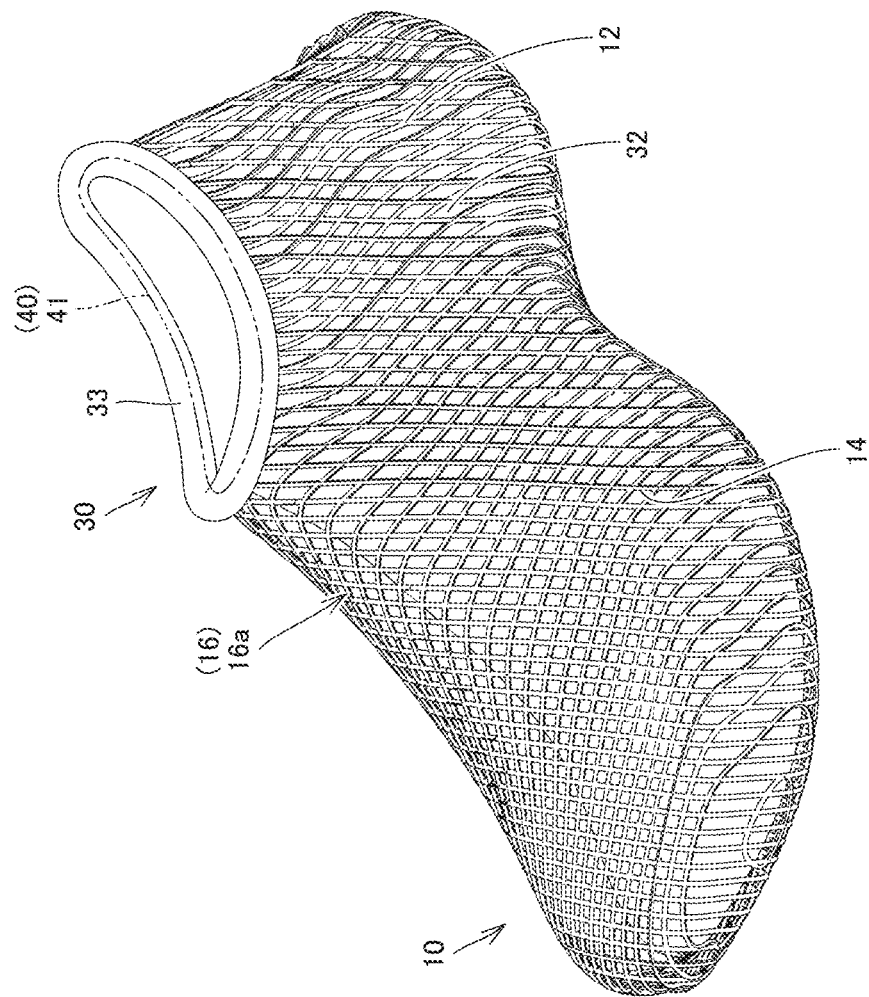
FIG. 13 is a perspective view of a shoe according to a first modification.

FIG. 13 is a perspective view of a shoe according to a first modification and FIGS. 14, 15A, 15B, 16, and 17 are schematic diagrams showing another example of some steps in the manufacturing flow shown in FIG. 7 for manufacturing the shoe according to the first modification. A construction of a shoe 1A1 according to the first modification based on the first embodiment described above and a specific manufacturing flow for manufacturing the shoe 1A1 will be described below with reference to FIGS. 13 to 17.

In the shoe 1A according to the first embodiment described above, the sewn portion 41 as the fixed portion 40 is provided at a position externally visually recognizable. As shown in FIG. 13, however, the shoe 1A1 according to the present modification is constructed such that the sewn portion 41 is not externally visually recognizable. Though a position where the sewn portion 41 is formed is shown with a chain double dotted line in FIG. 13 for illustration, actually, the sewn portion 41 is not externally visually recognizable.

Specifically, in the shoe 1A1 according to the present modification, the sewn portion 41 is not externally visually recognizable by folding back the upper body 30 to be inserted in the insertion portion 13 of the shell 10 so as to hide a portion where the sewn portion 41 is provided. In other words, the upper end of the wall portion 32 of the upper body 30 is arranged to be layered on the upper end of the outer surface 12b of the peripheral wall portion 12 of the shell 10, the sewn portion 41 is formed at that portion, the wall portion 32 of the upper body 30 is folded back upward at a portion under the upper end of the upper body 30, and the wall portion is bent to enter the internal space SP of the shell 10 through the insertion portion 13 of the shell 10. Thus, the upper body 30 itself covers the sewn portion 41.

According to such a construction, the sewn portion 41 is not externally visually recognizable, which contributes to improvement in design. In addition, as the sewn portion 41 is covered with the upper body 30, the sewn portion 41 is also protected. Therefore, fray or the like of the sewn portion 41 can be suppressed.

The shoe 1A1 constructed as such can be manufactured by modifying how to layer the upper body 30 on the shell 10 in some steps in the method of manufacturing a shoe according to the first embodiment described above.

Figure 14:
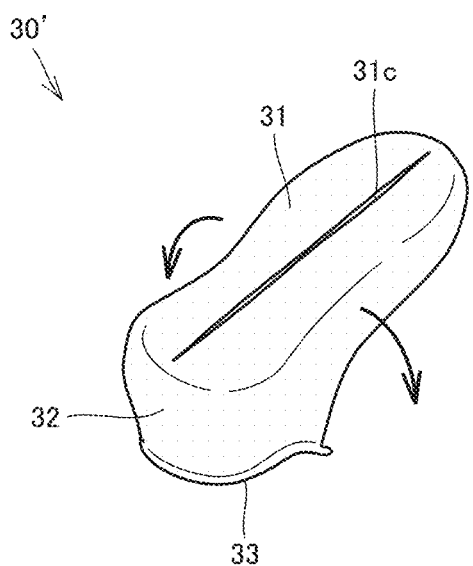
FIG. 14 is a schematic diagram showing another example of a step of preparing the upper body in the manufacturing flow shown in FIG. 7.

Specifically, as shown in FIG. 14, initially, in the step of preparing the upper body (the step ST102 shown in FIG. 7), a cut 31c like a slit that extends along the longitudinal direction is provided in the bottom portion 31 of the upper body 30' in the form of the bag provided with the opening in the portion corresponding to the topline 33 and the cut 31c is opened along directions shown with arrows in the figure. Thus, the upper body 30' is turned inside out.

Figure 15A:
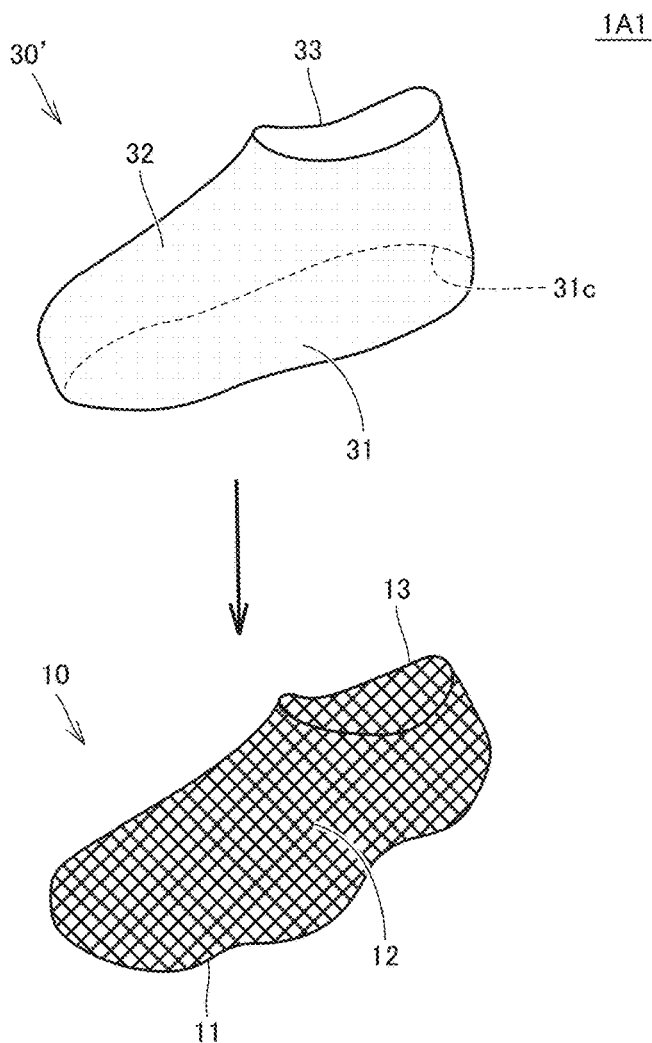
FIGS. 15A and 15B are schematic diagrams showing another example of the step of partially fixing the shell and the upper body in the manufacturing flow shown in FIG. 7.

Then, as shown in FIG. 15A, prior to the step of accommodating the upper body in the shell (the step ST104 shown in FIG. 7), the step of partially fixing the shell and the upper body (the step ST105 shown in FIG. 7) is performed. In the step of partially fixing the shell and the upper body, initially, the upper body 30' turned inside out is applied over the shell 10 along a direction shown with an arrow in the figure. The shell 10 is inserted in the inside of the upper body 30' through the cut 31c provided in the bottom portion 31 of the upper body 30'.

Figure 15B:
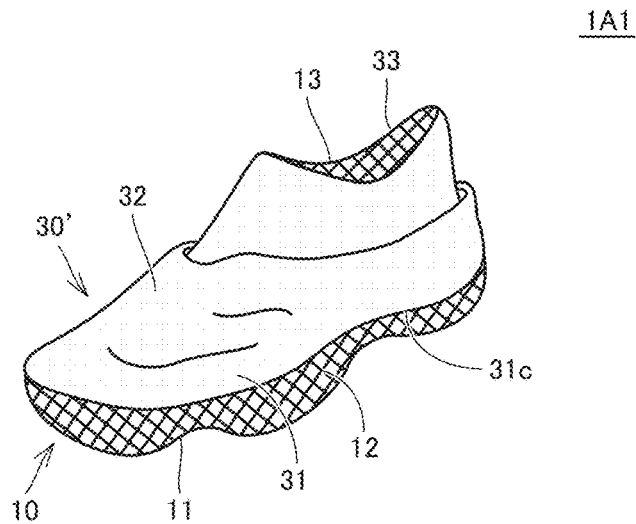

Thus, as shown in FIG. 15B, the upper body 30' turned inside out covers the peripheral wall portion 12 of the shell 10. At this time, the upper end of the wall portion 32 of the upper body 30' which is the end on the side of the topline 33 is layered on the upper end of the shell 10 which is the end on the side of the insertion portion 13.

Figure 16:
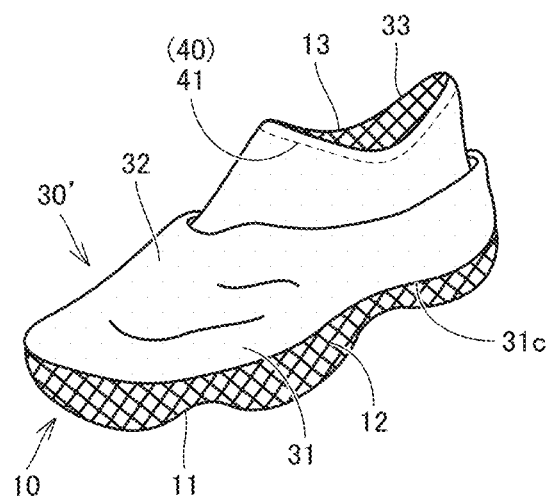
FIG. 16 is a schematic diagram showing another example of the step of partially fixing the shell and the upper body in the manufacturing flow shown in FIG. 7.

In succession, as shown in FIG. 16, the sewn portion 41 as the fixed portion 40 is provided to surround the topline 33 at the upper end of the wall portion 32 of the upper body 30' and the upper end of the peripheral wall portion 12 of the shell 10 that are layer on each other. The shell 10 and the upper body 30' are thus partially fixed.

Figure 17:
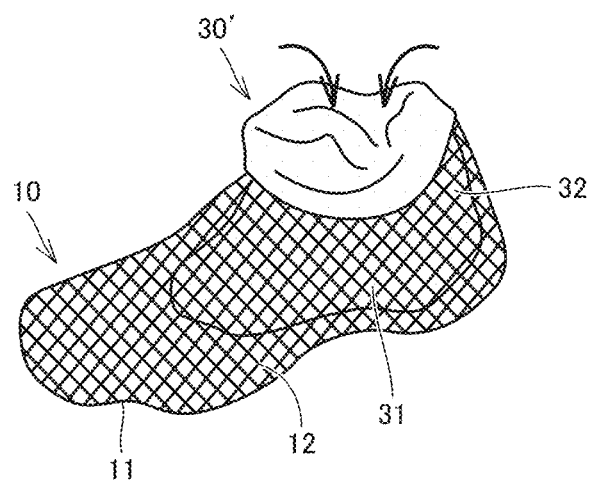
FIG. 17 is a schematic diagram showing another example of the step of accommodating the upper body in the shell in the manufacturing flow shown in FIG. 7.

Then, as shown in FIG. 17, the step of accommodating the upper body in the shell is performed. A portion of the upper body 30' except for the upper end which is the portion where the sewn portion 41 described above is provided is inserted in the internal space SP of the shell 10 along directions shown with arrows in the figure. At this time, the upper body 30' is turned inside out again from the state of being turned inside out, and in the portion except for the upper end which is the portion where the sewn portion 41 described above is provided, the upper body returns to an original state in which the inner surfaces 31a and 32a thereof are arranged on the inner side and the outer surfaces 31b and 32b are arranged on the outer side. The sewn portion 41 is thus covered with the upper body 30' itself and the sewn portion 41 is not exposed to the outside.

In inserting the upper body 30' in the internal space SP of the shell 10, the cut 31c described above may be left as it is, because the bottom portion 31 of the formed upper body 30 is finally covered with the sole body 20. From a point of view of reliable prevention of position displacement of the formed upper body 30, however, prior to insertion of the upper body 30' in the internal space SP of the shell 10, the cut 31c is preferably closed by sewing or the like.

Thus, according to the construction as in the present modification, an effect similar to the effect described in the first embodiment above is obtained and an effect of improvement in design can further be obtained.

Second Modification

Figure 18:
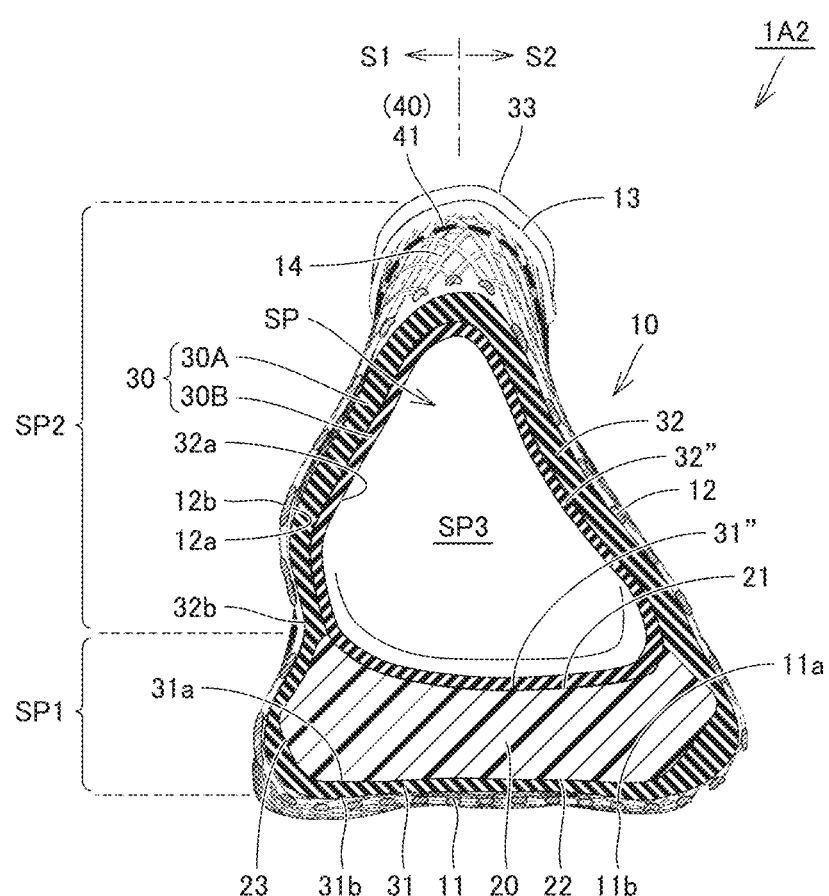
FIG. 18 is a cross-sectional view of a shoe according to a second modification.
Figure 19:
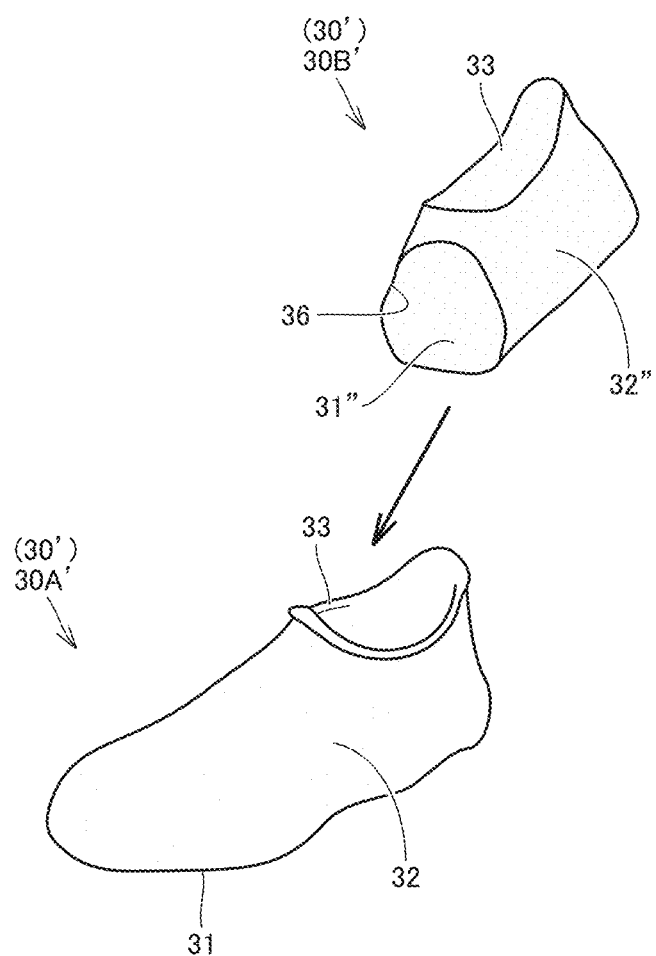
FIG. 19 is a schematic diagram showing yet another example of the step of preparing the upper body in the manufacturing flow shown in FIG. 7.
Figure 20:
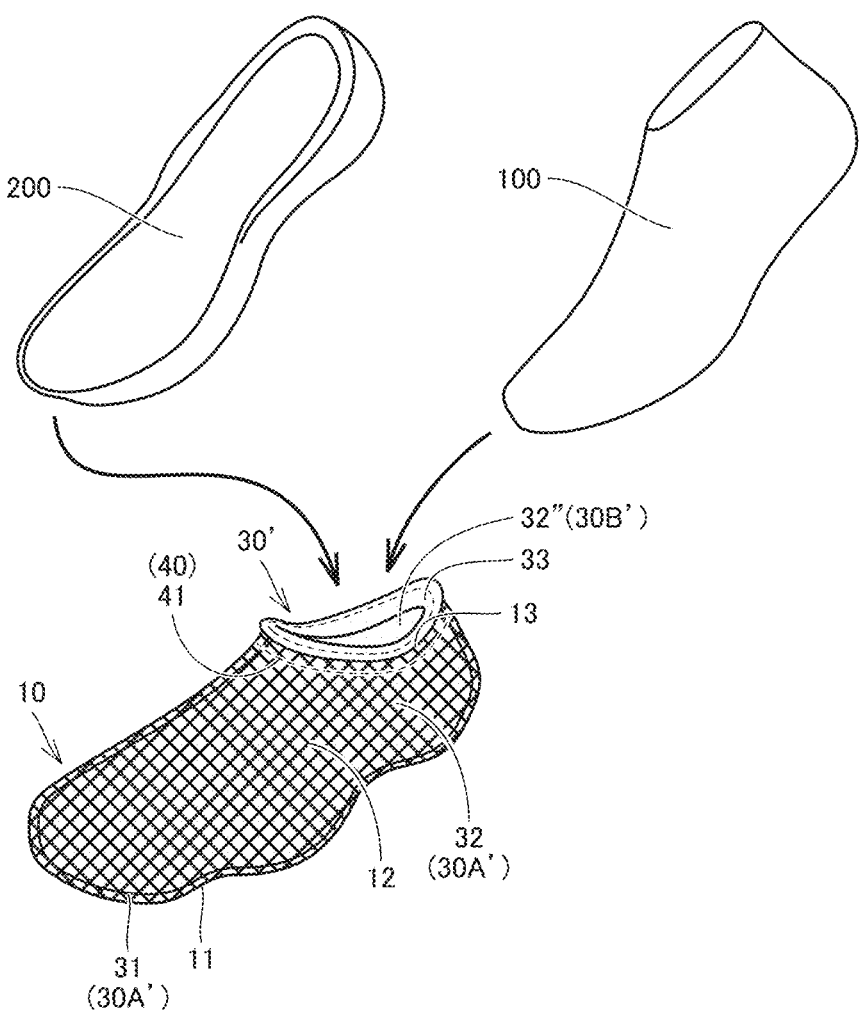
FIG. 20 is schematic diagram showing yet another example of the step of inserting the last in the manufacturing flow shown in FIG. 7.

FIG. 18 is a cross-sectional view of a shoe according to a second modification and FIGS. 19 and 20 are schematic diagrams showing yet another example of some steps in the manufacturing flow shown in FIG. 7 for manufacturing the shoe according to the second modification. A construction of a shoe 1A2 according to the second modification based on the first embodiment described above and a specific manufacturing flow for manufacturing the shoe 1A2 will be described below with reference to FIGS. 18 to 20.

In the shoe 1A according to the first embodiment described above, a portion that supports the sole of the foot of the wearer is entirely defined by the upper surface 21 of the sole body 20. As shown in FIG. 18, however, in the shoe 1A2 according to the present modification, a part of the portion that supports the sole of the foot of the wearer is defined by a part of the upper body 30.

Specifically, in the shoe 1A2 according to the present modification, the upper body 30 includes a first bag-shaped portion 30A and a second bag-shaped portion 30B. As shown in FIG. 19, the first bag-shaped portion 30A is in a form of a bag without an opening in a portion other than the topline 33, and the second bag-shaped portion 30B is in a form of a bag provided with the topline 33 and provided with a front opening 36 at a front end. Since FIG. 19 illustrates the yet-to-be-formed upper body 30', the first bag-shaped portion 30A and the second bag-shaped portion 30B are illustrated as a first bag-shaped portion 30A' yet to be formed and a second bag-shaped portion 30B' yet to be formed.

In other words, the first bag-shaped portion 30A is constructed to cover the entire foot of the wearer (strictly speaking, additionally cover the sole body 20), whereas the second bag-shaped portion 30B is constructed to cover the arch and the heel of the foot of the wearer, although it does not cover the toe of the foot of the wearer. The first bag-shaped portion 30A and the second bag-shaped portion 30B are integrated, for example, by being sewn at the topline 33.

As shown in FIG. 18, the first bag-shaped portion 30A is accommodated in the internal space SP of the shell 10 to cover the inner surface 11a of the bottom wall portion 11 of the shell 10 and the inner surface 12a of the peripheral wall portion 12 in the forefoot portion R1, the midfoot portion R2, and the rearfoot portion R3.

The second bag-shaped portion 30B is arranged in the inside of the first bag-shaped portion 30A to cover the second portion of the peripheral wall portion 12 of the shell 10 described above and the upper surface 21 of the sole body 20 in the midfoot portion R2 and the rearfoot portion R3. In other words, the second bag-shaped portion 30B includes a bottom portion 31" that covers the upper surface of the sole body 20 in the midfoot portion R2 and the rearfoot portion R3 and a wall portion 32" that covers the inner surface 32a of a portion except for a lower end portion of the wall portion 32 of the first bag-shaped portion 30A in the midfoot portion R2 and the rearfoot portion R3.

The sole body 20 is thus arranged between a portion of the first bag-shaped portion 30A that corresponds to the sole of the foot of the wearer and a portion of the second bag-shaped portion 30B that corresponds to the arch and the heel of the foot of the wearer.

Consequently, in the shoe 1A2 according to the present modification, the portion that supports the sole of the foot of the wearer is defined by the upper surface 21 of the sole body 20 in the portion corresponding to the forefoot portion R1 and defined by the bottom portion 31" of the second bag-shaped portion 30B in the upper body 30 in the midfoot portion R2 and the rearfoot portion R3. In the portion except for the sole of the foot of the wearer, the toe is in contact with the wall portion 32 of the first bag-shaped portion 30A of the upper body 30, and the instep and the peripheral surface of the heel are in contact with the wall portion 32" of the second bag-shaped portion 30B of the upper body 30.

In such a construction, in particular in the midfoot portion R2 and the rearfoot portion R3 where good fit is demanded, the sole of the foot of the wearer is in contact with the upper body 30 rather than the sole body 20. Therefore, by forming the upper body 30 with the use of the last 100 made based on the foot shape data obtained by measuring the foot of the wearer, not only the inner surface 32a of the wall portion 32" of the upper body 30 but also the inner surface 31a of the bottom portion 31" of the upper body 30 are fitted to the foot of the wearer and a good fit is obtained in the midfoot portion R2 and the rearfoot portion R3.

The shoe 1A2 constructed as such can be manufactured by changing the shape of the upper body 30 to be prepared in the step of preparing the upper body in the method of manufacturing a shoe according to the first embodiment described above and by making modification to insert, in addition to the last 100, a last member 200 which will be described later in the upper body 30 to be accommodated in the shell 10 in the step of forming the upper body in the method of manufacturing a shoe according to the first embodiment described above.

Specifically, as shown in FIG. 19, in the step of preparing the upper body (the step ST102 shown in FIG. 7), the second bag-shaped portion 30B' is inserted in the inside of the first bag-shaped portion 30A' through the topline 33 provided in the first bag-shaped portion 30A', and the first bag-shaped portion 30A' and the second bag-shaped portion 30B' are integrated in this state, for example, by being sewn.

Thereafter, as shown in FIG. 20, the yet-to-be-formed upper body 30' that is constituted of the first bag-shaped portion 30A' and the second bag-shaped portion 30B' is accommodated in the internal space SP of the shell 10. In the step of accommodating the last (the step ST106 shown in FIG. 7), the last member 200 and the last 100 are inserted in the yet-to-be-formed upper body 30' accommodated in the shell 10.

More specifically, initially, the last member 200 is inserted in the upper body 30'. The last member 200 is composed, for example, of a metal or a cross-linked resin with an outer geometry in conformity with the outer geometry of the sole body 20 to be assembled later, and it serves to form a lower end portion of the bottom portion 31 and the wall portion 32 of the first bag-shaped portion 30A' and the bottom portion 31" of the second bag-shaped portion 30B' in forming the upper body 30'.

The shell 10 is flexible, the upper body 30' is flexibly deformable, and furthermore, the second bag-shaped portion 30B' of the upper body 30' is provided with the front opening 36 described above. Therefore, the last member 200 can be inserted into the above-mentioned lower space SP I within the upper body 30' through the topline 33 and the front opening 36 provided in the upper body 30'.

Then, the last 100 is inserted in the inside of the upper body 30'. The shell 10 is flexible and the upper body 30' is flexibly deformable. Therefore, the last 100 can be inserted in the inside of the upper body 30' through the topline 33 provided in the upper body 30'.

In this state, the upper body 30' is formed, and thereafter, the last 100 and the last member 200 described above are taken out of the formed upper body 30 in this order. Further thereafter, the sole body 20 is inserted in the inside of the upper body 30. The shoe 1A2 according to the present modification described above can thus be manufactured.

Thus, in the construction as in the present modification, an effect similar to the effect described in the first embodiment above is obtained and an effect of enhanced fit can further be obtained.

Though an example in which the second bag-shaped portion 30B' is constructed into a shape that covers the foot of the wearer in the midfoot portion R2 and the rearfoot portion R3 is illustrated in the present embodiment, the second bag-shaped portion 30B' may be constructed into a shape that covers only the midfoot portion R2.

Second Embodiment

Figure 21:
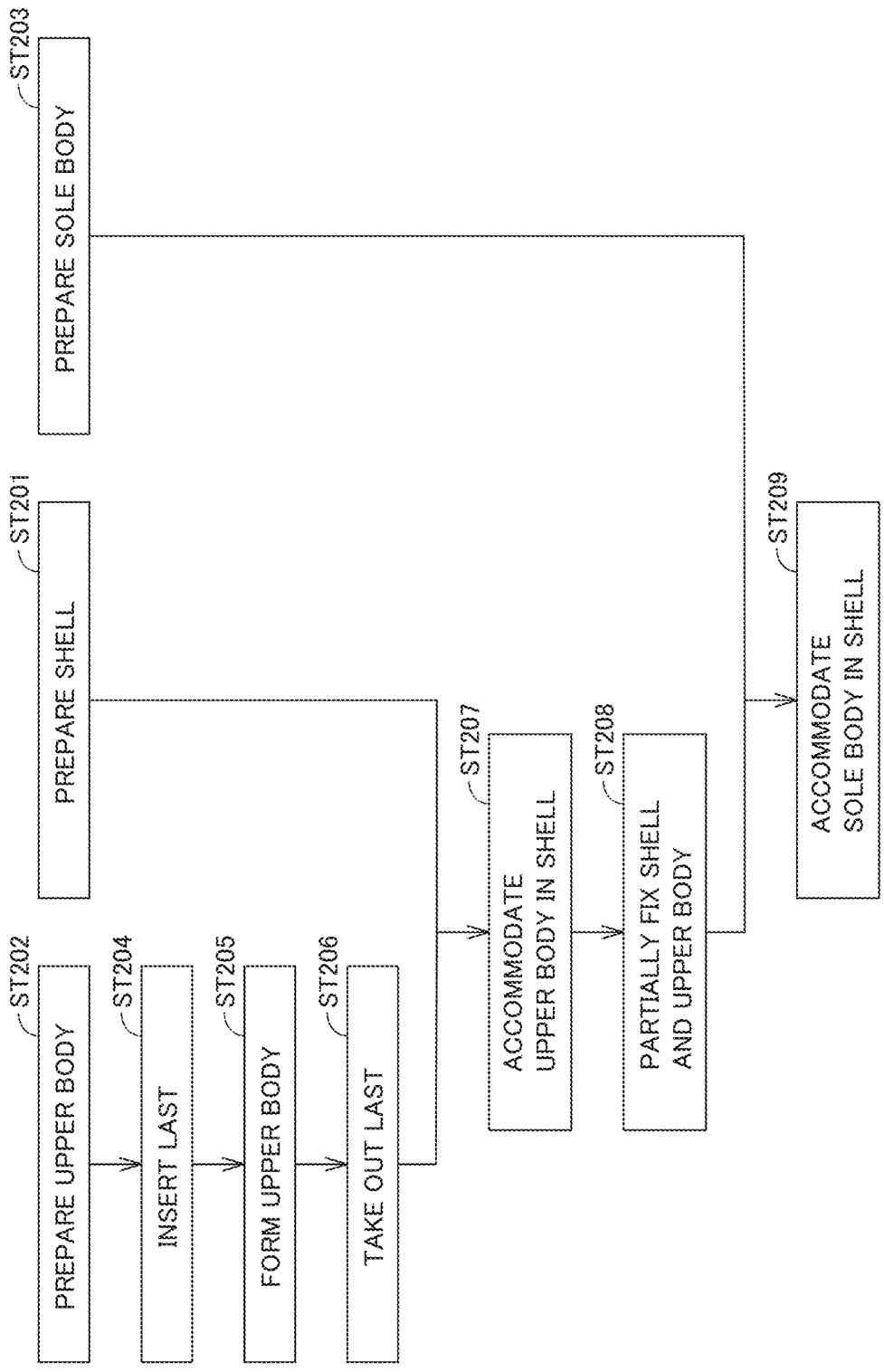
FIG. 21 is a flowchart showing a method of manufacturing a shoe according to a second embodiment.

FIG. 21 is a flowchart showing a method of manufacturing a shoe according to a second embodiment. FIGS. 22A, 22B, 23, 24A, 24B, 25, and 26 are schematic diagrams showing some steps in a manufacturing flow shown in FIG. 21. The method of manufacturing a shoe according to the present embodiment will be described below with reference to FIGS. 21 to 26. In FIGS. 22A, 22B, 23, 24A, 24B, 25, and 26, for distinction of the upper body between before and after forming by heating which will be described later, the yet-to-be-formed upper body has the reference numeral 30' allotted and the formed upper body has the reference numeral 30 allotted.

Though the method of manufacturing a shoe according to the present embodiment is different from the method of manufacturing a shoe according to the first embodiment described above in the order of some steps, a shoe manufactured in accordance with the manufacturing method is also substantially similar to the shoe 1A according to the first embodiment described above. In the method of manufacturing a shoe according to the first embodiment described above, the step of forming the upper body is performed by heating the upper body 30' while the upper body 30' is accommodated in the inside of the shell 10. In the method of manufacturing a shoe according to the present embodiment, however, this step is performed before the step of accommodating the upper body in the shell. Therefore, the method of manufacturing a shoe according to the present embodiment is particularly suitable for an example in which unallowable deformation or deterioration may be caused in the shell 10 by heating.

As shown in FIG. 21, in the method of manufacturing a shoe according to the present embodiment, initially, in steps ST201 to ST203, the shell 10, the upper body 30', and the sole body 20 are prepared. The steps ST201 to ST203 are similar to the steps ST101 to ST103 in the method of manufacturing a shoe according to the first embodiment described above.

Figure 22A:
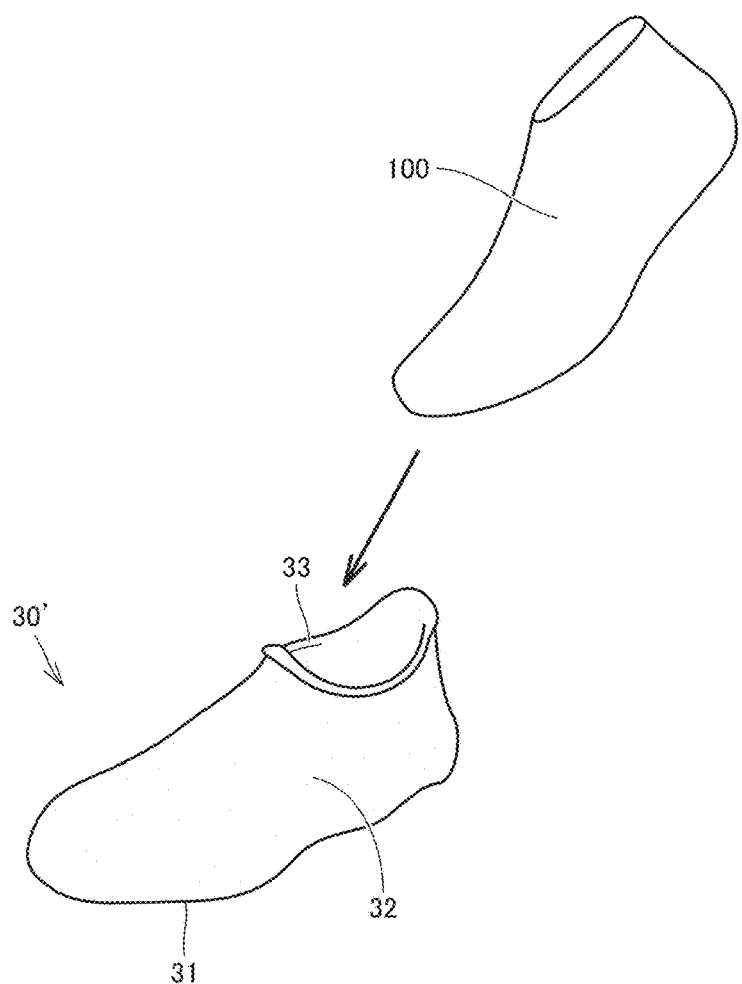
FIGS. 22A and 22B are schematic diagrams showing the step of inserting the last in the manufacturing flow shown in FIG. 21.
Figure 22B:
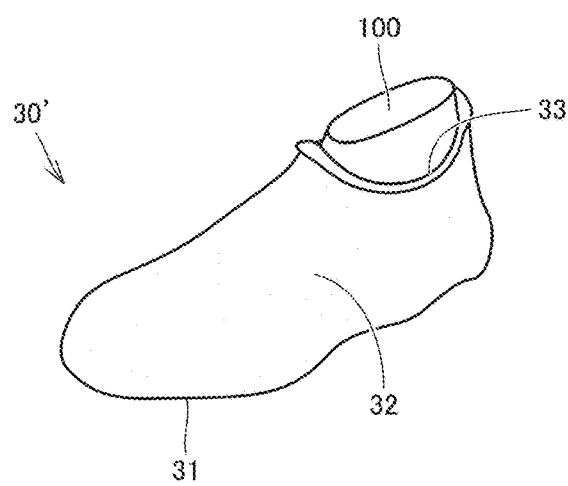

Then, as shown in FIGS. 21, 22A, and 22B, in step ST204, the last 100 is inserted. Specifically, as shown in FIG. 22A, the last 100 is inserted in the inside of the upper body 30'.

Since the upper body 30' is flexibly deformable, the last 100 can be inserted in the inside of the upper body 30' through the topline 33 provided in the upper body 30'. The inner surfaces 31a and 32a of the upper body 30' are thus arranged to extend along the surface of the last 100.

Use of a last made based on foot shape data obtained by measuring the foot of the wearer as the last 100 allows the manufactured shoe 1A to further better fit the foot of the wearer. In addition, a last of a standard shape corresponding to the size of the foot of the wearer may be employed as the last 100.

As shown in FIG. 22B, the last 100 is thus located in the inside of the upper body 30'.

Then, as shown in FIG. 21, in step ST205, the upper body 30' is formed. Specifically, the upper body 30' is formed by being heated to a prescribed temperature with the last 100 being located in the upper body 30' (that is, the state shown in FIG. 22B).

Since the upper body 30' is heat-shrinkable as described above, at this time, the upper body 30' is thermally shrunk as a whole by this heating. With this deformation by heat-shrinkage, the inner surfaces 31a and 32a of the formed upper body 30 have the inner geometry in conformity with the surface of the last 100.

As described above, when a last made based on foot shape data obtained by measuring the foot of the wearer is employed as the last 100, the inner surface 32a of the formed upper body 30 is substantially in conformity with the outer contour of the foot of the wearer, and hence fit of the manufactured shoe 1A to the foot of the wearer is particularly enhanced.

Figure 23:
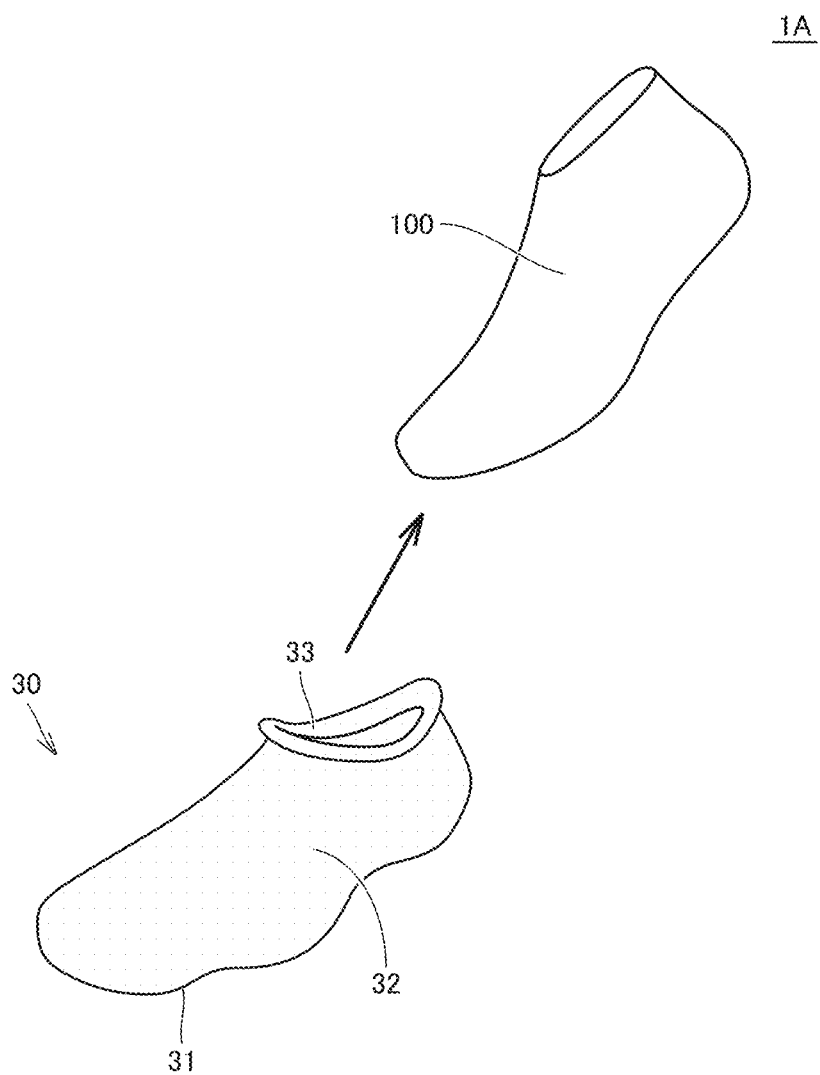
FIG. 23 is a schematic diagram showing the step of taking out the last in the manufacturing flow shown in FIG. 21.

Then, as shown in FIGS. 21 and 23, in step ST206, the last 100 is taken out. Specifically, as shown in FIG. 23, the last 100 is taken out of the inside of the upper body 30.

The upper body 30 is flexibly deformable. Therefore, the last 100 can be taken out of the upper body 30 through the topline 33 provided in the upper body 30.

Figure 24A:
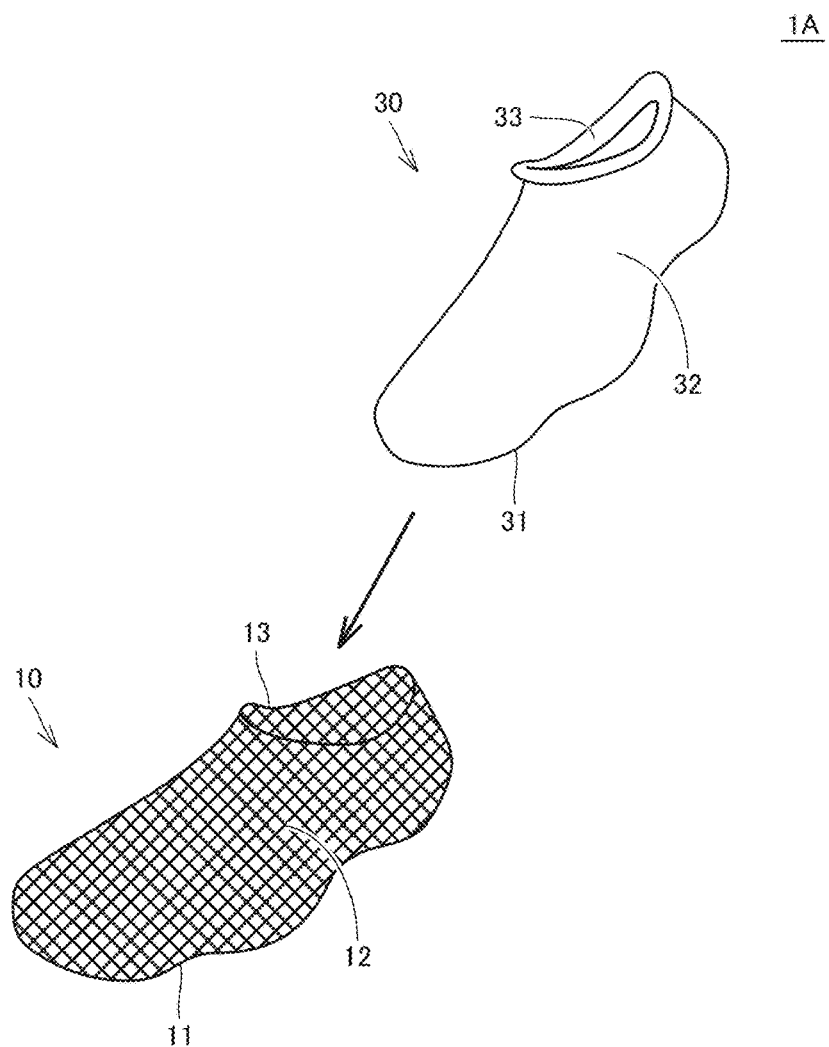
FIGS. 24A and 24B are schematic diagrams showing the step of accommodating the upper body in the shell in the manufacturing flow shown in FIG. 21.
Figure 24B:
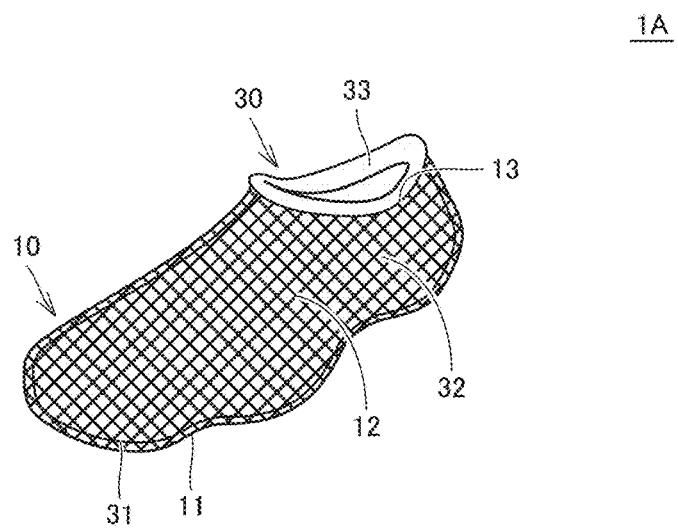

Then, as shown in FIGS. 21, 24A, and 24B, in step ST207, the upper body 30 is accommodated in the shell 10. Specifically, as shown in FIG. 24A, the upper body 30 is inserted in the internal space SP of the shell 10.

Since the upper body 30 is flexibly deformable, the upper body can be inserted in the internal space SP of the shell 10 through the insertion portion 13 in the form of the opening provided at the upper end of the shell 10. The inserted upper body 30 is arranged to extend along the inner surfaces 11a and 12a of the shell 10. The vicinity of the topline 33 of the upper body 30 is exposed to the outside through the insertion portion 13 of the shell 10.

As shown in FIG. 24B, the upper body 30 is thus accommodated in the shell 10.

Figure 25:
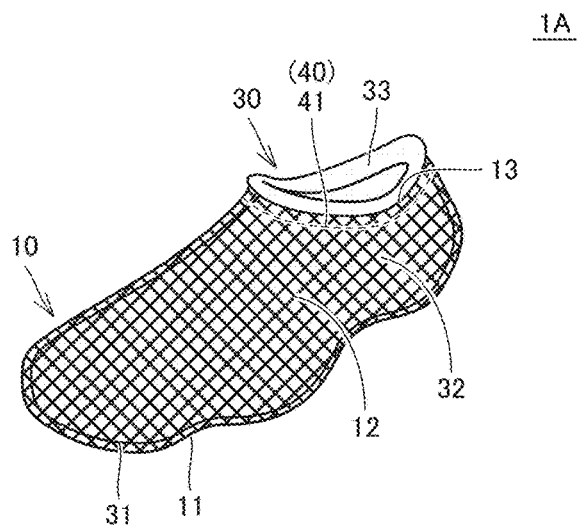
FIG. 25 is a schematic diagram showing the step of partially fixing the shell and the upper body in the manufacturing flow shown in FIG. 21.

Then, as shown in FIGS. 21 and 25, in step ST208, the shell 10 and the upper body 30 are partially fixed. Specifically, as shown in FIG. 25, in a portion of the shell 10 and the upper body 30 layered on each other, which is adjacent to the topline 33 as surrounding the topline 33, the sewn portion 41 as the fixed portion 40 where the shell and the upper body are fixed is provided to partially fix the shell 10 and the upper body 30.

Figure 26:
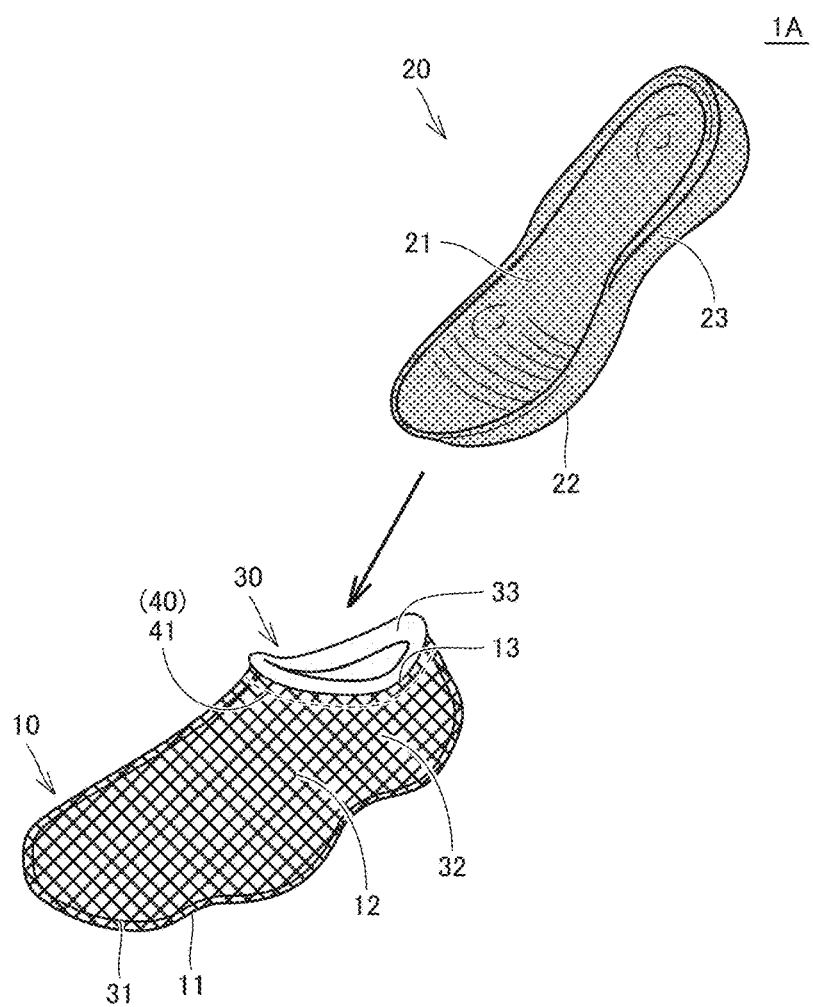
FIG. 26 is a schematic diagram showing the step of accommodating the sole body in the shell in the manufacturing flow shown in FIG. 21.

Then, as shown in FIGS. 21 and 26, in step ST209, the sole body 20 is accommodated in the shell 10. Specifically, as shown in FIG. 26, the sole body 20 is inserted in the inside of the upper body 30 accommodated in the internal space SP of the shell 10.

The shell 10 is flexible and the upper body 30 is flexibly deformable. Therefore, the sole body 20 can be inserted in the inside of the upper body 30 through the topline 33 provided in the upper body 30. Thus, the lower surface 22 and the side surface 23 of the sole body 20 are arranged to extend along the inner surfaces 31a and 32a of the upper body 30.

Through the procedure above, assembly of the shell 10, the sole body 20, and the upper body 30 is completed and thus manufacturing of the shoe substantially similar to the shoe 1A according to the first embodiment described above is completed.

Thus, according to the method of manufacturing a shoe according to the present embodiment, the shoe can be manufactured through very simplified works to assemble the shell 10, the sole body 20, and the upper body 30' individually made in advance. Therefore, the method of manufacturing a shoe according to the present embodiment achieves an effect substantially similar to the effect obtained by the method of manufacturing a shoe according to the first embodiment described above, and is suitable for an example in which unallowable deformation or deterioration may be caused in the shell 10 by heating as described above.

Though an example in which the sole body 20 and the upper body 30 are not fixed with special fixing means is illustrated and described in the method of manufacturing a shoe according to the present embodiment above, they may be fixed with fixing means as necessary. For fixing, for example, sewing, bonding, welding, clipping, or engagement by engaging portions provided in the sole body 20 and the upper body 30 can be used.

Third Embodiment

Figure 27:
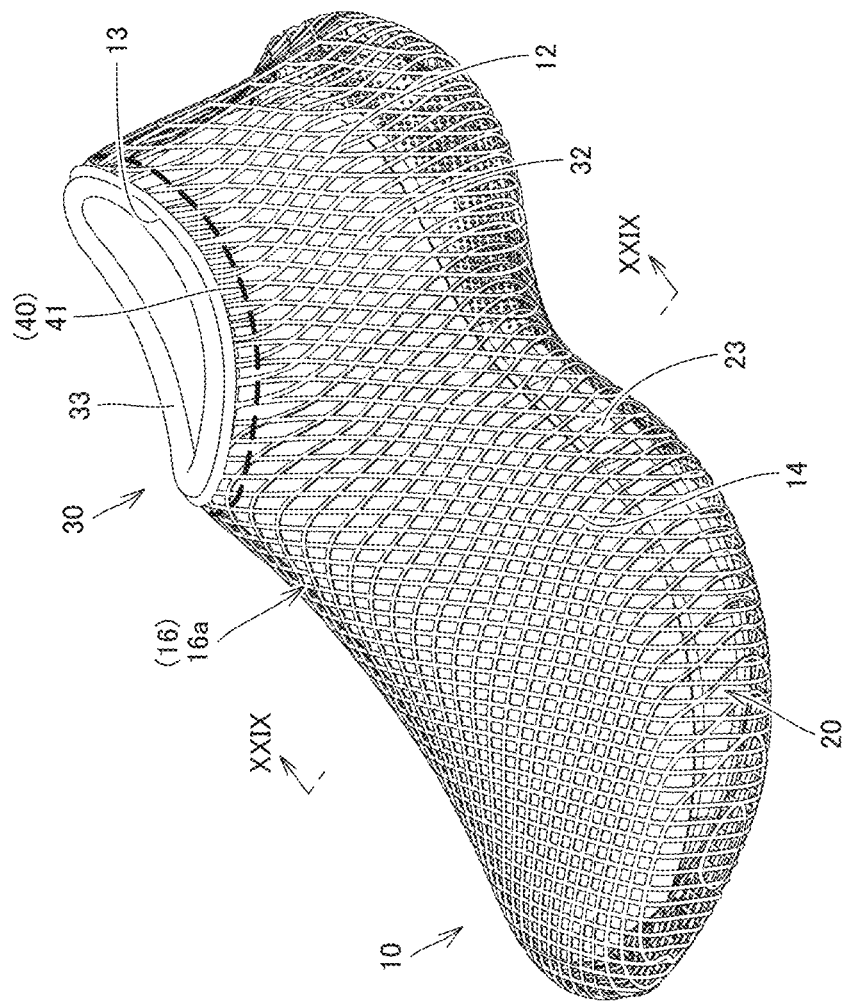
FIG. 27 is a perspective view of a shoe according to a third embodiment.
Figure 28:
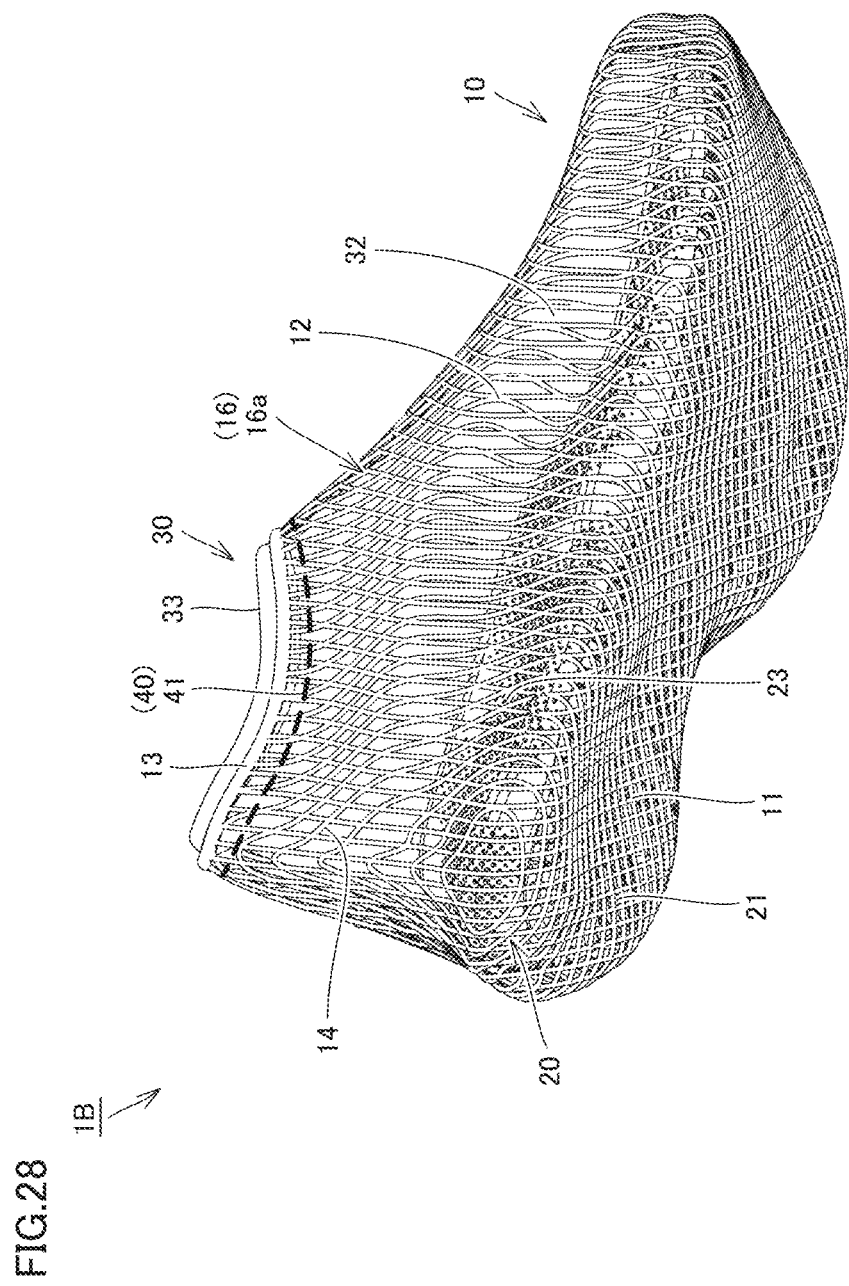
FIG. 28 is a perspective view of the shoe shown in FIG. 27, as seen in a different direction.
Figure 29:
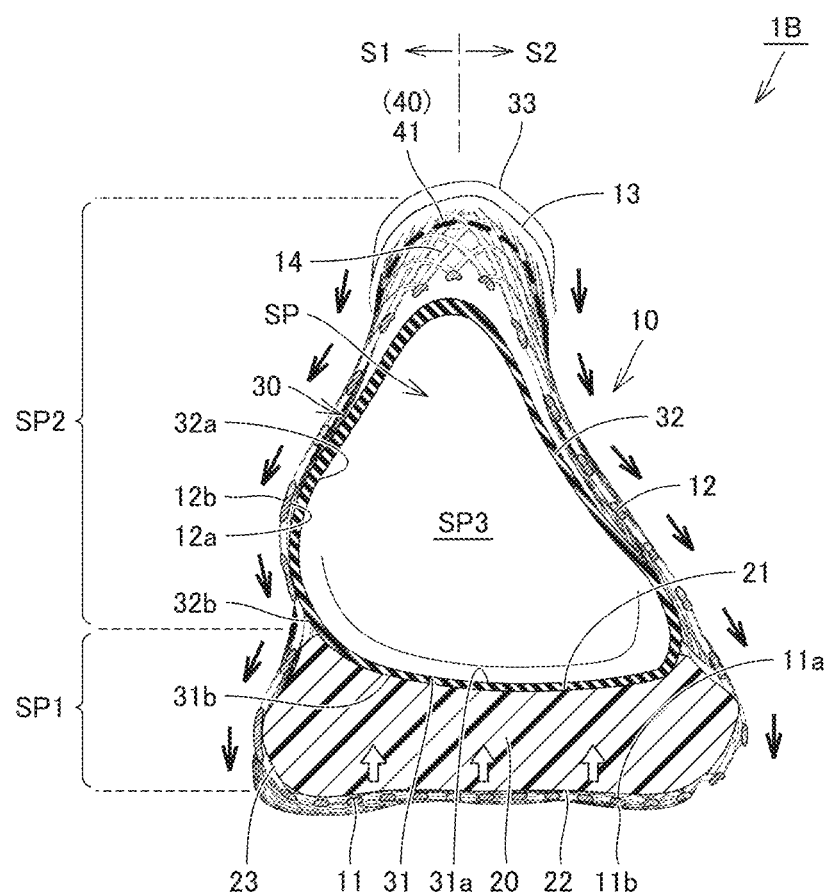
FIG. 29 is a cross-sectional view of the shoe shown in FIG. 27.
Figure 30:
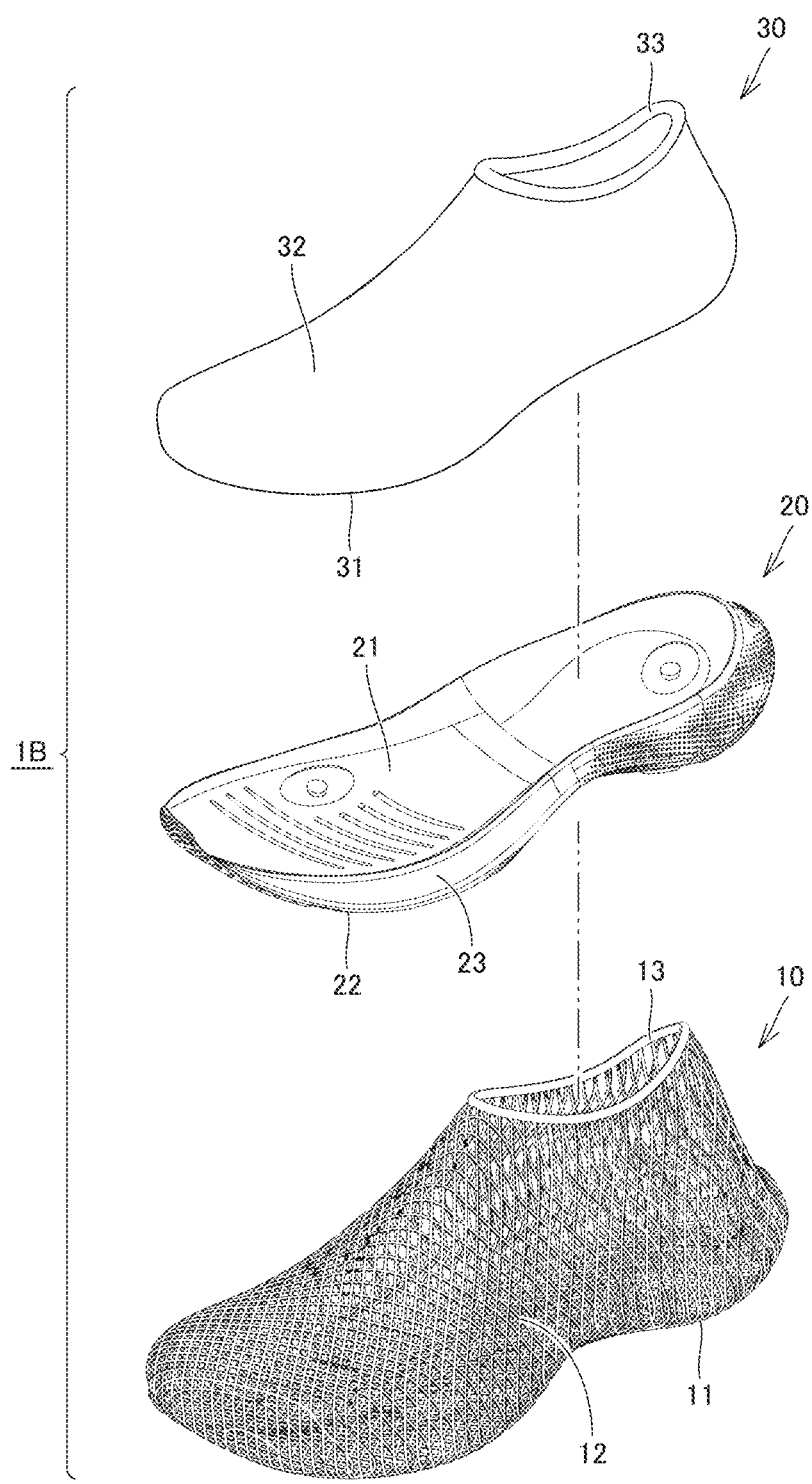
FIG. 30 is an exploded perspective view for illustrating a structure for assembling the shoe shown in FIG. 27.

FIG. 27 is a perspective view of a shoe according to a third embodiment and FIG. 28 is a perspective view of the shoe shown in FIG. 27, as seen in a different direction. FIG. 29 is a cross-sectional view taken along a line XXIX-XXIX indicated in FIG. 27 and FIG. 30 is an exploded perspective view for illustrating a structure for assembling the shoe shown in FIG. 27. Initially, a construction of a shoe 1B according to the present embodiment will be described with reference to FIGS. 27 to 30.

As shown in FIGS. 27 to 30, the shoe 1B according to the present embodiment is in the form of a sock substantially entirely covering a foot of a wearer (that is, a portion on the side of the distal end as seen at an ankle) and comprises the shell 10, the sole body 20, and the upper body 30. An upper portion of the shoe 1B is provided with the topline 33 through which the foot of the wearer is inserted, and the internal space SP (see FIG. 29) into which the foot of the wearer is inserted when the shoe 1B is worn is formed inside the shoe 1B.

For the shoe 1B according to the present embodiment, the sole body 20 is accommodated in the shell 10, and the upper body 30 is accommodated in the shell 10 so as to be located on the sole body 20. Thus, the sole body 20 is sandwiched between the shell 10 and the upper body 30. The shell 10, the sole body 20, and the upper body 30 are all located across the forefoot portion R1, the midfoot portion R2, and the rearfoot portion R3.

More specifically, the shell 10 constitutes an outermost shell of the shoe 1B, and is formed of a single flexible member in the form of a bag. The shell 10 includes the bottom wall portion 11 and the peripheral wall portion 12 erected to extend continuously upward from the peripheral edge of the bottom wall portion 11, and the bottom wall portion 11 defines an outermost surface located on a lower side of the shoe 1B in the vertical direction and the peripheral wall portion 12 defines an outermost surface of the shoe 1B located in the longitudinal direction and the lateral direction.

The bottom wall portion 11 has the inner surface 11a and the outer surface 1 lb serving as a pair of main surfaces, and the peripheral wall portion 12 has the inner surface 12a and the outer surface 12b serving as a pair of main surfaces. The shell 10 has the bottom wall portion 11 and the peripheral wall portion 12 composed of the meshy member 16a serving as the base structure portion 16, and accordingly, these portions of the shell 10 have numerous holes 14 formed to reach the inner surfaces 11a and 12a and the outer surfaces 11b and 12b.

The insertion portion 13 in the form of an opening is provided at the upper end of the peripheral wall portion 12. The insertion portion 13 is provided across the midfoot portion R2 and the rearfoot portion R3.

The shell 10 is similar in construction to the shell 10 that the shoe 1A according to the first embodiment described above comprises, and its material(s), the construction of the base structure portion 16, and the like are also similar to those of the shell 10 that the shoe 1A according to the first embodiment described above comprises. This shell 10, as well as the shell 10 that the shoe 1A according to the first embodiment described above comprises, can be made, for example, by injection molding, cast molding, or additive manufacturing using a three-dimensional additive manufacturing apparatus, and in particular, can be suitably made by additive manufacturing using the three-dimensional additive manufacturing apparatus.

As shown in FIG. 29, the internal space SP is formed in the shell 10. The internal space SP is defined by the inner surface 11a of the bottom wall portion 11 and the inner surface 12a of the peripheral wall portion 12, and communicates with the insertion portion 13 described above. The internal space SP is located across the forefoot portion R1, the midfoot portion R2, and the rearfoot portion R3. The internal space SP includes a space in which the sole body 20 and the upper body 30 are disposed as they are accommodated therein, and the insertion space SP3 that is a space in which a foot of the wearer is inserted.

As shown in FIGS. 27 to 30, the sole body 20 supports the sole of the foot of the wearer and is composed of an elastically deformable flat member (see FIG. 29). The sole body 20 is accommodated in the internal space SP of the shell 10.

The sole body 20 has the upper surface 21 and the lower surface 22 serving as a pair of main surfaces, and the side surface 23 interconnecting the upper surface 21 and the lower surface 22. The lower surface 22 of the sole body 20 faces the inner surface 11a of the bottom wall portion 11 of the shell 10, and the side surface 23 of the sole body 20 faces a portion of the inner surface 12a of the peripheral wall portion 12 of the shell 10 closer to a lower end. Thus, the sole body 20 covers the inner surface 11a of the bottom wall portion 11 of the shell 10 and the portion of the inner surface 12a of the peripheral wall portion 12 of the shell 10 closer to the lower end.

The sole body 20 is similar in construction to the sole body 20 that the shoe 1A according to the first embodiment described above comprises, and what material is used therefor and the like are also similar to those of the sole body 20 that the shoe 1A according to the first embodiment described above comprises.

The upper body 30 configures a portion of the shoe 1B that comes into contact with a foot of the wearer to hold the foot of the wearer, and is composed of a flexibly deformable bag-shaped member. The upper body 30 is accommodated in the internal space SP of the shell 10. The upper body 30 includes the bottom portion 31 and the wall portion 32 erected to extend continuously upward from the peripheral edge of the bottom portion 31.

The bottom portion 31 has the inner surface 31a and the outer surface 31b serving as a pair of main surfaces, and the wall portion 32 has the inner surface 32a and the outer surface 32b serving as a pair of main surfaces. The outer surface 31b of the bottom portion 31 of the upper body 30 faces the upper surface 21 of the sole body 20, and the outer surface 32b of the wall portion 32 of the upper body 30 faces a portion of the inner surface 12a of the peripheral wall portion 12 of the shell 10 excluding a side closer to the lower end. Thus, the bottom portion 31 covers the upper surface 21 of the sole body 20, and the wall portion 32 covers the portion of the inner surface 12a of the peripheral wall portion 12 of the shell 10 excluding the side closer to the lower end.

The upper body 30 is similar in construction to the upper body 30 that the shoe 1A according to the first embodiment described above comprises, and what material is used therefor and the like are also similar to those of the upper body 30 that the shoe 1A according to the first embodiment described above comprises.

As shown in FIG. 29, the above-mentioned internal space SP of the shell 10 is divided into the lower space SP1 and the upper space SP2. The lower space SP1 is located at a lower portion of the shoe 1B in the vertical direction, and the upper space SP2 is located at an upper portion of the shoe 1B in the vertical direction.

The lower space SP1 is a space defined by the bottom wall portion 11 and a portion of the peripheral wall portion 12 adjacent to the bottom wall portion 11 (that is, the first portion described above), and the entirety of the sole body 20 is disposed in the lower space SP1.

The upper space SP2 is a space defined by a portion of the peripheral wall portion 12 located above the first portion (that is, the second portion described above), and the entirety of the upper body 30 is disposed in the upper space SP2.

As described above, since the sole body 20 is accommodated in the internal space SP so as to cover the inner surface 11a of the bottom wall portion 11 of the shell 10 and a portion of the inner surface 12a of the peripheral wall portion 12 of the shell 10 closer to the lower end and the upper body 30 is accommodated in the internal space SP so as to cover the upper surface 21 of the sole body 20 and a portion of the inner surface 12a of the peripheral wall portion 12 of the shell 10 excluding the portion closer to the lower end, the insertion space SP3 defined by the upper body 30 will be formed in the internal space SP of the shell 10.

The insertion space SP3 is a space in which a foot of the wearer is inserted when the shoe is worn as has been set forth above, and more specifically, the insertion space SP3 is defined by the inner surface 31a of the bottom portion 31 of the upper body 30 and the inner surface 32a of the wall portion 32 of the upper body 30. The insertion space SP3 is included in the upper space SP2 of the internal space SP described above.

In the shoe 1B according to the present embodiment, the upper body 30 has a shape that entirely covers a portion of the foot of the wearer on the side of the distal end as seen at the ankle, and a portion of the shell 10 that forms the upper space SP2, at a portion other than that corresponding to the topline 33 through which the foot of the wearer is inserted, entirely covers a portion of the foot of the wearer excluding the sole of the foot of the wearer.

Therefore, when a user wears the shoe 1B, the foot of the wearer comes into contact with the inner surface 31a of the bottom portion 31 and the inner surface 32a of the wall portion 32 of the upper body 30 that can be deformed in a flexible manner. Therefore, the shell 10 does not come into direct contact with the foot of the wearer, thereby ensuring that the user wears the shoe comfortably.

It is not a requirement that the upper body 30 entirely comes into contact with the foot of the wearer, and the upper body 30 may be notched away or have a portion removed to have an opening insofar as the user can wear the shoe comfortably.

For the shoe 1B according to the present embodiment, as described above, an outermost shell of the shoe 1B is composed of the shell 10, and in particular, by covering the lower surface 22 of the sole body 20 with the bottom wall portion 11 of the shell 10, an outermost surface of the shoe 1B located on a lower side in the vertical direction is defined by the bottom wall portion 11 of the shell 10. Thus, the shoe 1B has a tread composed of the outer surface 11b of the bottom wall portion 11 of the shell 10.

Accordingly, by this construction, the sole body 20 does not form a tread, which significantly increases a room for selection of material for the sole body 20, and an optimal material can be selected for the sole body 20 for functions required for a general sole in view of improved foot comfort and ensured cushioning. Performance required for the tread, such as abrasion resistance and grip, can be ensured by selecting a material for the shell 10 or in addition selecting a shape therefor.

Further, for the shoe 1B according to the present embodiment, as described above, the outermost shell of the shoe 1B is composed of the shell 10, and the shell 10 includes the bottom wall portion 11 that defines the tread, and the peripheral wall portion 12 erected from the peripheral edge of the bottom wall portion 11 and including a portion that covers the instep of a foot of the wearer. By this construction, there is also an advantage in that the shoe presents higher performance than a conventional shoe having an outermost shell composed of a sole and an upper (that is, a shoe which does not comprise such a member as the shell 10 of the shoe 1B according to the present embodiment).

That is, the above-described conventional shoe is normally constructed such that the upper including a portion covering the instep of a foot of the wearer is composed only of a woven material, a knitted material, nonwoven fabric, or the like and furthermore, the upper is bonded or the like to the sole by adhesion or the like, and accordingly, a delay is easily caused in a period of time for which a load applied to the portion of the upper that covers the instep when the wearer of the shoe kicks the ground is transmitted to the sole via a side wall of the upper, and the shoe would poorly follow the foot for running or the like, in particular.

In contrast, the shoe 1B according to the present embodiment is constructed such that the peripheral wall portion 12 of the shell 10 including a portion covering the instep of the foot of the wearer is composed of a member composed of resin or rubber, similarly as described above for the first embodiment, and in addition, composed of a harder material than a woven material, a knitted material, nonwoven fabric, and the like, and furthermore, the peripheral wall portion 12 including the portion covering the instep and the bottom wall portion 11 including a portion defining the tread are integrally composed of the shell 10 composed of a single member. This allows a load applied when kicking the ground to be transmitted faster, and the shoe can thus excellently follow the foot for running, in particular. A direction in which the shell 10 transmits a load is schematically indicated in FIG. 29 by solid arrows, and a direction of a load thereby applied to the bottom wall portion 11 of the shell 10 is schematically indicated in FIG. 29 by blank arrows.

The shoe 1B according to the present embodiment is provided with the sewn portion 41 as the fixed portion 40 where the shell 10 and the upper body 30 are partially fixed. The sewn portion 41 is provided in the portion of the shell 10 adjacent to the topline 33 through which the foot of the wearer is inserted, and more specifically, it is located to surround the topline 33 in the vicinity of the upper end of the peripheral wall portion 12 of the shell 10.

The sewn portion 41 is formed such that the shell 10 and the upper body 30 layered on each other are sewn by alternate passage of thread therethrough. Thus, in the portion adjacent to the topline 33, the upper body 30 is immovably fixed to the shell 10.

According to such a construction, the upper body 30 can be fixed to the shell 10 and position displacement of the upper body 30 from the shell 10 can be prevented, without bonding the shell 10 and the upper body 30 to each other in their entirety with an adhesive. Therefore, poor fit can be suppressed and a function as the shoe can be prevented from being impaired.

When the construction is adopted, as compared with bonding between the shell 10 and the upper body 30 in their entirety with the adhesive, a tact time required for manufacturing can significantly be reduced, and furthermore, the manufacturing process is also simplified. Therefore, the shoe free from poor fit or impairment of the function as the shoe can relatively readily be manufactured in a short period of time.

In the shoe 1B according to the present embodiment, the upper body 30 is in the form of the bag as described above. Therefore, by providing the sewn portion 41 in the portion of the shell 10 adjacent to the topline 33 through which the foot of the wearer is inserted, it is not basically necessary to fix the shell 10 and the upper body 30 in another portion or to additionally fix them in that portion further with other means. The shell 10 and the upper body 30, however, may further be sewn in a portion other than the portion above, or so long as joint is partial, the shell 10 and the upper body 30 may be joined to each other with an adhesive in the above-mentioned portion or in a portion other than that portion. Furthermore, in the above-mentioned portion or in a portion other than that, the shell 10 and the upper body 30 may be fixed to each other by other means such as welding.

Figure 31:
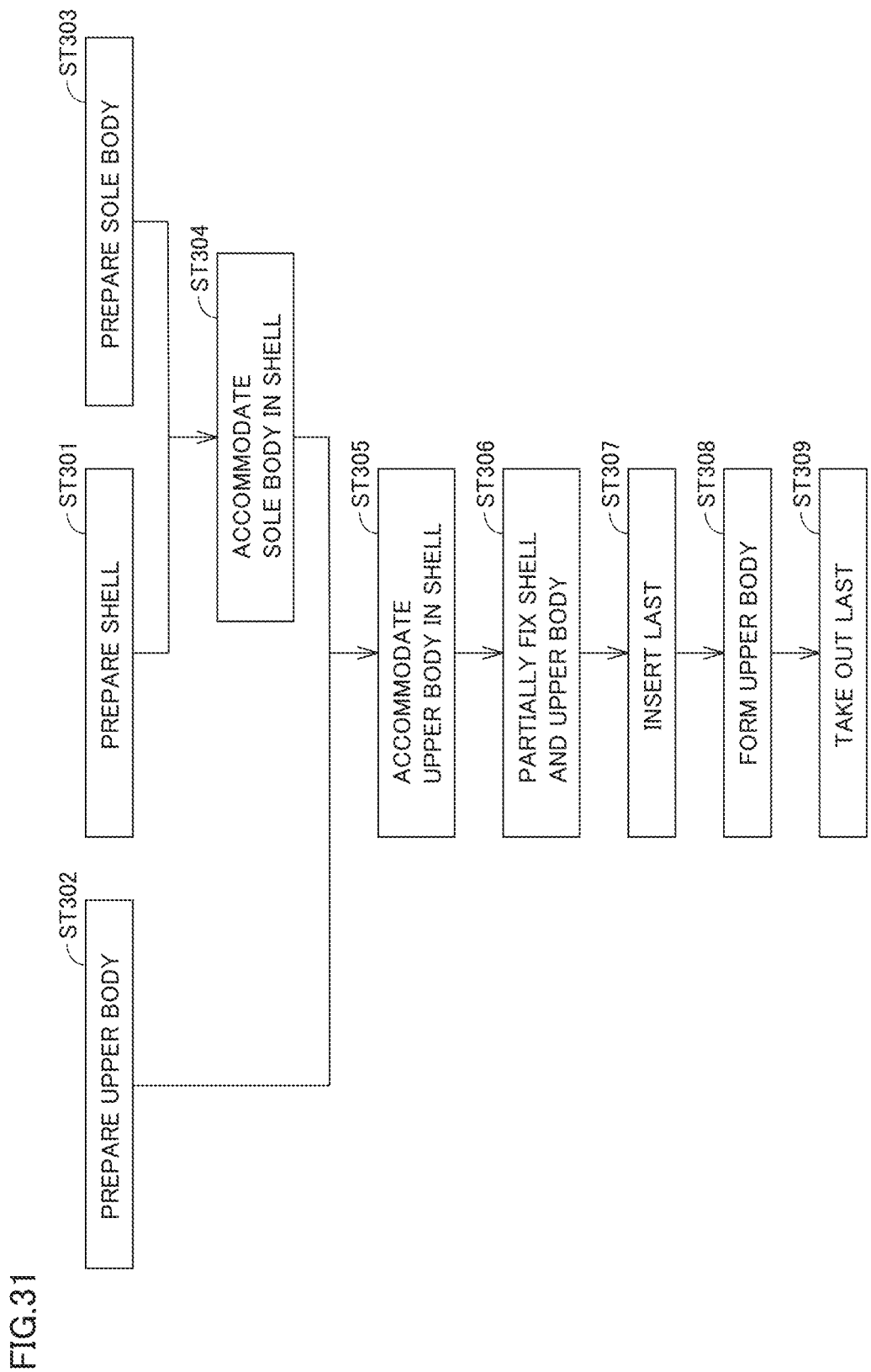
FIG. 31 is a flowchart showing a method of manufacturing a shoe according to the third embodiment.

FIG. 31 is a flowchart showing a method of manufacturing a shoe according to the third embodiment. FIGS. 32A, 32B, 33A, 33B, 34, 35A, 35B, and 36 are schematic diagrams showing some steps in a manufacturing flow shown in FIG. 31. The method of manufacturing a shoe according to the present embodiment will now be described with reference to FIGS. 31 to 36. In FIGS. 32A, 32B, 33A, 33B, 34, 35A, 35B, and 36, for distinction of the upper body between before and after forming by heating which will be described later, the yet-to-be-formed upper body has the reference numeral 30' allotted and the formed upper body has the reference numeral 30 allotted.

As shown in FIG. 31, in manufacturing the shoe 1B according to the present embodiment, initially, in step ST301, the shell 10 is prepared. Though the shell 10 may be made with any method, it is preferably made by additive manufacturing using a three-dimensional additive manufacturing apparatus described above. When the shell 10 is made by additive manufacturing using the three-dimensional additive manufacturing apparatus, the shape of the shell 10 to be made is further preferably determined based on foot shape data obtained by measuring the foot of the wearer. Fit of the manufactured shoe 1B to the foot of the wearer is thus further enhanced.

Then, in step ST302, the upper body 30' is prepared. Though the upper body 30' may be made with any method, for example, the upper body 30' in a form of a bag provided with an opening in a portion corresponding to the topline 33 can readily be made by rolling and sewing a sheet made from a woven material, a knitted material, nonwoven fabric, or the like of heat-shrinkable synthetic fibers.

Then, in step ST303, the sole body 20 is prepared. Though the sole body 20 may be made with any method, the sole body can be made, for example, by injection molding or press forming.

The shell 10, the upper body 30', and the sole body 20 may be made in any order or simultaneously in parallel. Furthermore, a plurality of shells, a plurality of upper bodies, and a plurality of sole bodies may be placed in stock in advance for each size, and one with an optimal size may be selected from among them and used as necessary.

Figure 32A:
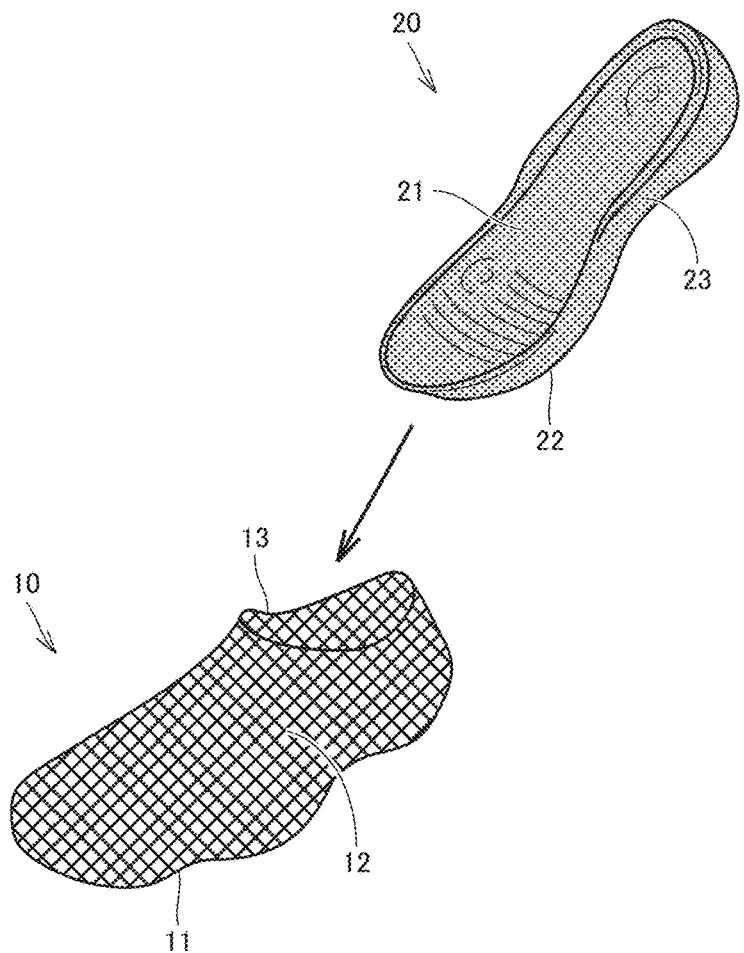
FIGS. 32A and 32B are schematic diagrams showing the step of accommodating the sole body in the shell in the manufacturing flow shown in FIG. 31.
Figure 32B:
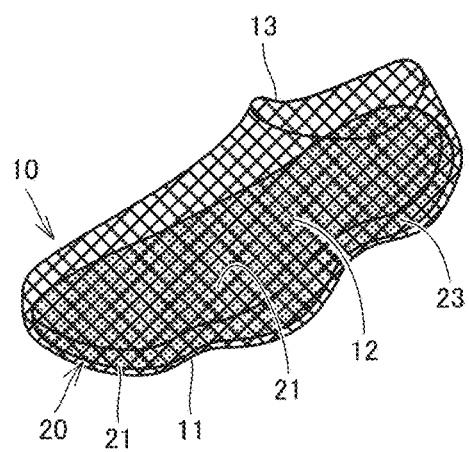

Then, as shown in FIGS. 31, 32A, and 32B, in step ST304, the sole body 20 is accommodated in the shell 10. Specifically, as shown in FIG. 32A, the sole body 20 is inserted in the internal space SP of the shell 10.

Since the shell 10 is flexible, the sole body 20 can be inserted in the internal space SP of the shell 10 through the insertion portion 13 provided in the shell 10. Thus, the lower surface 22 and the side surface 23 of the sole body 20 are arranged to extend along the inner surfaces 11*a* and 12*a* of the shell 10.

As shown in FIG. 32B, the sole body 20 is thus accommodated in the shell 10.

Figure 33A:
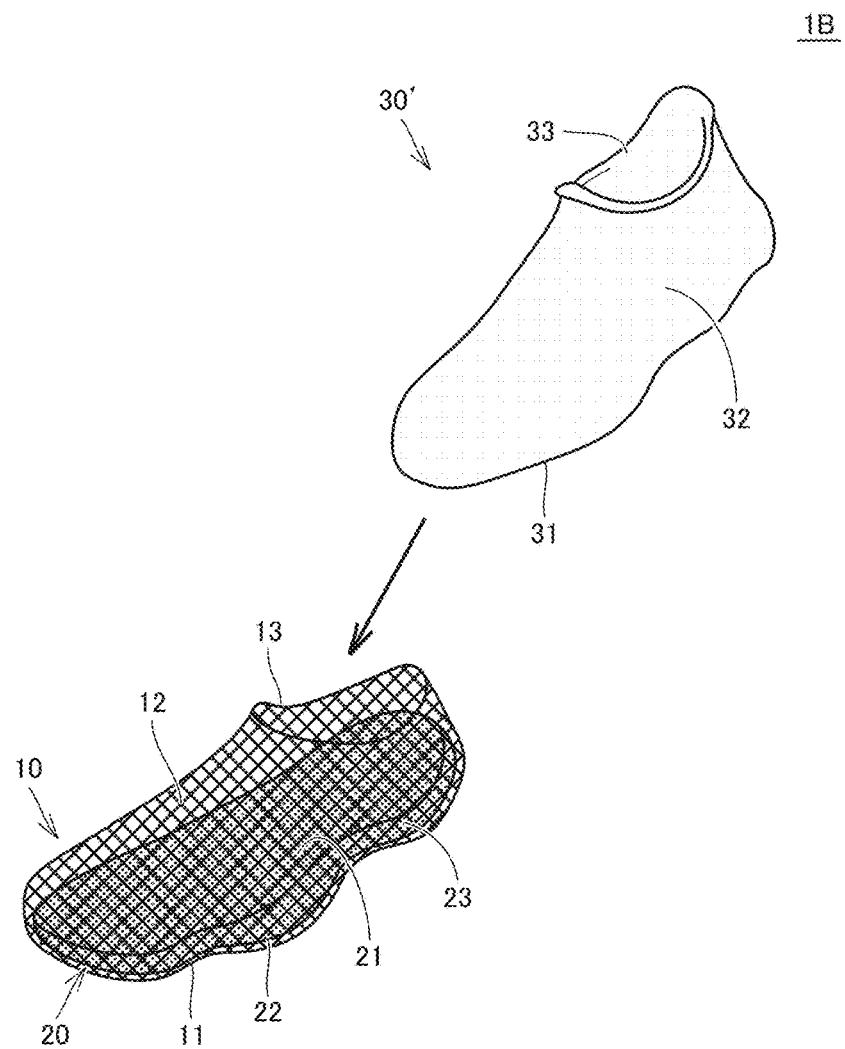
FIGS. 33A and 33B are schematic diagrams showing the step of accommodating the upper body in the shell in the manufacturing flow shown in FIG. 31.
Figure 33B:
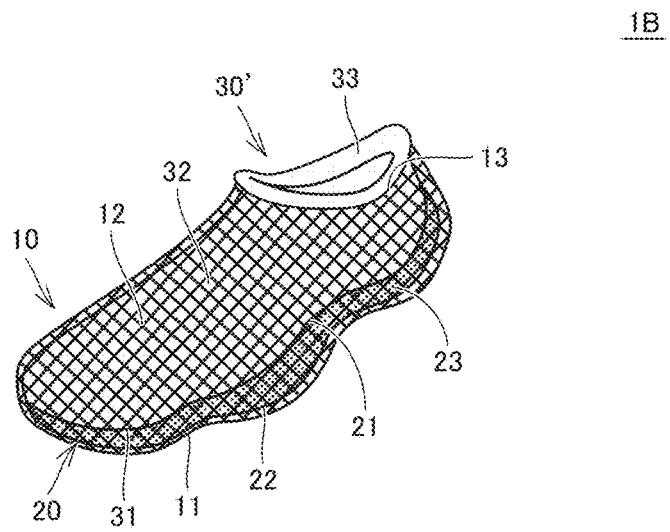

Then, as shown in FIGS. 31, 33A, and 33B, in step ST305, the upper body 30' is accommodated in the shell 10. Specifically, as shown in FIG. 33A, the upper body 30' is inserted in the internal space SP of the shell 10.

Since the upper body 30' is flexibly deformable, the upper body can be inserted in the internal space SP of the shell 10 through the insertion portion 13 in the form of the opening provided at the upper end of the shell 10. The inserted upper body 30' is arranged to extend along the upper surface 21 of the sole body 20 and the inner surface 12a of the shell 10. The vicinity of the topline 33 of the upper body 30' is exposed to the outside through the insertion portion 13 of the shell 10.

As shown in FIG. 33B, the upper body 30' is thus accommodated in the shell 10 and the sole body 20 is sandwiched between the upper body 30' and the shell 10 in the inside of the shell 10.

Figure 34:
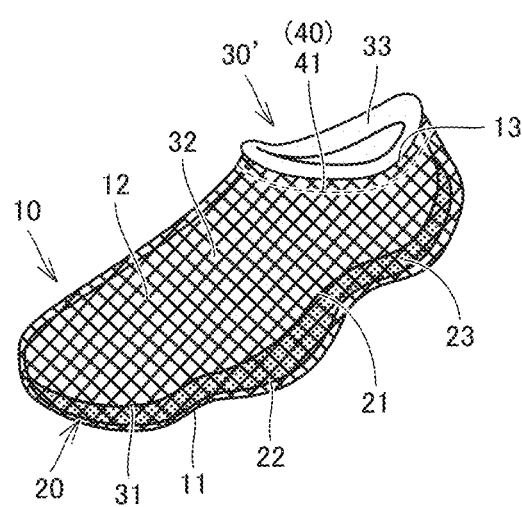
FIG. 34 is a schematic diagram showing the step of partially fixing the shell and the upper body in the manufacturing flow shown in FIG. 31.

Then, as shown in FIGS. 31 and 34, in step ST306, the shell 10 and the upper body 30' are partially fixed. Specifically, as shown in FIG. 34, in a portion of the shell 10 and the upper body 30' layered on each other, which is adjacent to the topline 33 as surrounding the topline 33, the sewn portion 41 as the fixed portion 40 where the shell and the upper body are fixed is provided to partially fix the shell 10 and the upper body 30'.

Figure 35A:
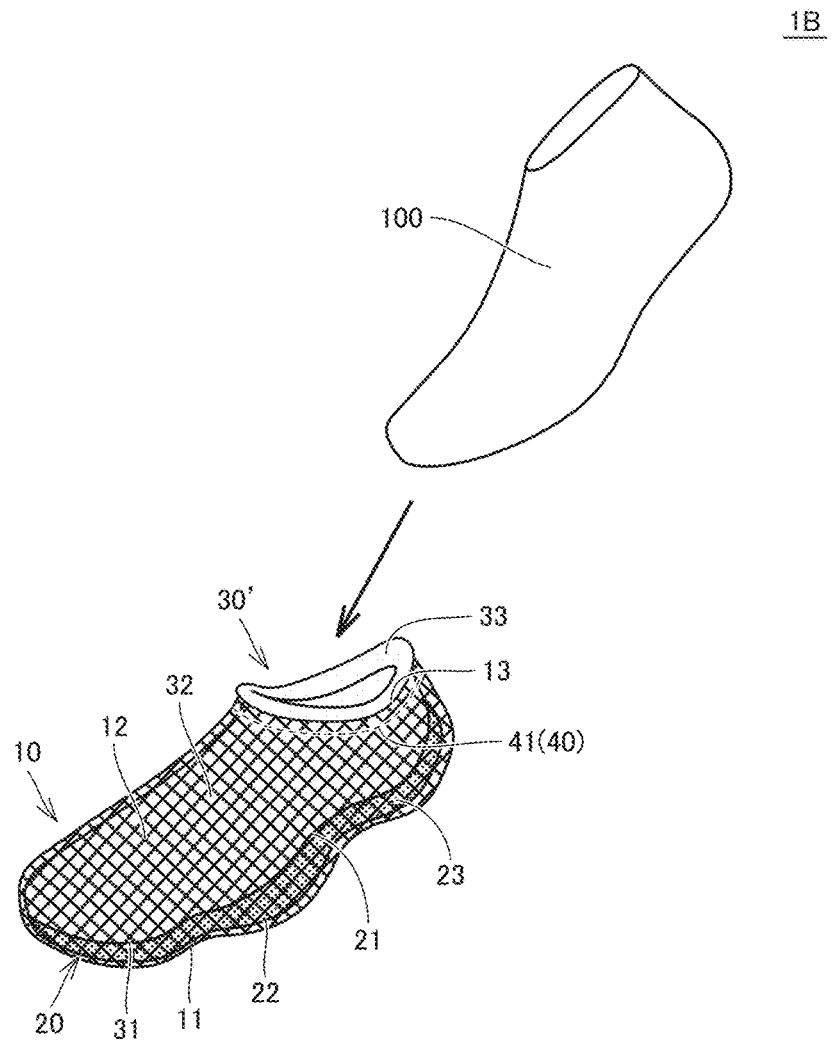
FIGS. 35A and 35B are schematic diagrams showing the step of inserting the last in the manufacturing flow shown in FIG. 31.
Figure 35B:
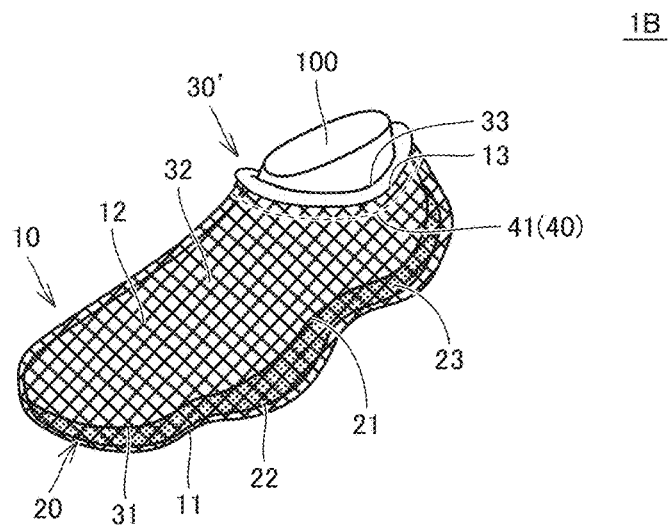

Then, as shown in FIGS. 31, 35A, and 35B, in step ST307, the last 100 is inserted. Specifically, as shown in FIG. 35A, the last 100 is inserted in the inside of the upper body 30' accommodated in the internal space SP of the shell 10.

The shell 10 is flexible and the upper body 30' is flexibly deformable. Therefore, the last 100 can be inserted in the inside of the upper body 30' through the topline 33 provided in the upper body 30'. The inner surfaces 31a and 32a of the upper body 30' are thus arranged to extend along the surface of the last 100.

Thus, as shown in FIG. 35B, the last 100 is located in the inside of the upper body 30' accommodated in the internal space SP of the shell 10.

Use of a last made based on foot shape data obtained by measuring the foot of the wearer as the last 100 allows the manufactured shoe 1B to further better fit the foot of the wearer. In addition, a last of a standard shape corresponding to the size of the foot of the wearer may be employed as the last 100.

Then, as shown in FIG. 31, in step ST308, the upper body 30' is formed. Specifically, the sole body 20 and the upper body 30' are accommodated in the shell 10, the shell 10 and the upper body 30' are partially fixed, and, the upper body 30' is formed by being heated to a prescribed temperature with the last 100 being located in the upper body 30' accommodated in the shell 10 (that is, the state shown in FIG. 35B).

Since the upper body 30' is heat-shrinkable as described above, at this time, the upper body 30' is thermally shrunk as a whole by this heating. With this deformation by heat-shrinkage, the outer surfaces 31b and 32b of the formed upper body 30 have the outer geometry in conformity with the upper surface 21 of the sole body 20 and the inner surface 12a of the shell 10 and the inner surfaces 31a and 32a of the formed upper body 30 have the inner geometry in conformity with the surface of the last 100.

As described above, when a last made based on foot shape data obtained by measuring the foot of the wearer is employed as the last 100, the inner surfaces 31a and 32a of the formed upper body 30 are substantially in conformity with the outer contour of the foot of the wearer, and hence fit of the manufactured shoe 1B to the foot of the wearer is particularly enhanced.

Figure 36:
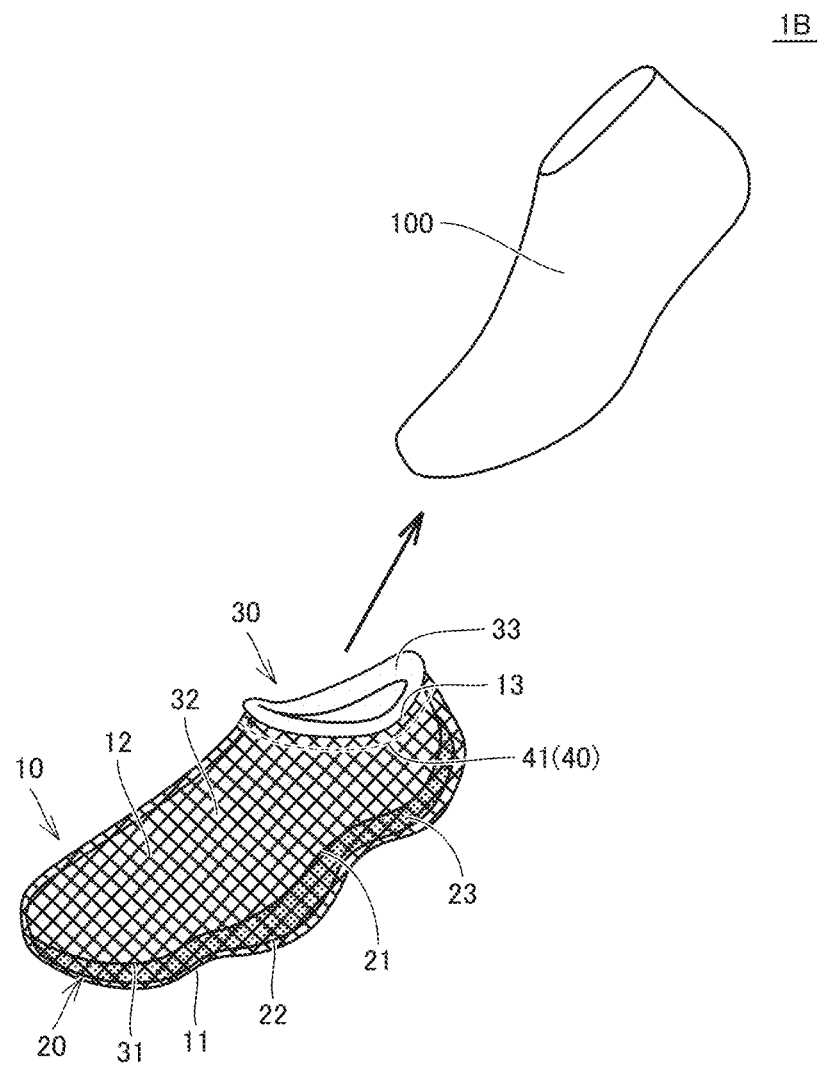
FIG. 36 is a schematic diagram showing the step of taking out the last in the manufacturing flow shown in FIG. 31.

Then, as shown in FIGS. 31 and 36, in step ST309, the last 100 is taken out. Specifically, as shown in FIG. 36, the last 100 is taken out of the inside of the upper body 30 accommodated in the internal space SP of the shell 10.

The shell 10 is flexible and the upper body 30 is flexibly deformable. Therefore, the last 100 can be taken out of the upper body 30 through the topline 33 provided in the upper body 30.

Through the procedure above, assembly of the shell 10, the sole body 20, and the upper body 30 is completed and thus manufacturing of the shoe I B according to the present embodiment described above is completed.

Thus, according to the method of manufacturing a shoe according to the present embodiment, the shoe 1B can be manufactured through very simplified works to assemble the shell 10, the sole body 20, and the upper body 30' individually made in advance. Therefore, with the shoe 1B according to the present embodiment, not only poor fit or impairment of the function as the shoe due to position displacement of the upper body 30 from the shell 10 can be prevented but also the shoe 1B can be manufactured readily in a short period of time.

Though an example in which the sole body 20 and the upper body 30 are not fixed with special fixing means is illustrated and described in the method of manufacturing a shoe according to the present embodiment above, they may be fixed with fixing means as necessary. For fixing, for example, sewing, bonding, welding, clipping, or engagement by engaging portions provided in the sole body 20 and the upper body 30 can be used.

In the step of forming the upper body 30 described above, the upper body should only be formed such that the formed upper body 30 has at least any of the outer geometry in conformity with the shell 10 and the sole body 20 and the inner geometry in conformity with the last 100, and the upper body does not necessarily have to be formed such that the formed upper body 30 has both of the outer geometry in conformity with the shell 10 and the sole body 20 and the inner geometry in conformity with the surface of the last 100 as described above.

Third and Fourth Modifications

In the method of manufacturing a shoe according to the third embodiment of the present invention described above, the step of forming the upper body is performed by heating the upper body 30' with the sole body 20 and the upper body 30' being accommodated in the inside of the shell 10. Therefore, when unallowable deformation or deterioration may be caused in the sole body 20 by heating, the manufacturing method cannot be applied as it is. A method of manufacturing a shoe according to each of third and fourth modifications which will be described below solves such a problem by performing the step of accommodating the sole body in the shell after the step of forming the upper body, although the method of manufacturing a shoe according to the third embodiment described above is basically adopted.

Figure 37:
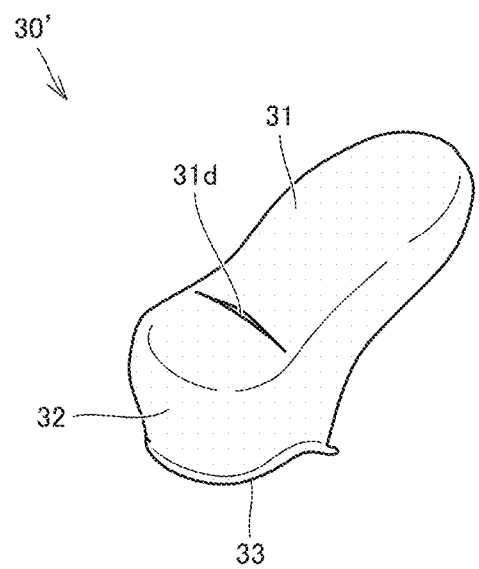
FIG. 37 is a schematic diagram showing another example of the step of preparing the upper body in the manufacturing flow shown in FIG. 31.
Figure 38:
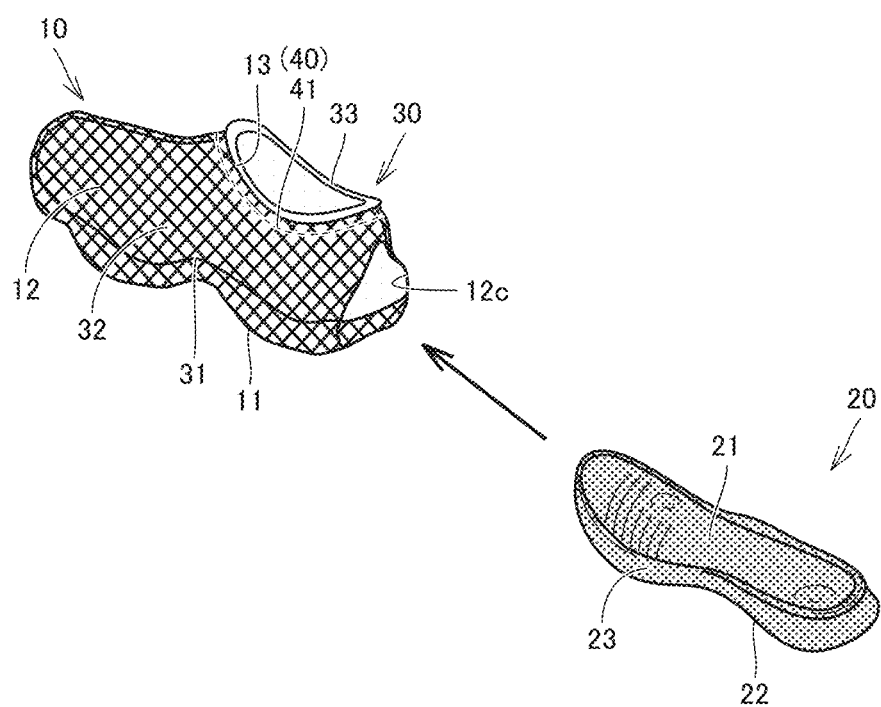
FIG. 38 is a schematic diagram showing yet another example of the step of accommodating the sole body in the shell in the manufacturing flow shown in FIG. 31.

FIG. 37 is a schematic diagram showing another example of some steps in the manufacturing flow shown in FIG. 31 for illustrating the method of manufacturing a shoe according to the third modification, and FIG. 38 is a schematic diagram showing yet another example of some steps in the manufacturing flow shown in FIG. 31 for illustrating the method of manufacturing a shoe according to the fourth modification. Shoes 1B1 and 1B2 and the method of manufacturing the same according to each of the third and fourth modifications will be described below with reference to FIGS. 37 and 38.

In the method of manufacturing a shoe according to each of the third and fourth modifications, unlike the method of manufacturing a shoe according to the third embodiment described above, the step of accommodating the sole body in the shell (the step ST304 shown in FIG. 31) is performed after the step of forming the upper body (the step ST308 shown in FIG. 31) (more specifically speaking, after the step of taking out the last (the step ST309 shown in FIG. 31).

In the method of manufacturing a shoe according to the third modification, as shown in FIG. 37, in the step of preparing the upper body (the step ST302 shown in FIG. 31), a cut 31d like a slit that extends along the lateral direction is provided in the bottom portion 31 of the upper body 30' in the form of the bag provided with the opening in the portion corresponding to the topline 33.

Then, after the step of taking out the last (the step ST309 shown in FIG. 31), the sole body 20 is inserted below the upper body 30 in the inside of the shell 10 through the topline 33 provided at the upper end of the wall portion 32 of the upper body 30 and the cut 31d provided in the bottom portion 31 of the upper body 30.

In the method of manufacturing a shoe according to the fourth modification, as shown in FIG. 38, in the step of preparing the shell (the step ST301 shown in FIG. 31), an additional insertion portion 12c in a form of an opening is provided in advance in a portion of the peripheral wall portion 12 of the shell 10 located at a rear end in the longitudinal direction.

Then, after the step of taking out the last (the step ST309 shown in FIG. 31), the sole body 20 is inserted below the upper body 30 in the inside of the shell 10 through the additional insertion portion 12c provided in the peripheral wall portion 12 of the shell 10.

Since the step of accommodating the sole body in the shell is thus performed after the step of forming the upper body, the sole body is not heated. Therefore, the method of manufacturing a shoe according to each of the third and fourth modifications is particularly suitable when unallowable deformation or deterioration may be caused in the sole body 20 due to heating.

In the method of manufacturing a shoe according to each of the third and fourth modifications, the upper body 30' is formed without the sole body 20 being accommodated in the internal space SP of the shell 10. Therefore, as in the method of manufacturing a shoe according to the second modification described above, in forming the upper body 30', the last member 200 with the outer geometry in conformity with the outer geometry of the sole body 20 is preferably inserted in a portion in the internal space SP of the shell 10 where the sole body 20 is accommodated. The last member 200 and the last 100, however, do not necessarily have to be members separate from each other as in the method of manufacturing a shoe according to the second modification described above, and a body obtained by integrating the last member and the last may be employed.

Fourth Embodiment

Figure 39:
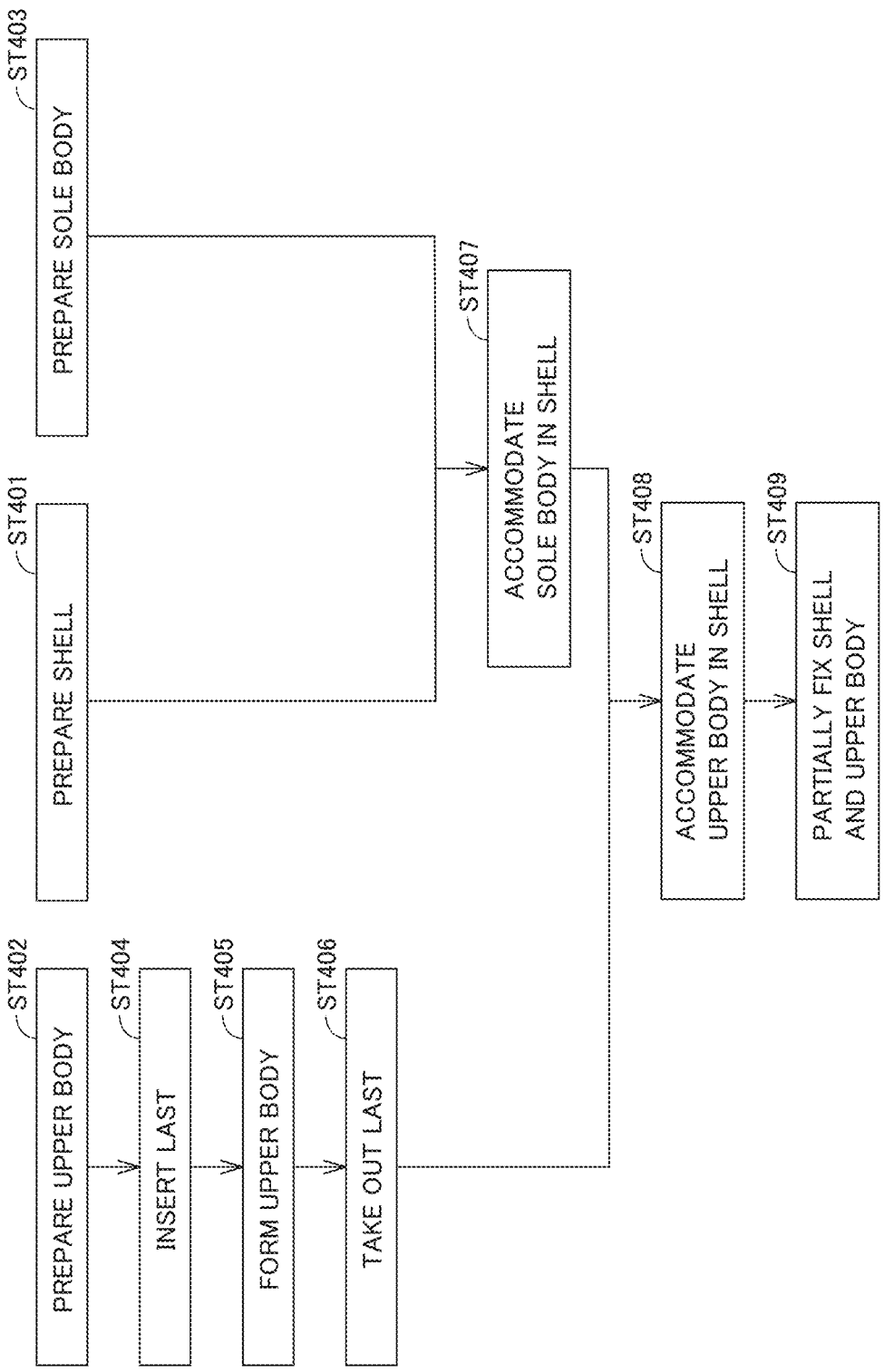
FIG. 39 is a flowchart showing a method of manufacturing a shoe according to a fourth embodiment.

FIG. 39 is a flowchart showing a method of manufacturing a shoe according to a fourth embodiment. FIGS. 40A, 40B, 41, 42A, 42B, 43A, 43B, and 44 are schematic diagrams showing some steps in a manufacturing flow shown in FIG. 39, The method of manufacturing a shoe according to the present embodiment will be described below with reference to FIGS. 39 to 44. In FIGS. 40A, 40B, 41, 42A, 42B, 43A, 43B, and 44, for distinction of the upper body between before and after forming by heating which will be described later, the yet-to-be-formed upper body has the reference numeral 30' allotted and the formed upper body has the reference numeral 30 allotted.

Though the method of manufacturing a shoe according to the present embodiment is different from the method of manufacturing a shoe according to the third embodiment described above in the order of some steps, a shoe manufactured in accordance with the manufacturing method is also substantially similar to the shoe 1B according to the third embodiment described above. In the method of manufacturing a shoe according to the third embodiment described above, the step of forming the upper body is performed by heating the upper body 30' with the sole body 20 and the upper body 30' being accommodated in the inside of the shell 10. In the method of manufacturing a shoe according to the present embodiment, however, this step is performed before the step of accommodating the upper body in the shell. Therefore, the method of manufacturing a shoe according to the present embodiment is particularly suitable for an example in which unallowable deformation or deterioration may be caused in the shell 10 and/or the sole body 20 by heating.

As shown in FIG. 39, in the method of manufacturing a shoe according to the present embodiment, initially, in steps ST401 to ST403, the shell 10, the upper body 30', and the sole body 20 are prepared. The steps ST401 to ST403 are similar to the steps ST301 to ST303 in the method of manufacturing a shoe according to the third embodiment described above.

Figure 40A:
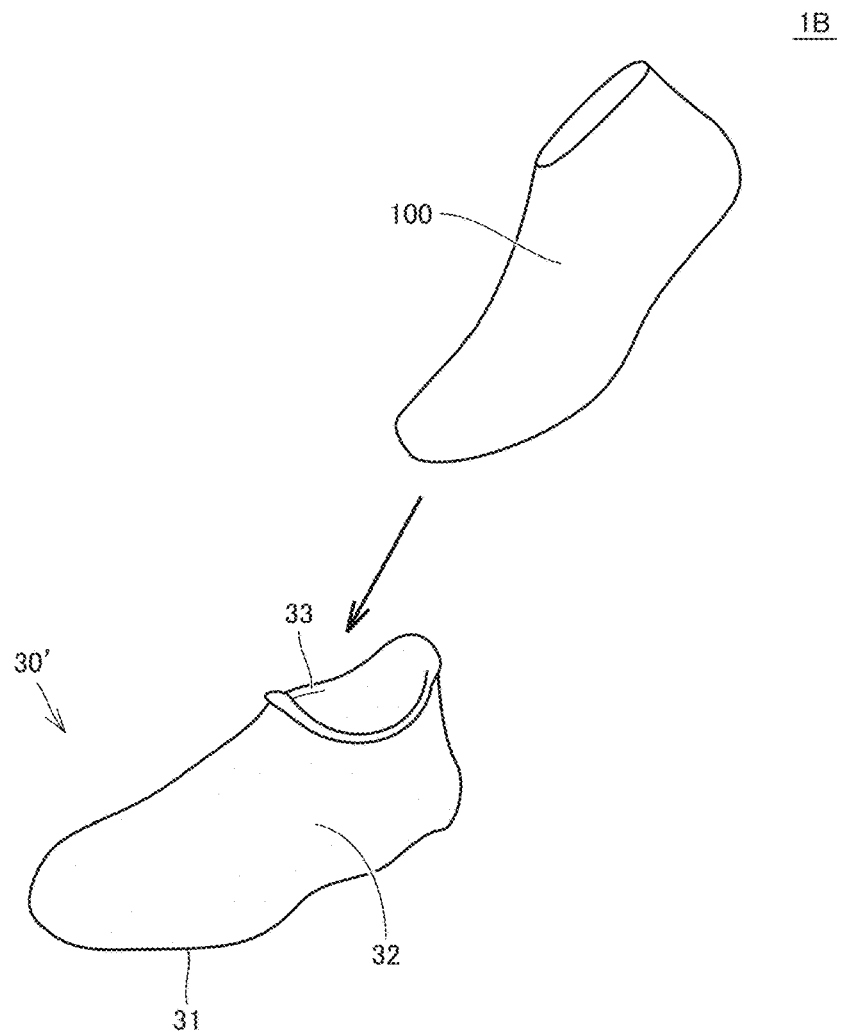
FIGS. 40A and 40B are schematic diagrams showing the step of inserting the last in the manufacturing flow shown in FIG. 39.
Figure 40B:
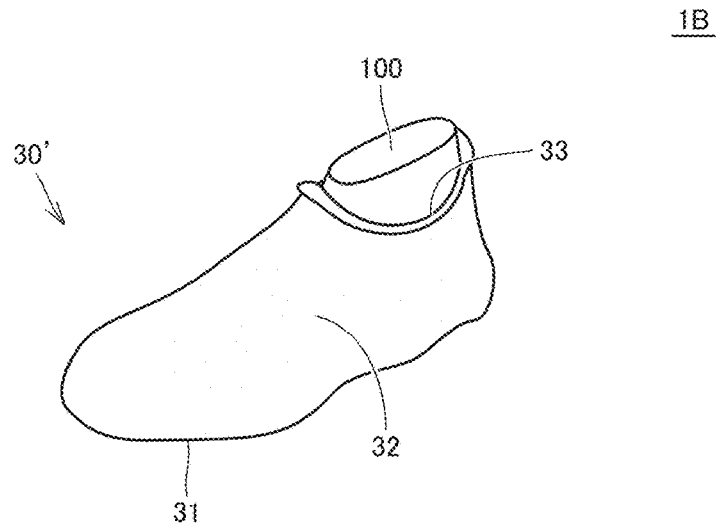

Then, as shown in FIGS. 39, 40A, and 40B, in step ST404, the last 100 is inserted. Specifically, as shown in FIG. 40A, the last 100 is inserted in the inside of the upper body 30'.

Since the upper body 30' is flexibly deformable, the last 100 can be inserted in the inside of the upper body 30' through the topline 33 provided in the upper body 30'. The inner surfaces 31a and 32a of the upper body 30' are thus arranged to extend along the surface of the last 100.

Use of a last made based on foot shape data obtained by measuring the foot of the wearer as the last 100 allows the manufactured shoe 1B to further better fit the foot of the wearer. In addition, a last of a standard shape corresponding to the size of the foot of the wearer may be employed as the last 100.

As shown in FIG. 40B, the last 100 is thus located in the inside of the upper body 30'.

Then, as shown in FIG. 39, in step ST405, the upper body 30' is formed. Specifically, the upper body 30' is formed by being heated to a prescribed temperature with the last 100 being located in the upper body 30' (that is, the state shown in FIG. 40B).

Since the upper body 30' is heat-shrinkable as described above, at this time, the upper body 30' is thermally shrunk as a whole by this heating. With this deformation by heat-shrinkage, the inner surfaces 31a and 32a of the formed upper body 30 have the inner geometry in conformity with the surface of the last 100.

As described above, when a last made based on foot shape data obtained by measuring the foot of the wearer is employed as the last 100, the inner surfaces 31a and 32a of the formed upper body 30 are substantially in conformity with the outer contour of the foot of the wearer, and hence fit of the manufactured shoe 1B to the foot of the wearer is particularly enhanced.

Figure 41:
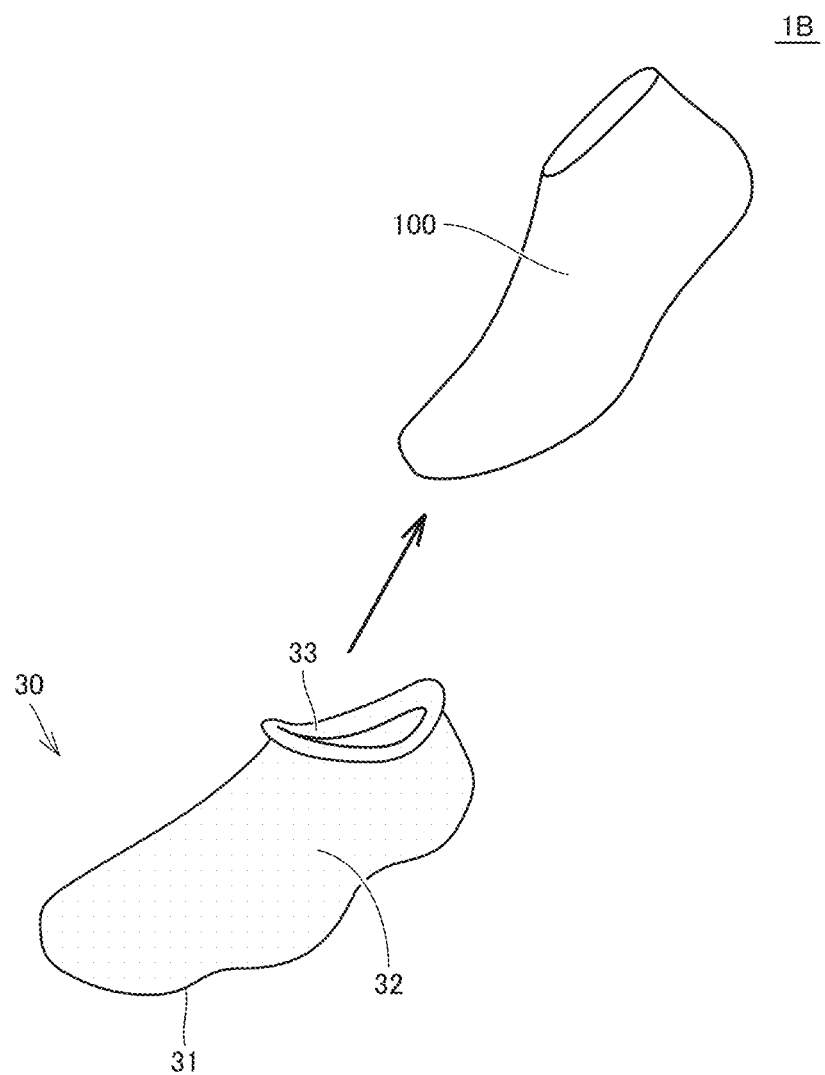
FIG. 41 is a schematic diagram showing the step of taking out the last in the manufacturing flow shown in FIG. 39.

Then, as shown in FIGS. 39 and 41, in step ST406, the last 100 is taken out. Specifically, as shown in FIG. 41, the last 100 is taken out of the inside of the upper body 30.

Since the upper body 30 is flexibly deformable, the last 100 can be taken out of the upper body 30 through the topline 33 provided in the upper body 30.

Figure 42A:
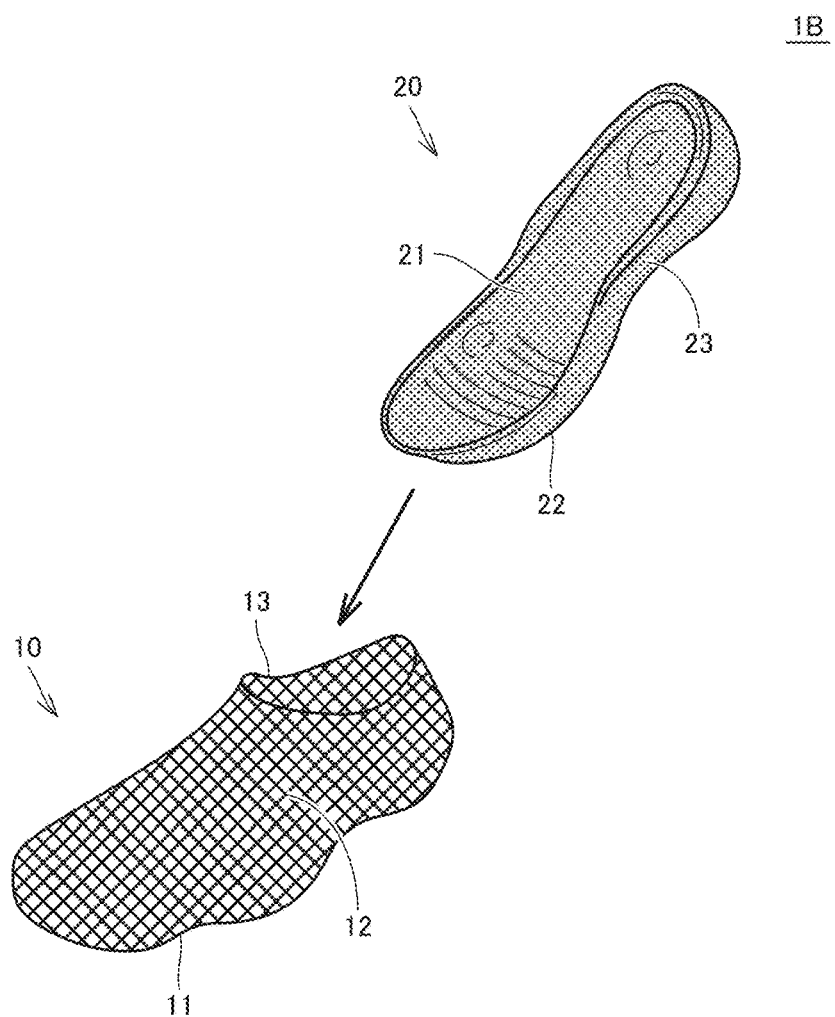
FIGS. 42A and 42B are schematic diagrams showing the step of accommodating the sole body in the shell in the manufacturing flow shown in FIG. 39.
Figure 42B:
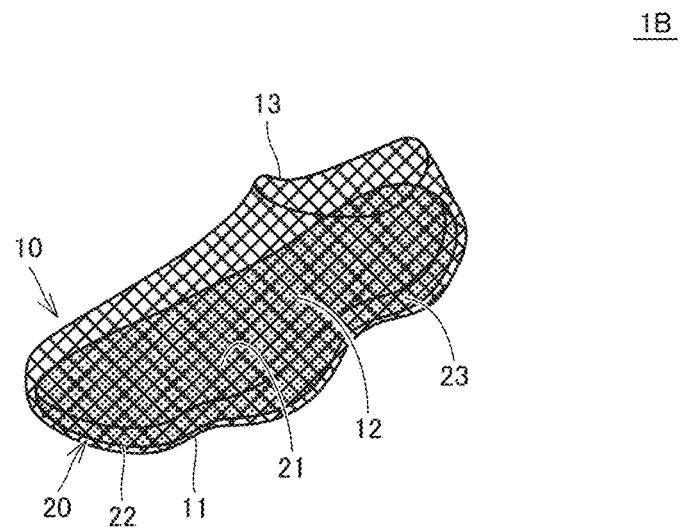

Then, as shown in FIGS. 39, 42A, and 42B, in step ST407, the sole body 20 is accommodated in the shell 10. Specifically, as shown in FIG. 42A, the sole body 20 is inserted in the internal space SP of the shell 10.

Since the shell 10 is flexible, the sole body 20 can be inserted in the internal space SP of the shell 10 through the insertion portion 13 provided in the shell 10. Thus, the lower surface 22 and the side surface 23 of the sole body 20 are arranged to extend along the inner surfaces 11a and 12a of the shell 10.

As shown in FIG. 42B, the sole body 20 is thus accommodated in the shell 10.

Figure 43A:
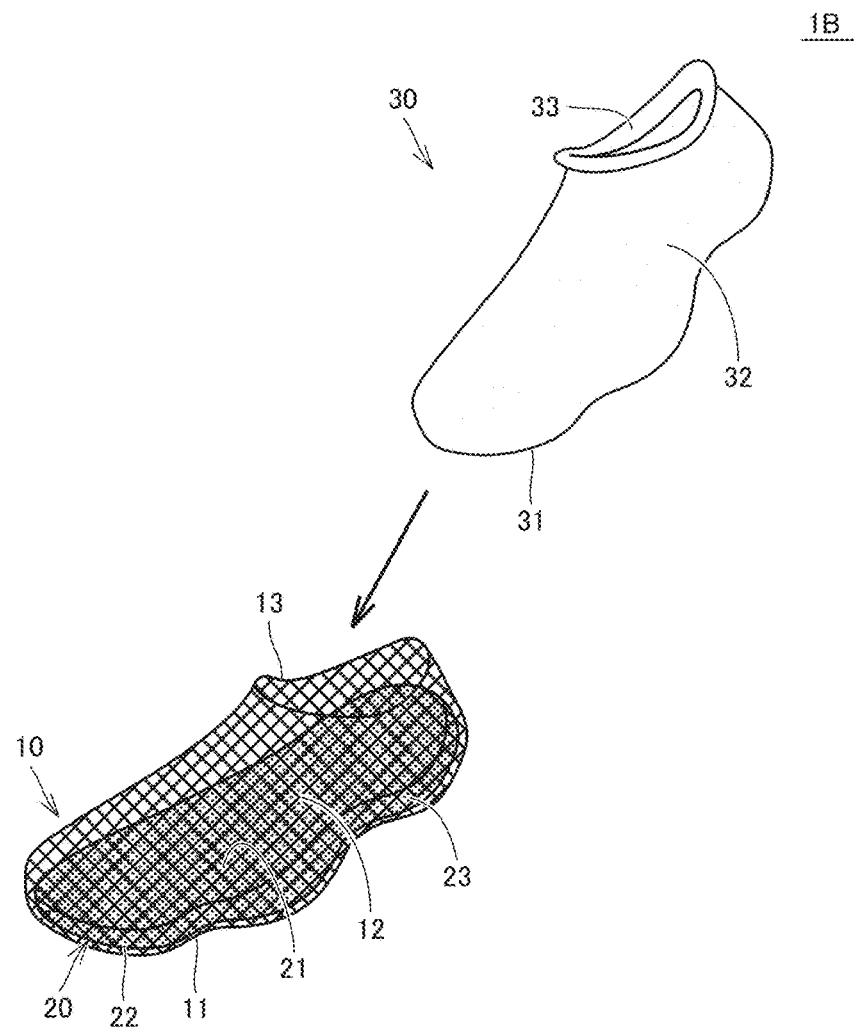
FIGS. 43A and 43B are schematic diagrams showing the step of accommodating the upper body in the shell in the manufacturing flow shown in FIG. 39.
Figure 43B:
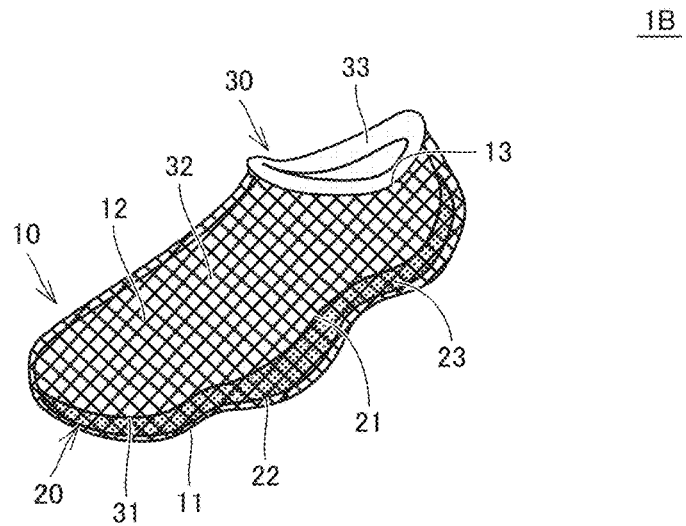

Then, as shown in FIGS. 39, 43A, and 43B, in step ST408, the upper body 30 is accommodated in the shell 10. Specifically, as shown in FIG. 43A, the upper body 30 is inserted in the internal space SP of the shell 10.

Since the upper body 30 is flexibly deformable, the upper body can be inserted in the internal space SP of the shell 10 through the insertion portion 13 in the form of the opening provided at the upper end of the shell 10. The inserted upper body 30 is arranged to extend along the upper surface 21 of the sole body 20 and the inner surface 12a of the shell 10. The vicinity of the topline 33 of the upper body 30 is exposed to the outside through the insertion portion 13 of the shell 10.

As shown in FIG. 43B, the upper body 30 is thus accommodated in the shell 10 and the sole body 20 is sandwiched between the upper body 30 and the shell 10 in the inside of the shell 10.

Figure 44:
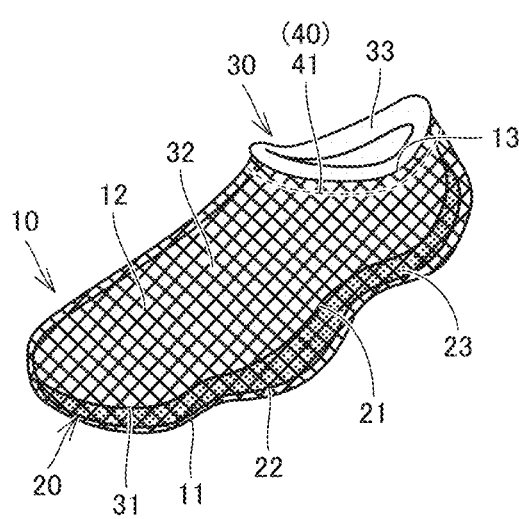
FIG. 44 is a schematic diagram showing the step of partially fixing the shell and the upper body in the manufacturing flow shown in FIG. 39.

Then, as shown in FIGS. 39 and 44, in step ST409, the shell 10 and the upper body 30 are partially fixed. Specifically, as shown in FIG. 44, in a portion of the shell 10 and the upper body 30 layered on each other, which is adjacent to the topline 33 as surrounding the topline 33, the sewn portion 41 as the fixed portion 40 where the shell and the upper body are fixed is provided to partially fix the shell 10 and the upper body 30.

Through the procedure above, assembly of the shell 10, the sole body 20, and the upper body 30 is completed and thus manufacturing of a shoe substantially similar to the shoe 1B according to the third embodiment described above is completed.

Thus, according to the method of manufacturing a shoe according to the present embodiment, the shoe can be manufactured through very simplified works to assemble the shell 10, the sole body 20, and the upper body 30' individually made in advance. Therefore, the method of manufacturing a shoe according to the present embodiment achieves an effect substantially similar to the effect obtained by the method of manufacturing a shoe according to the third embodiment described above, and is suitable for an example in which unallowable deformation or deterioration may be caused in the shell 10 and/or the sole body 20 by heating as described above.

Though an example in which the sole body 20 and the upper body 30 are not fixed with special fixing means is illustrated and described in the method of manufacturing a shoe according to the present embodiment above, they may be fixed with fixing means as necessary. For fixing, for example, sewing, bonding, welding, clipping, or engagement by engaging portions provided in the sole body 20 and the upper body 30 can be used.

Fifth Embodiment

Figure 45:
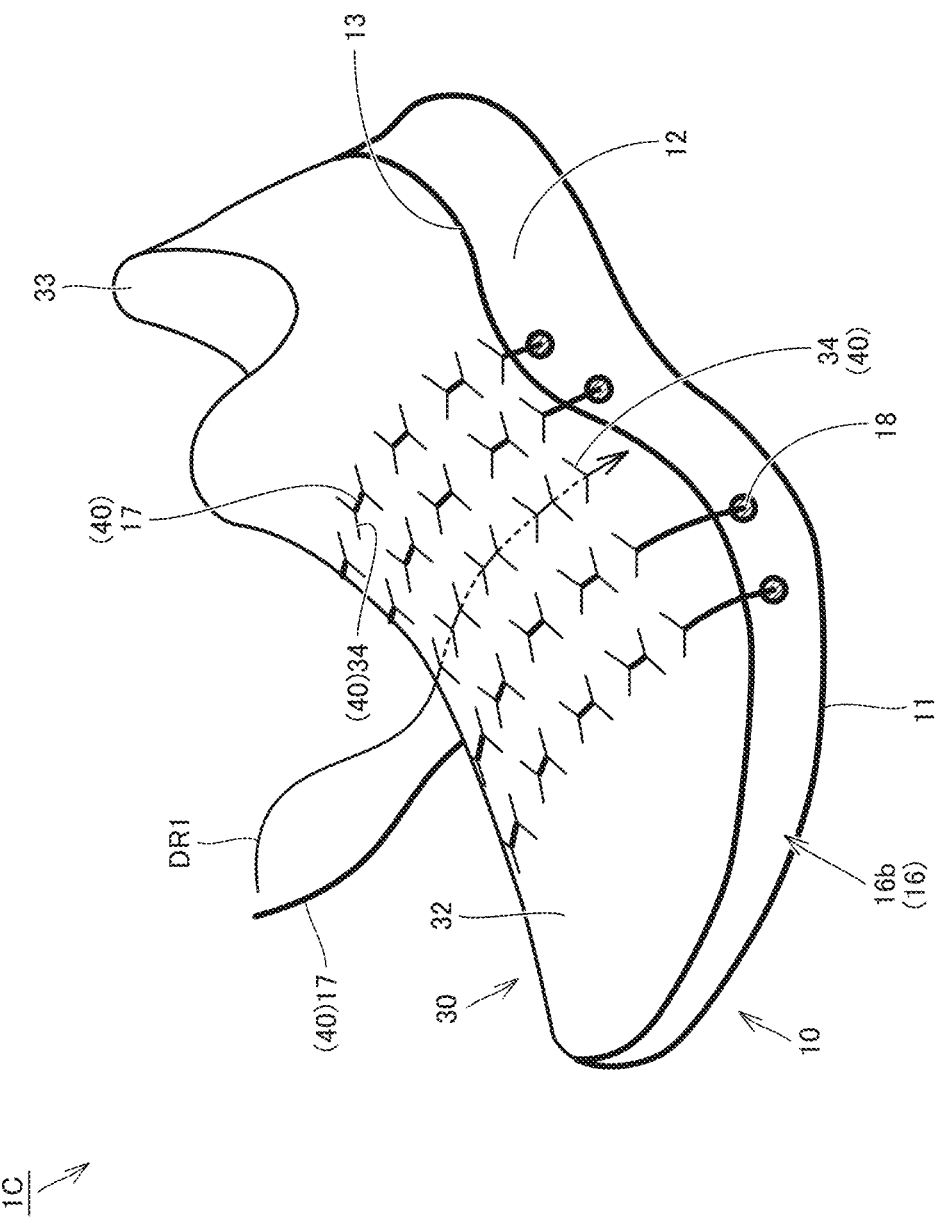
FIG. 45 is a schematic perspective view of a shoe according to a fifth embodiment.

FIG. 45 is a schematic perspective view of a shoe according to a fifth embodiment. A shoe 1C according to the present embodiment will be described below with reference to FIG. 45. The shoe 1C according to the present embodiment is different from the shoe 1A according to the first embodiment described above mainly in construction of the fixed portion 40. For facilitating understanding, FIG. 45 shows a part of the later-described fixed portion 40 in a non-fixed state.

As shown in FIG. 45, in the shoe IC according to the present embodiment, the insertion portion 13 in the form of the opening provided at the upper end of the peripheral wall portion 12 of the shell 10 is formed to be large across the forefoot portion R1, the midfoot portion R2, and the rearfoot portion R3. More specifically, the peripheral wall portion 12 is constructed to mainly cover a portion of a foot of the wearer corresponding to a tip end of the toe, a portion of the foot of the wearer corresponding to the medial and lateral sides of the instep, and a portion of a peripheral surface of the heel of the foot of the wearer that corresponds to the side of the sole of the foot, and the peripheral wall portion 12 generally does not cover a portion of the foot of the wearer that corresponds to a root of the toe, a portion corresponding to a central portion of the instep of the foot of the wearer in the direction of the width of the foot, and a portion of the peripheral surface of the heel of the foot of the wearer that corresponds to the side of an ankle.

Thus, the upper body 30 has the wall portion 32 externally exposed at the portion corresponding to the root of the toe of the foot of the wearer, the portion corresponding to the central portion of the instep of the foot of the wearer in the direction of the width of the foot, and the portion of the peripheral surface of the heel of the foot of the wearer that corresponds to the side of the ankle.

In the shoe 1C according to the present embodiment, the shell 10 is composed of a plate-shaped member 16b serving as the base structure portion 16, and accordingly, the shell 10 does not include numerous holes 14 (see FIG. 1 and the like) as provided in the shoe 1A according to the first embodiment.

In the shoe 1C according to the present embodiment, an engaging portion 17 provided in the shell 10 and an engagement hole 34 provided in the upper body 30 are employed as the fixed portion 40 where the shell 10 and the upper body 30 are partially fixed.

The engaging portion 17 provided in the shell 10 is in a form of a wire. Though not shown in the figure, the engaging portion 17 extends from a prescribed position in the peripheral wall portion 12 of the shell 10. In other words, one end of the engaging portion 17 in a direction of extension is integrated with the peripheral wall portion 12. The other end of the engaging portion 17 in the direction of extension is superimposed on another prescribed position in the peripheral wall portion 12 of the shell 10 and welded to the peripheral wall portion 12 by a welded portion 18 at the prescribed position.

A plurality of engaging portions 17 are provided in the shell 10. Each of the plurality of engaging portions 17 extends from a portion of the peripheral wall portion 12 on the medial side, and each engaging portion has above-described the other end welded to a portion of the peripheral wall portion 12 on the lateral side. The plurality of engaging portions 17 thus extend across a portion of the upper body 30 that covers the instep of the foot of the wearer.

A plurality of engagement holes 34 provided in the upper body 30 are provided in the portion of the upper body 30 that covers the instep of the foot of the wearer, as being superimposed on the plurality of engaging portions 17 described above. Each of the plurality of engagement holes 34 is provided by providing a cut like a slit in the upper body 30 and the engagement holes 34 are located along the direction of extension of the engaging portion 17 described above.

Each of the plurality of engaging portions 17 provided in the shell 10 is inserted through the plurality of engagement holes 34 in the upper body 30 provided at positions superimposed thereon. Therefore, each of the plurality of engaging portions 17 is routed to alternately pass over the inner surface 32a and the outer surface 32b of the upper body 30. The engaging portion 17 and the engagement hole 34 are thus engaged with each other, and accordingly, the shell 10 and the upper body 30 are partially fixed.

Such a fixing structure can be realized by sequentially inserting above-described the other end of the engaging portion 17 through the plurality of corresponding engagement holes 34 along a direction shown with an arrow DR1 in the figure and thereafter welding the other end to the peripheral wall portion 12. Instead of welding, the other end of the engaging portion 17 may be fixed to the peripheral wall portion 12 by bonding, sewing, or locking by using a locking member (for example, a clasp).

Thus, as in the shoe 1A according to the first embodiment described above, also in the shoe 1C according to the present embodiment, the upper body 30 can be fixed to the shell 10 and position displacement of the upper body 30 from the shell 10 can be prevented, without bonding the shell 10 and the upper body 30 to each other in their entirety with an adhesive. Therefore, poor fit can be suppressed and a function as the shoe can be prevented from being impaired.

When such a construction is adopted, as compared with bonding between the shell 10 and the upper body 30 in their entirety with the adhesive, a tact time required for manufacturing can significantly be reduced, and furthermore, the manufacturing process is also simplified. Therefore, the shoe free from poor fit or impairment of the function as the shoe can relatively readily be manufactured in a short period of time.

Fixing by the engaging portion 17 and the engagement hole 34 as described above can be carried out instead of works for fixing the shell 10 and the upper body 30 (or the upper body 30') by sewing in the step of partially fixing the shell and the upper body described in the methods of manufacturing a shoe according to the first to fourth embodiments described above.

As described above, the inner surface 32a of the upper body 30 is a portion in contact with the foot of the wearer. Therefore, when the engaging portion 17 is routed to alternately pass over the inner surface 32a and the outer surface 32b of the upper body 30 as described above, the engaging portion 17 is partially in contact with the foot of the wearer. The shell 10 sufficiently soft allows such a construction. By constructing the upper body 30 located in such a portion in a two-layered structure and providing the engagement hole 34 only on an outer layer side thereof, the engaging portion 17 is covered by an inner layer side. Such a construction is further preferred.

Sixth Embodiment

Figure 46:
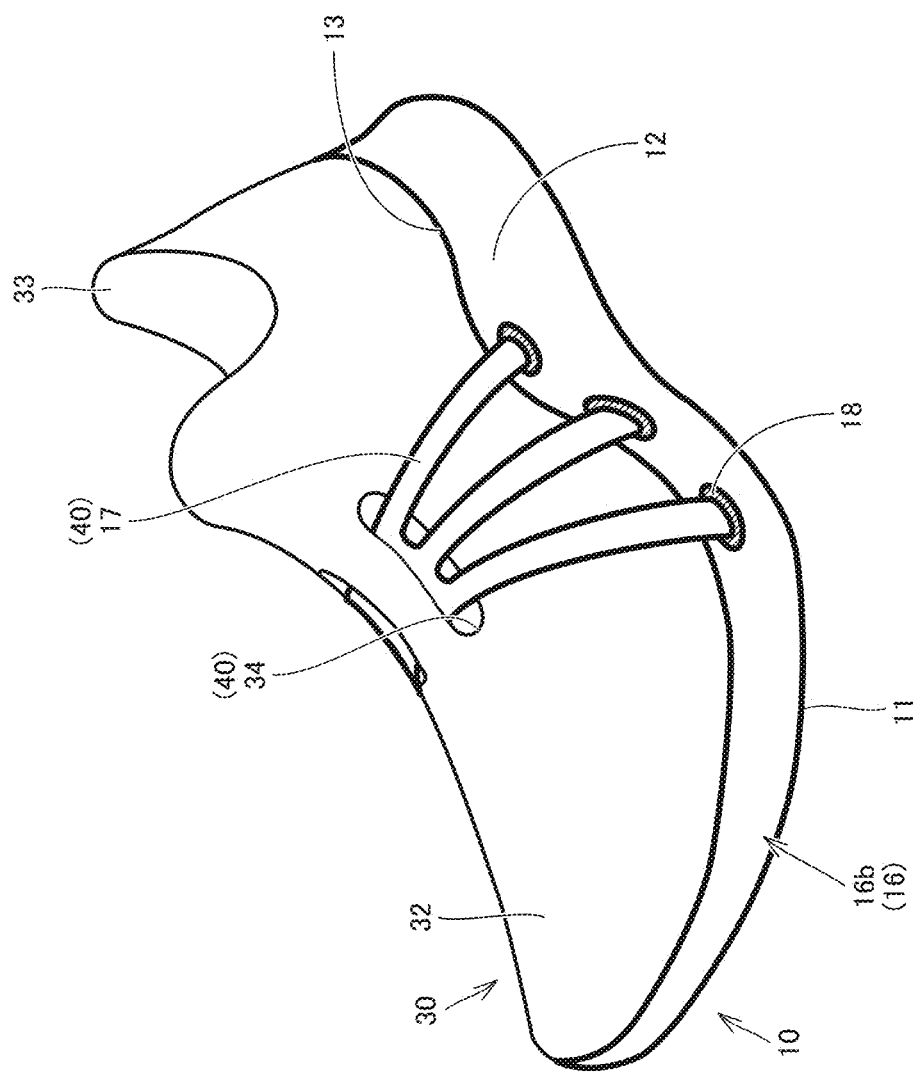
FIG. 46 is a schematic perspective view of a shoe according to a sixth embodiment.

FIG. 46 is a schematic perspective view of a shoe according to a sixth embodiment. A shoe ID according to the present embodiment will be described below with reference to FIG. 46. The shoe 1D according to the present embodiment is different from the shoe 1C according to the fifth embodiment described above in construction of the fixed portion 40.

As shown in FIG. 46, in the shoe 1D according to the present embodiment, the engaging portion 17 provided in the shell 10 and the engagement hole 34 provided in the upper body 30 are employed as the fixed portion 40 where the shell 10 and the upper body 30 are partially fixed. The engaging portion 17 is composed of a single member (that is, a member separate from the shell 10) including a plurality of parts in a form of a band, and the engagement hole 34 is provided as cuts in a form of a pair of openings provided in the upper body 30.

The engaging portion 17 has one end located on the medial side and has the other end located on the lateral side. The engaging portion 17 thus extends across the portion of the upper body 30 that covers the instep of the foot of the wearer. The pair of engagement holes 34 is provided in the portion of the upper body 30 that covers the instep of the foot of the wearer as being superimposed on the engaging portions 17 described above.

The engaging portion 17 has one end superimposed on a prescribed position in the peripheral wall portion 12 of the shell 10, although not shown in the figure, and the one end is welded to the peripheral wall portion 12 by the welded portion 18 at the prescribed position. The other end of the engaging portion 17 is superimposed on a prescribed position in the peripheral wall portion 12 of the shell 10 and welded to the peripheral wall portion 12 by the welded portion 18 at the prescribed position.

The engaging portion 17 is inserted through the pair of engagement holes 34 in the upper body 30. Therefore, the engaging portion 17 is routed to alternately pass over the inner surface 32a and the outer surface 32b of the upper body 30. The engaging portion 17 and the engagement holes 34 are thus engaged with each other, and accordingly, the shell 10 and the upper body 30 are partially fixed.

Such a fixing structure can be realized by sequentially inserting the engaging portion 17 through the pair of engagement holes 34 and thereafter welding the both ends of the engaging portion to the peripheral wall portion 12. Instead of welding, the both ends of the engaging portion 17 may be fixed to the peripheral wall portion 12 by bonding, sewing, or locking by using a locking member (for example, a clasp).

According to such a construction as well, an effect similar to the effect of the shoe 1C according to the fifth embodiment described above can be obtained. In other words, with the shoe 1D according to the present embodiment, the shoe free from poor fit or impairment of the function as the shoe can relatively readily be manufactured in a short period of time. By constructing the upper body 30 in a two-layered structure and providing the engagement hole 34 only on the outer layer side thereof, the engaging portion 17 is covered by the inner layer side and the engaging portion 17 is not in contact with the foot of the wearer.

Fixing by the engaging portion 17 and the engagement holes 34 as described above can be carried out instead of works for fixing the shell 10 and the upper body 30 (or the upper body 30') by sewing in the step of partially fixing the shell and the upper body described in the methods of manufacturing a shoe according to the first to fourth embodiments described above.

Seventh Embodiment

Figure 47:
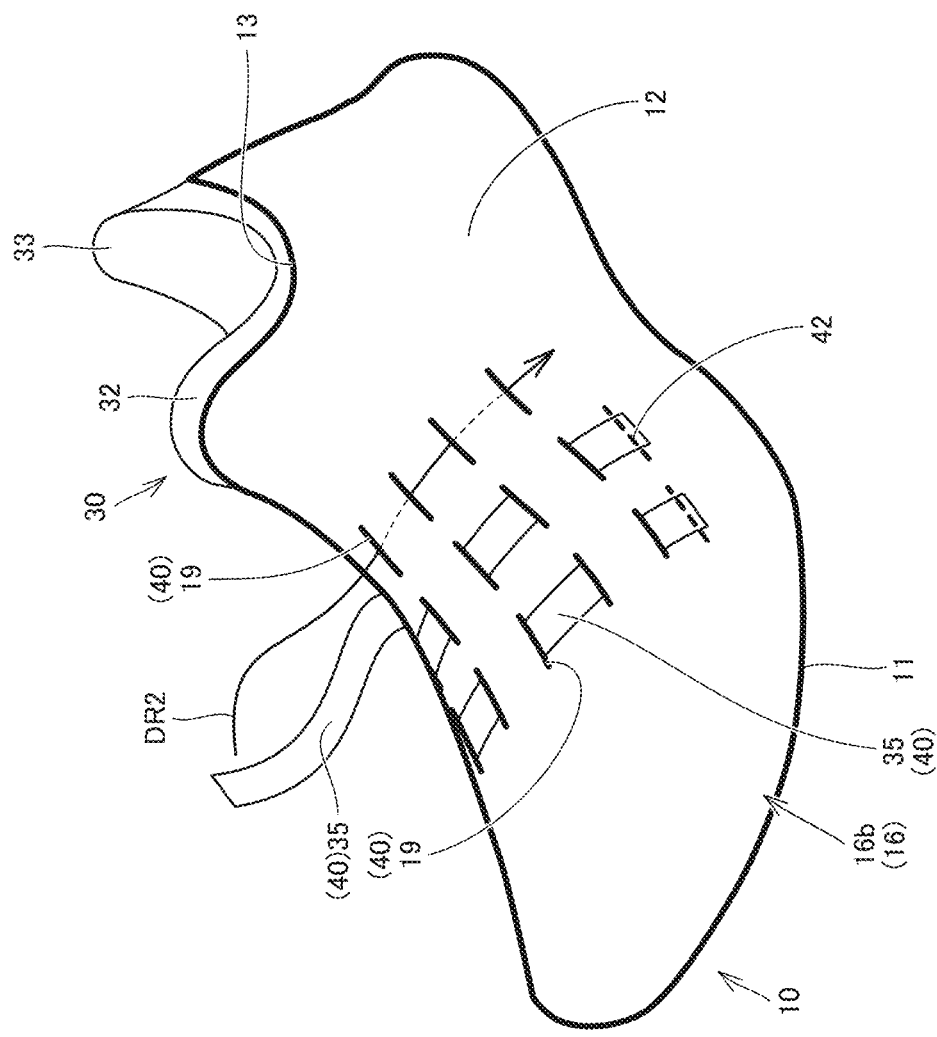
FIG. 47 is a schematic perspective view of a shoe according to a seventh embodiment.

FIG. 47 is a schematic perspective view of a shoe according to a seventh embodiment. A shoe 1E according to the present embodiment will be described below with reference to FIG. 47. The shoe 1E according to the present embodiment is different from the shoe 1A according to the first embodiment described above mainly in construction of the fixed portion 40. For facilitating understanding, FIG. 47 shows a part of the later-described fixed portion 40 in a non-fixed state.

As shown in FIG. 47, in the shoe 1E according to the present embodiment, the shell 10 is composed of the plate-shaped member 16b serving as the base structure portion 16, and accordingly, the shell 10 does not include numerous holes 14 (see FIG. 1 and the like) as provided in the shoe 1A according to the first embodiment. On the other hand, an engagement hole 19 which will be described later is provided at a prescribed position in the shell 10.

In the shoe 1E according to the present embodiment, the engagement hole 19 provided in the shell 10 and an engaging portion 35 provided in the upper body 30 are employed as the fixed portion 40 where the shell 10 and the upper body 30 are partially fixed.

The engaging portion 35 provided in the upper body 30 is in a form of a band. Though not shown in the figure, the engaging portion extends from a prescribed position in the wall portion 32 of the upper body 30. In other words, one end of the engaging portion 35 in a direction of extension is integrated with the wall portion 32. The other end of the engaging portion 35 in the direction of extension is superimposed on a prescribed position in the peripheral wall portion 12 of the shell 10 and welded to the peripheral wall portion 12 by a sewn portion 42 at the prescribed position.

The engaging portion 35 extends from a portion on the medial side of the wall portion 32, and each engaging portion has above-described the other end welded to a portion on the lateral side of the peripheral wall portion 12. The plurality of engaging portions 35 thus extend across a portion of the shell 10 that covers the instep of the foot of the wearer.

The plurality of engagement holes 19 provided in the shell 10 are provided in the portion of the shell 10 that covers the instep of the foot of the wearer, as being superimposed on the plurality of engaging portions 35 described above. Each of the plurality of engagement holes 19 is provided by providing a cut like a slit in the shell 10 and the engagement holes 19 located along the direction of extension of the engaging portion 35 described above.

The plurality of engaging portions 35 provided in the upper body 30 are inserted through the plurality of engagement holes 19 in the shell 10 provided at positions superimposed thereon. Therefore, each of the plurality of engaging portions 35 is routed to alternately pass over the inner surface 12a and the outer surface 12b of the shell 10. The engaging portion 35 and the engagement hole 19 are thus engaged with each other, and accordingly, the shell 10 and the upper body 30 are partially fixed.

Such a fixing structure can be realized by sequentially inserting above-described the other end of the engaging portion 35 through the plurality of corresponding engagement holes 19 along a direction shown with an arrow DR2 in the figure and thereafter sewing the other end to the peripheral wall portion 12. Instead of sewing, the other end of the engaging portion 35 may be fixed to the peripheral wall portion 12 by bonding, welding, or locking by using a locking member (for example, a clasp).

Thus, as in the shoe 1A according to the first embodiment described above, also in the shoe 1E according to the present embodiment, the upper body 30 can be fixed to the shell 10 and position displacement of the upper body 30 from the shell 10 can be prevented, without bonding the shell 10 and the upper body 30 to each other in their entirety with an adhesive. Therefore, poor fit can be suppressed and a function as the shoe can be prevented from being impaired.

When such a construction is adopted, as compared with bonding between the shell 10 and the upper body 30 in their entirety with the adhesive, a tact time required for manufacturing can significantly be reduced, and furthermore, the manufacturing process is also simplified. Therefore, the shoe free from poor fit or impairment of the function as the shoe can relatively readily be manufactured in a short period of time.

Fixing by the engaging portion 35 and the engagement hole 19 as described above can be carried out instead of works for fixing the shell 10 and the upper body 30 (or the upper body 30') by sewing in the step of partially fixing the shell and the upper body described in the methods of manufacturing a shoe according to the first to fourth embodiments described above.

As described above, the inner surface 32a of the upper body 30 is a portion in contact with the foot of the wearer. Therefore, when the engaging portion 35 is routed to alternately pass over the inner surface 12a and the outer surface 12b of the shell 10 as described above, the upper body 30 is not partially in contact with the foot of the wearer and the shell 10 is in contact with the foot of the wearer in that portion. The shell 10 sufficiently soft allows such a construction. By constructing the upper body 30 located in such a portion in a two-layered structure and providing the engaging portion 35 only on the outer layer side thereof, an exposed portion of the inner surface 12a of the shell 10 is covered with the inner layer side. Such a construction is further preferred.

Eighth Embodiment

Figure 48:
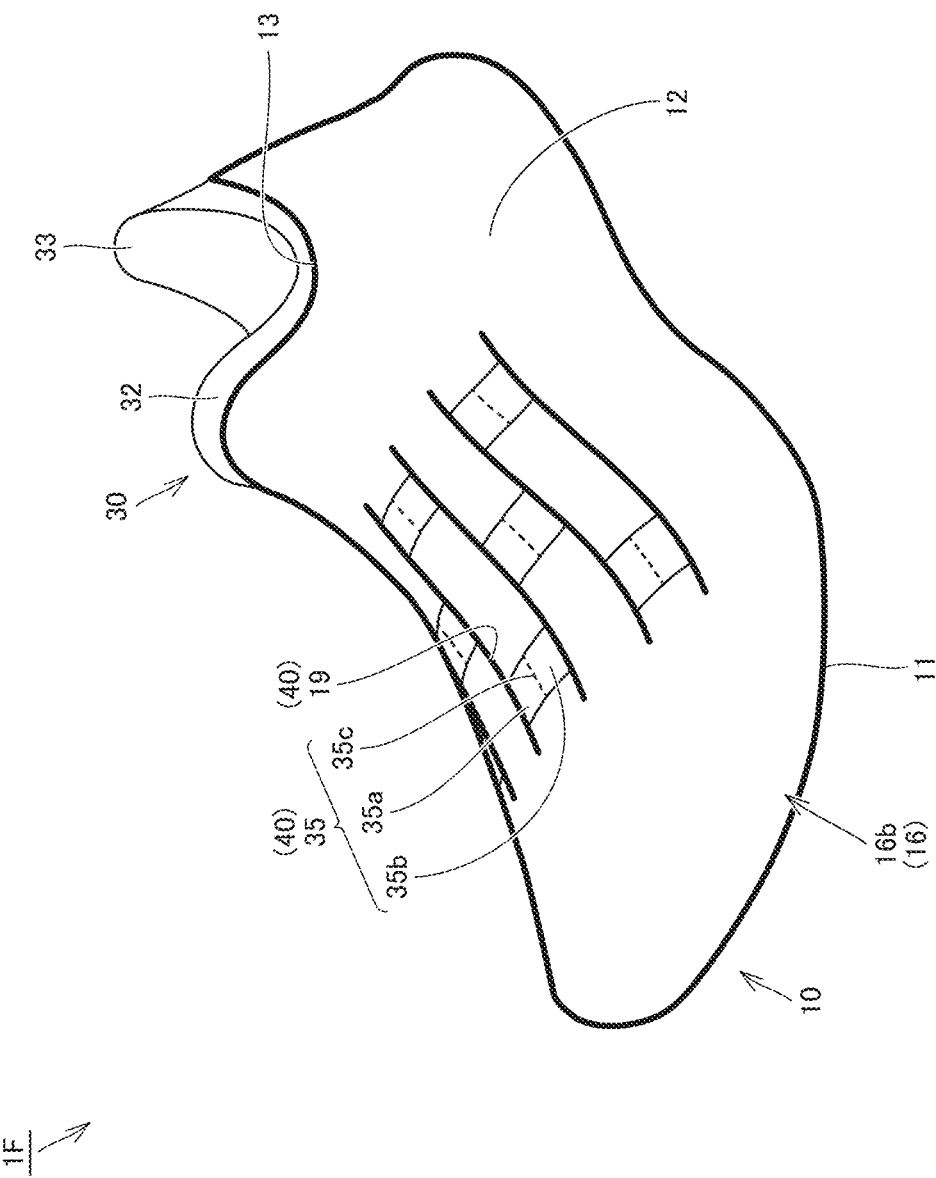
FIG. 48 is a schematic perspective view of a shoe according to an eighth embodiment.

FIG. 48 is a schematic perspective view of a shoe according to an eighth embodiment. FIGS. 49A to 49D are schematics diagrams showing a construction of the fixed portion of the shoe shown in FIG. 48. A shoe 1F according to the present embodiment will be described below with reference to FIGS. 48 and 49A to 49D. The shoe 1F according to the present embodiment is different from the shoe 1E according to the seventh embodiment described above in construction of the fixed portion 40.

As shown in FIG. 48, in the shoe 1F according to the present embodiment, the engagement hole 19 provided in the shell 10 and the engaging portion 35 provided in the upper body 30 are employed as the fixed portion 40 where the shell 10 and the upper body 30 are partially fixed. A plurality of engaging portions 35 are provided in the portion of the upper body 30 that covers the instep of the foot of the wearer, and each of the engaging portions includes a pair of engagement pieces 35a and 35b and a sewn portion 35c where they are sewn. A plurality of engagement holes 19 in a form of a slit are provided in the portion of the shell 10 that covers the instep of the foot of the wearer.

Figure 49A:
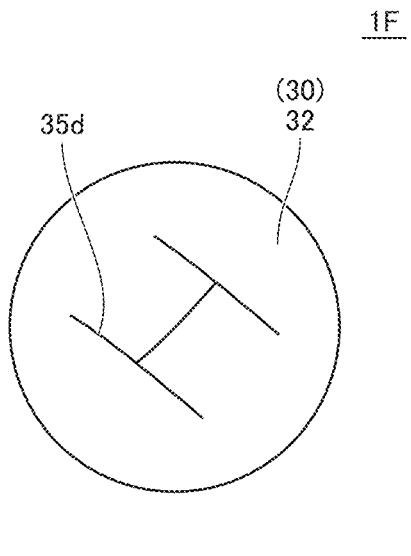
FIGS. 49A to 49D are schematics diagrams showing a construction of a fixed portion of the shoe shown in FIG. 48.
Figure 49B:
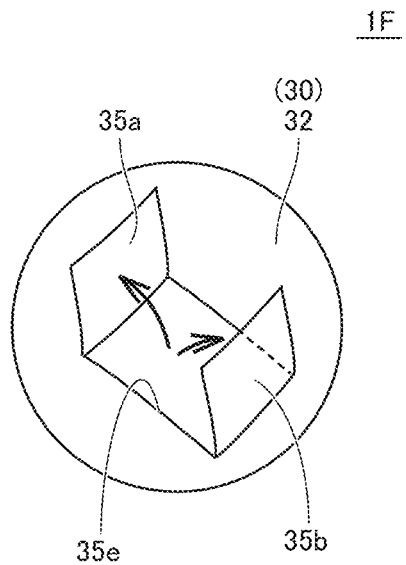

As shown in FIG. 49A, the pair of engagement pieces 35a and 35b is formed by providing in the upper body 30, a cut 35d in an H shape when viewed in a plan view. As shown in FIG. 49B, the pair of engagement pieces 35a and 35b is opened by being bent along directions shown with arrows in the figure so that an opening 35e is provided in the upper body 30.

Figure 49C:
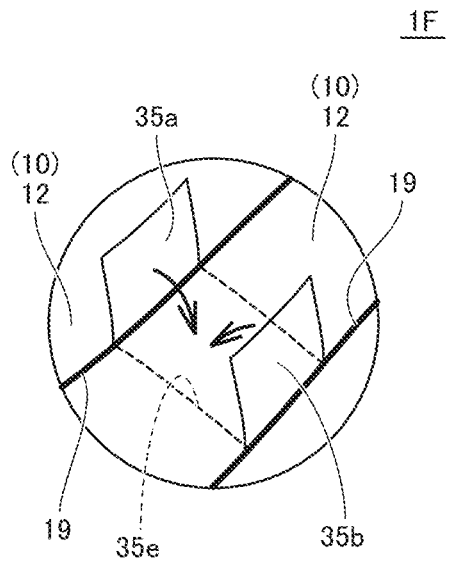

As shown in FIG. 49C, the shell 10 is arranged to close the opening 35e. At this time, a set of engagement holes 19 among the plurality of engagement holes 19 in the form of the slit provided in the shell 10 is arranged as being aligned with root portions of the pair of engagement pieces 35a and 35b, and the pair of engagement pieces 35a and 35b is drawn from one set of engagement holes 19 and bent again in directions shown with arrows in the figure. Thus, the pair of engagement pieces 35a and 35b is set back to the original state.

Figure 49D:
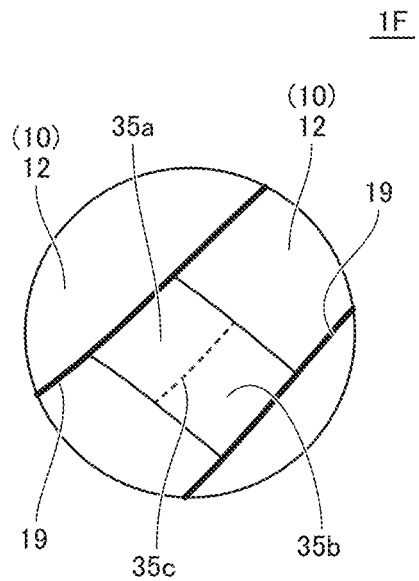

As shown in FIG. 49D, tip ends of the pair of engagement pieces 35a and 35b abut on each other, and the tip ends are sewn to each other by providing the sewn portion 35c. The shell 10 and the upper body 30 are thus braided like a knitted structure, so that the engaging portion 35 and the engagement hole 19 are engaged with each other and the shell 10 and the upper body 30 are partially fixed.

Instead of sewing, the tip ends of the pair of engagement pieces 35a and 35b may be joined to each other by bonding, welding, or locking by using a locking member (for example, a clasp).

According to such a construction as well, an effect similar to the effect of the shoe 1E according to the seventh embodiment described above can be obtained. In other words, with the shoe 1F according to the present embodiment, the shoe free from poor fit or impairment of the function as the shoe can relatively readily be manufactured in a short period of time. By constructing the upper body 30 in a two-layered structure and providing the engaging portion 35 only on the outer layer side thereof, the exposed portion of the inner surface 12a of the shell 10 is covered with the inner layer side and the shell 10 is not in contact with the foot of the wearer.

Fixing by the engaging portion 35 and the engagement hole 19 as described above can be carried out instead of works for fixing the shell 10 and the upper body 30 (or the upper body 30') by sewing in the step of partially fixing the shell and the upper body described in the methods of manufacturing a shoe according to the first to fourth embodiments described above.

Ninth Embodiment

Figure 50:
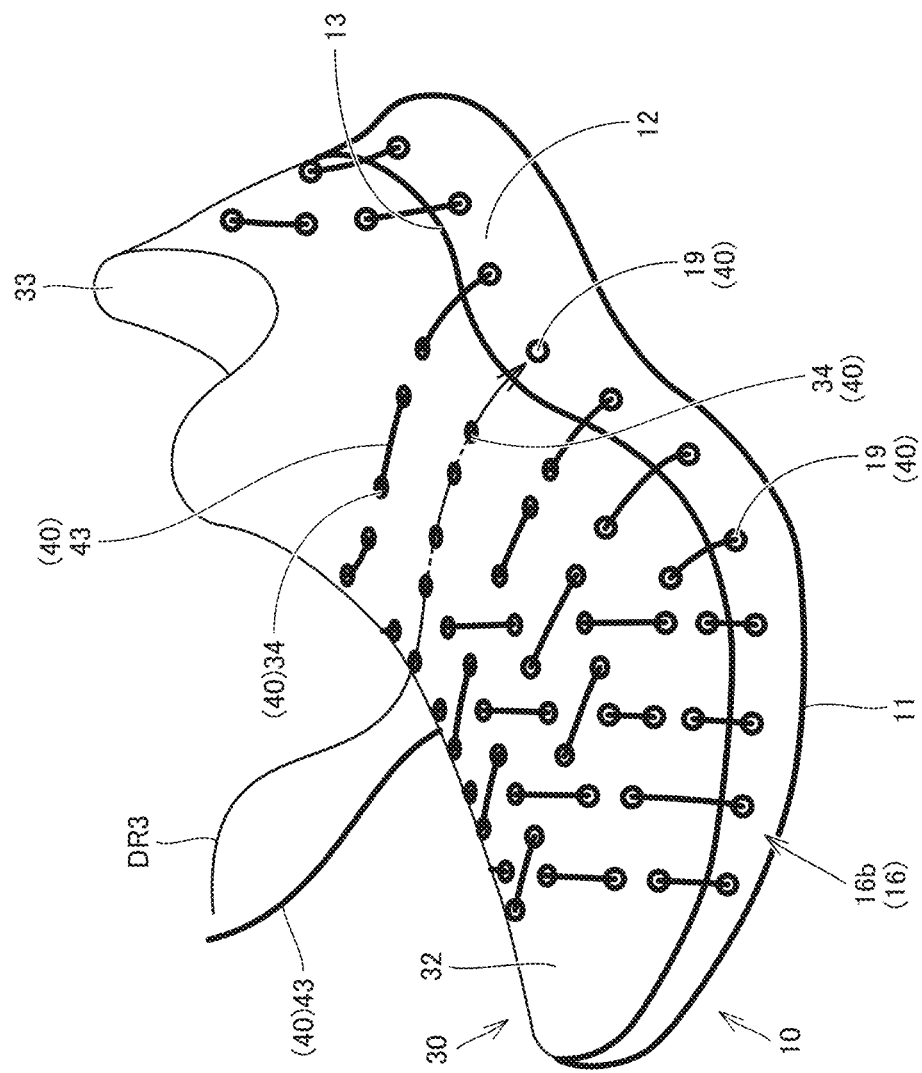
FIG. 50 is a schematic perspective view of a shoe according to a ninth embodiment.

FIG. 50 is a schematic perspective view of a shoe according to a ninth embodiment. A shoe 1G according to the present embodiment will be described below with reference to FIG. 50. The shoe 1G according to the present embodiment is different from the shoe 1A according to the first embodiment described above mainly in construction of the fixed portion 40. For facilitating understanding, FIG. 50 shows a part of the later-described fixed portion 40 in a non-fixed state.

As shown in FIG. 50, in the shoe 1G according to the present embodiment, the insertion portion 13 in the form of an opening provided at an upper end of the peripheral wall portion 12 of the shell 10 is formed to be large across the forefoot portion R1, the midfoot portion R2, and the rearfoot portion R3. More specifically, the peripheral wall portion 12 is constructed to mainly cover a portion of a foot of the wearer corresponding to the tip end of the toe, a portion of the foot of the wearer corresponding to the medial and lateral sides of the instep, and a portion of a peripheral surface of the heel of the foot of the wearer that corresponds to the side of the sole of the foot, and the peripheral wall portion 12 generally does not cover a portion corresponding to a root of the toe of the foot of the wearer, a portion corresponding to a central portion of the instep of the foot of the wearer in the direction of the width of the foot, and a portion of the peripheral surface of the heel of the foot of the wearer that corresponds to the side of an ankle.

Thus, the upper body 30 has the wall portion 32 externally exposed at the portion corresponding to the root of the toe of the foot of the wearer, the portion corresponding to the central portion of the instep of the foot of the wearer in the direction of the width of the foot, and the portion of the peripheral surface of the heel of the foot of the wearer that corresponds to the side of the ankle.

In the shoe 1G according to the present embodiment, the shell 10 is composed of the plate-shaped member 16b serving as the base structure portion 16, and accordingly, the shell 10 does not include numerous holes 14 (see FIG. 1 and the like) as provided in the shoe 1A according to the first embodiment.

In the shoe 1G according to the present embodiment, the engagement hole 19 provided in the shell 10, the engagement hole 34 provided in the upper body 30, and a locking element 43 are employed as the fixed portion 40 where the shell 10 and the upper body 30 are partially fixed.

The locking element 43 is in a form of a wire, and it is formed from one string in the present embodiment. The engagement hole 19 provided in the shell 10 is defined by a cut in a form of an opening and a plurality of engagement holes 19 are provided in the peripheral wall portion 12. The engagement hole 34 provided in the upper body 30 is defined by a cut in a form of an opening, and a plurality of engagement holes 34 are provided as being scattered in the wall portion 32.

Though not shown in the figure, the locking element 43 has one and the other ends fixed at prescribed positions in the shell 10 or prescribed positions in the upper body 30, for example, by sewing, welding, bonding, or locking by using a locking member (for example, a clasp). A portion of the locking element 43 between the one end and the other end described above is inserted through the engagement holes 19 provided in the shell 10 and the engagement holes 34 provided in the upper body 30 in a prescribed order. The locking element 43 and the engagement holes 19 and 34 are thus engaged with one another, and accordingly, the shell 10 and the upper body 30 are partially fixed. The locking element 43 is located along the portion of the upper body 30 that covers the instep of the foot of the wearer and the portion of the upper body 30 that covers the peripheral surface of the heel of the foot of the wearer.

Such a fixing structure can be realized by sequentially inserting the locking element 43 through the corresponding engagement holes 19 and 34 along a direction shown with an arrow DR3 in the figure and thereafter welding one and the other ends of the locking element 43 to the peripheral wall portion 12 or the wall portion 32.

Thus, as in the shoe 1A according to the first embodiment described above, also in the shoe 1G according to the present embodiment, the upper body 30 can be fixed to the shell 10 and position displacement of the upper body 30 from the shell 10 can be prevented, without bonding the shell 10 and the upper body 30 to each other in their entirety with an adhesive. Therefore, poor fit can be suppressed and a function as the shoe can be prevented from being impaired.

When such a construction is adopted, as compared with bonding between the shell 10 and the upper body 30 in their entirety with the adhesive, a tact time required for manufacturing can significantly be reduced, and furthermore, the manufacturing process is also simplified. Therefore, the shoe free from poor fit or impairment of the function as the shoe can relatively readily be manufactured in a short period of time.

Fixing by the locking element 43 and the engagement holes 19 and 34 as described above can be carried out instead of works for fixing the shell 10 and the upper body 30 (or the upper body 30') by sewing in the step of partially fixing the shell and the upper body described in the methods of manufacturing a shoe according to the first to fourth embodiments described above.

As described above, the inner surface 32a of the upper body 30 is a portion in contact with the foot of the wearer. Therefore, when the locking element 43 is routed to pass on the side of the inner surface 32a of the upper body 30, the locking element 43 is partially in contact with the foot of the wearer. The locking element 43 sufficiently soft allows such a construction. By constructing the upper body 30 located in such a portion in a two-layered structure and providing the engagement hole 34 only on the outer layer side thereof, the locking element 43 is covered with the inner layer side. Such a construction is further preferred.

Tenth Embodiment

Figure 51:
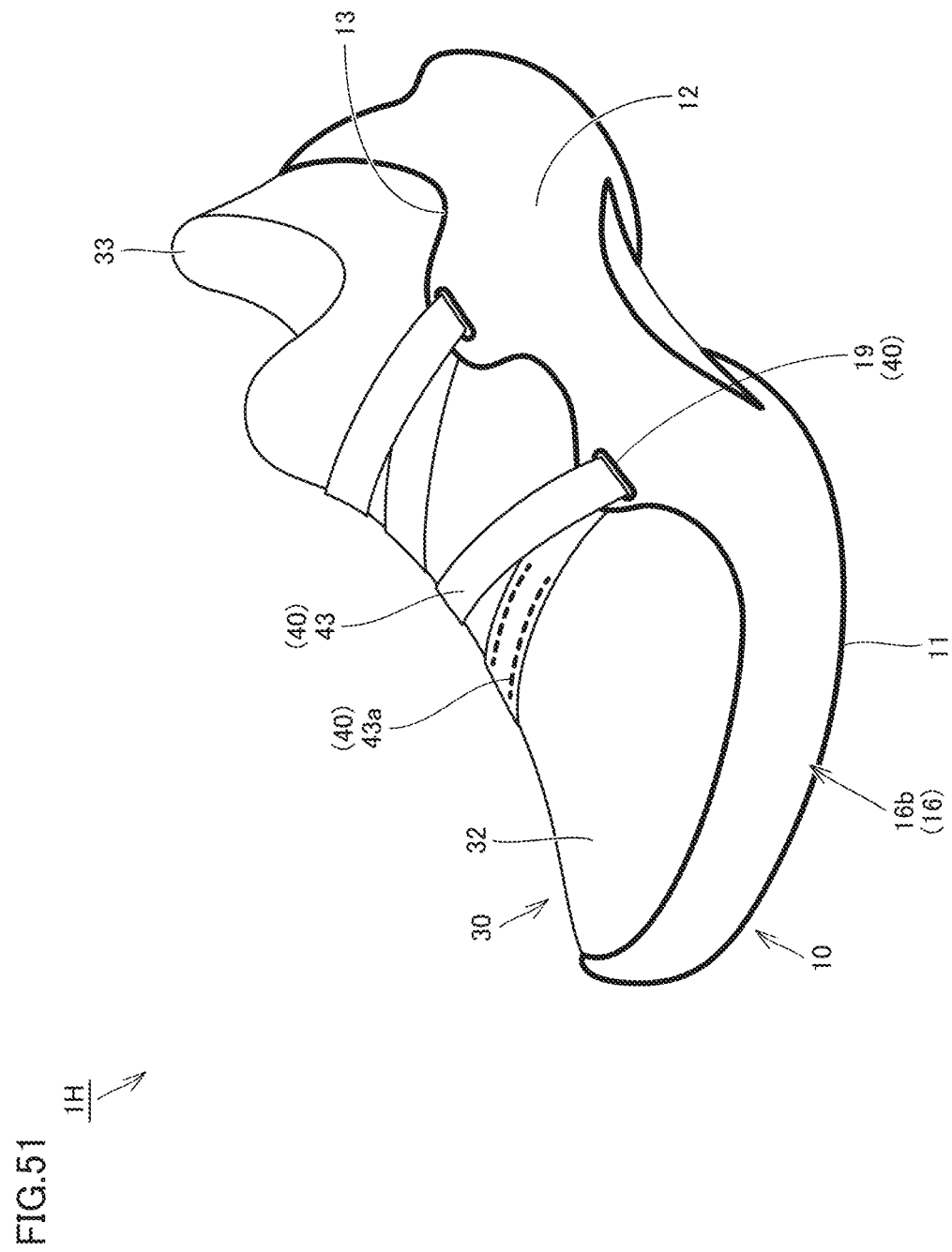
FIG. 51 is a schematic perspective view of a shoe according to a tenth embodiment.

FIG. 51 is a schematic perspective view of a shoe according to a tenth embodiment. A shoe 1H according to the present embodiment will be described below with reference to FIG. 51. The shoe 1H according to the present embodiment is different from the shoe 1G according to the ninth embodiment described above in construction of the fixed portion 40.

As shown in FIG. 51, in the shoe 1H according to the present embodiment, the locking element 43, the engagement hole 19 provided in the shell 10, and a sewn portion 43a where the upper body 30 and the locking element 43 are sewn are employed as the fixed portion 40 where the shell 10 and the upper body 30 are partially fixed. The locking element 43 is in a form of a band. The engagement holes 19 are provided as a plurality of cuts each in a form of an opening provided in the portion on the medial side and the portion on the lateral side of the shell 10.

Though not shown in the figure, the locking element 43 has one end fixed at a prescribed position in the portion of the shell 10 on the medial side, for example, by sewing, welding, bonding, or locking by using a locking member (for example, a clasp). Though not shown in the figure, the locking element 43 has the other end fixed at a prescribed position in the portion of the shell 10 on the medial side, for example, by sewing, welding, bonding, or locking by using a locking member (for example, a clasp).

The locking element 43 is alternately inserted through the engagement holes 19 provided in the portion on the medial side of the shell 10 and the portion on the lateral side of the shell 10. The locking element 43 is thus located as being meandering along the outer surface 32b of the portion of the upper body 30 that covers the instep of the foot of the wearer.

The prescribed position of the locking element 43 is sewn to the upper body 30 by the sewn portion 43a. Instead of sewing, the prescribed position of the locking element 43 may be joined to the upper body 30 by bonding, welding, or locking by using a locking member (for example, a clasp).

According to such a construction as well, an effect similar to the effect of the shoe 1G according to the ninth embodiment described above can be obtained. In other words, with the shoe 1H according to the present embodiment, the shoe free from poor fit or impairment of the function as the shoe can relatively readily be manufactured in a short period of time.

Eleventh Embodiment

Figure 52:
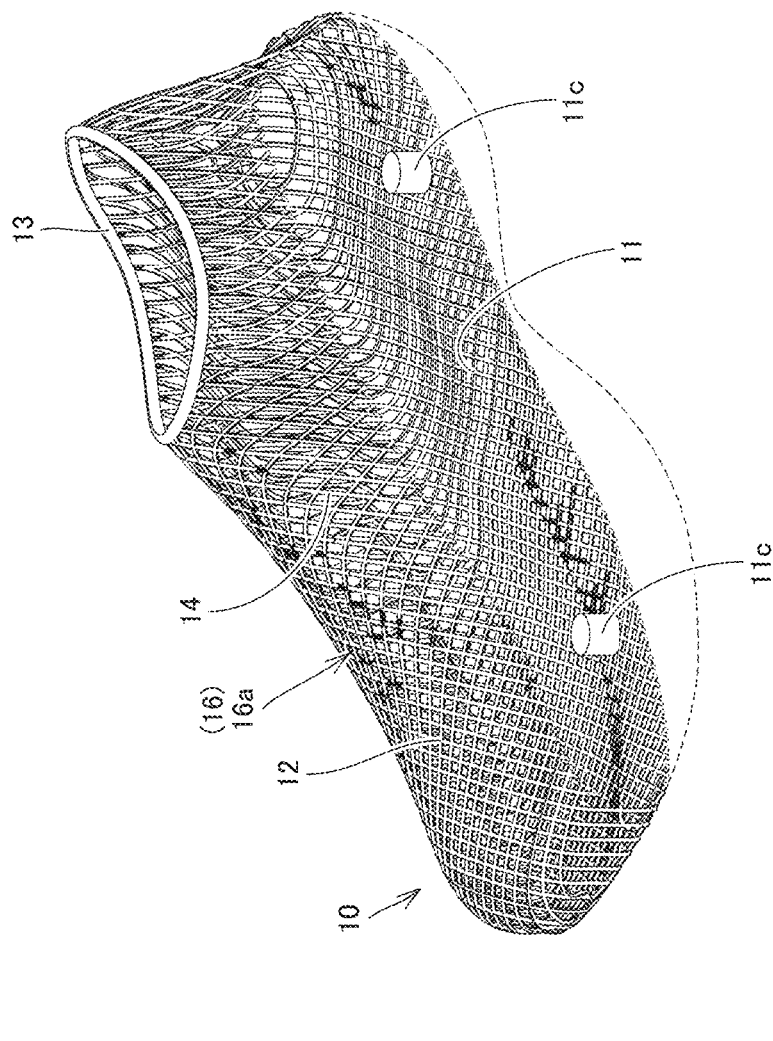
FIG. 52 is a partially cutaway perspective view of the shell provided in a shoe according to an eleventh embodiment.

FIG. 52 is a partially cutaway perspective view of the shell provided in a shoe according to an eleventh embodiment. A shoe 1I according to the present embodiment will be described below with reference to FIG. 52. The shoe 1I according to the present embodiment includes the shell 10 shown in FIG. 52 instead of the shell 10 included in the shoe 1A according to the first embodiment described above, and the construction is otherwise the same as in the first embodiment described above.

As shown in FIG. 52, the shell 10 included in the shoe 1I according to the present embodiment includes the bottom wall portion 11 and the peripheral wall portion 12 similarly to the shell 10 in the first embodiment described above, and includes the insertion portion 13 in the form of the opening at the upper end of the peripheral wall portion 12. The shell 10 has the bottom wall portion 11 and the peripheral wall portion 12 composed of the meshy member 16a serving as the base structure portion 16, and accordingly, these portions of the shell 10 have numerous holes 14.

In the shell 10, protrusions 11c are provided in a substantially central portion in a portion of the bottom wall portion 11 corresponding to the forefoot portion R1 and in a substantially central portion in a portion of the bottom wall portion 11 corresponding to the rearfoot portion R3 that is closer to the front. The protrusions 11c are provided to protrude from the inner surface 11a of the bottom wall portion 11 into the internal space SP.

The protrusion 11c serves as a guide in assembly of the sole body 20 to the shell 10 and serves for preventing position displacement of the sole body 20 from the shell 10 after assembly, and a recess (not shown) corresponding to the protrusion 11c is provided in the sole body 20.

Thus, with the shoe 1I according to the present embodiment, in addition to the effect described in the first embodiment described above, an effect to facilitate assembly works in manufacturing and an effect to prevent position displacement of the sole body 20 after assembly can further be obtained. While the shell 10 structured as such can be made by injection molding or cast molding, in particular, the shell 10 can relatively readily be made by additive manufacturing using a three-dimensional additive manufacturing apparatus described above.

A position where the protrusion is provided, the number of protrusions, or a size or a shape of the protrusion is not particularly restricted, and can be modified as appropriate. The protrusion does not necessarily have to be provided in the bottom wall portion of the shell, and the protrusion may be provided in the first portion described above, which is a portion of the peripheral wall portion opposed to the sole body.

Summary of Disclosure in Embodiments

Characteristic features disclosed in the first to eleventh embodiments and modifications thereof described above are summarized as below, A method of manufacturing a shoe according to one aspect of the present disclosure includes preparing a flexible shell having an internal space, preparing an upper body in a form of a bag, the upper body being provided with an opening in a portion corresponding to a topline, preparing a sole body, accommodating the upper body in the shell, partially fixing the shell and the upper body, and forming the upper body with a last being located in the upper body accommodated in the shell, taking the last out of the formed upper body, and inserting the sole body in the shell.

In the method of manufacturing a shoe according to one aspect of the present disclosure, the upper body may be made from a heat-shrinkable member. In that case, preferably, in the forming the upper body, the upper body is thermally shrunk by being heated such that the upper body has at least one of an outer geometry in conformity with the shell and an inner geometry in conformity with the last.

In the method of manufacturing a shoe according to one aspect of the present disclosure, in the preparing an upper body, a body including a first bag-shaped portion in a form of a bag and a second bag-shaped portion in a form of a bag, the second bag-shaped portion being accommodated in the first bag-shaped portion, may be prepared as the upper body, the first bag-shaped portion being provided with an opening in a portion corresponding to the topline, the second bag-shaped portion including at least a portion corresponding to an arch of a foot of a wearer, the second bag-shaped portion being provided with openings in a portion corresponding to the topline and in a portion other than the portion corresponding to the topline. In that case, in the forming the upper body, the upper body may be formed with the last being located in the inside of the first bag-shaped portion and the inside of the second bag-shaped portion and with a last member being further located in a space between the first bag-shaped portion and the second bag-shaped portion, the last member having an outer geometry corresponding to an outer geometry of the sole body, the space being a space where the sole body is inserted in the inserting the sole body in the shell. Furthermore, in that case, in the taking out the last, the last member in addition to the last may be taken out of the formed upper body.

A method of manufacturing a shoe according to another aspect of the present disclosure includes preparing a flexible shell having an internal space, preparing an upper body in a form of a bag, the upper body being provided with an opening in a portion corresponding to a topline, preparing a sole body, forming the upper body with a last being located in the upper body, taking the last out of the formed upper body, accommodating the formed upper body in the shell and partially fixing the shell and the formed upper body, and inserting the sole body in the shell.

In the method of manufacturing a shoe according to another aspect of the present disclosure, the upper body may be made from a heat-shrinkable member. In that case, preferably, in the forming the upper body, the upper body is thermally shrunk by being heated such that the upper body has an inner geometry in conformity with the last.

In the methods of manufacturing a shoe according to one aspect and another aspect of the present disclosure, the shell and the upper body may partially be fixed by joining the shell and the upper body by sewing.

In the methods of manufacturing a shoe according to one aspect and another aspect of the present disclosure, in the preparing the shell, the shell may be provided with an engaging portion in a form of a wire or a band. In the preparing the upper body, a hole may be provided in the upper body. In that case, the shell and the upper body may partially be fixed by engaging the engaging portion with the hole by inserting the engaging portion through the hole.

In the methods of manufacturing a shoe according to one aspect and another aspect of the present disclosure, in the preparing the shell, the shell may be provided with a hole. In the preparing the upper body, the upper body may be provided with an engaging portion in a form of a wire or a band. In that case, the shell and the upper body may partially be fixed by engaging the engaging portion with the hole by inserting the engaging portion through the hole.

The methods of manufacturing a shoe according to one aspect and another aspect of the present disclosure may further include preparing a locking element that locks the shell and the upper body. In that case, the shell and the upper body may partially be fixed by locking the shell and the upper body with the locking element.

In the methods of manufacturing a shoe according to one aspect and another aspect of the present disclosure, in the preparing a shell, the shell may be made to include at least a portion that covers an instep of a wearer. In that case, the shell and the upper body may partially be fixed in the portion of the shell that covers the instep of the wearer.

In the methods of manufacturing a shoe according to one aspect and another aspect of the present disclosure, in the preparing the shell, the shell may be made to include at least a portion adjacent to the topline through which a foot of a wearer is inserted. In that case, the shell and the upper body may partially be fixed in the portion of the shell adjacent to the topline through which the foot of the wearer is inserted.

In the methods of manufacturing a shoe according to one aspect and another aspect of the present disclosure, in the inserting the sole body in the shell, the sole body may be arranged on an inner side of the upper body in the internal space.

In the methods of manufacturing a shoe according to one aspect and another aspect of the present disclosure, in the preparing the upper body, the upper body may be made such that a portion thereof corresponding to an arch in the sole of the foot of the wearer is larger in thickness than a portion thereof corresponding to a toe in the sole of the foot of the wearer.

In the methods of manufacturing a shoe according to one aspect and another aspect of the present disclosure, in the inserting the sole body in the shell, the sole body may be arranged between a bottom wall portion of the shell and a bottom portion of the upper body in the internal space.

In the methods of manufacturing a shoe according to one aspect and another aspect of the present disclosure, in the preparing the shell, the shell may be made such that the bottom wall portion includes a projection that projects into the internal space. In the preparing the sole body, the sole body may be made to include a recess in a lower surface. In that case, in the inserting the sole body in the shell, the shell and the sole body may be positioned by inserting the projection in the recess.

A shoe according to one aspect of the present disclosure includes a shell, an upper body, and a sole body. The shell is formed of a flexible member having an internal space to receive a foot of a wearer. The upper body is in a form of a bag, accommodated in the shell, and provided with an opening in a portion corresponding to a topline through which the foot of the wearer is inserted. The sole body is accommodated in the shell and supports the sole of the foot of the wearer. The shell includes a bottom wall portion and a peripheral wall portion erected from a peripheral edge of the bottom wall portion. In the shoe according to one aspect of the present disclosure, the bottom wall portion and a portion of the peripheral wall portion adjacent to the bottom wall portion define a lower space of the internal space in which the sole body is disposed, and a portion of the peripheral wall portion located above the portion adjacent to the bottom wall portion defines at least a portion of an upper space of the internal space in which the foot of the wear is inserted. In the shoe according to one aspect of the present disclosure, the shell and the upper body are partially fixed.

In the shoe according to one aspect of the present disclosure, the shell and the upper body may partially be fixed by joining the shell and the upper body by sewing.

In the shoe according to one aspect of the present disclosure, the shell may be provided with an engaging portion in a form of a wire or a band and the upper body may be provided with a hole. In that case, the shell and the upper body may partially be fixed by engaging the engaging portion with the hole by inserting the engaging portion through the hole.

In the shoe according to one aspect of the present disclosure, the shell may be provided with a hole and the upper body may be provided with an engaging portion in a form of a wire or a band. In that case, the shell and the upper body may partially be fixed by engaging the engaging portion with the hole by inserting the engaging portion through the hole.

The shoe according to one aspect of the present disclosure may further include a locking element that locks the shell and the upper body. In that case, the shell and the upper body may partially be fixed by locking the shell and the upper body with the locking element.

In the shoe according to one aspect of the present disclosure, the shell may include at least a portion that covers an instep of the wearer. In that case, the shell and the upper body may partially be fixed in the portion of the shell that covers the instep of the wearer.

In the shoe according to one aspect of the present disclosure, the shell may include at least a portion adjacent to the topline through which the foot of the wearer is inserted. In that case, the shell and the upper body may partially be fixed in the portion of the shell adjacent to the topline through which the foot of the wearer is inserted.

In the shoe according to one aspect of the present disclosure, the sole body may be arranged on an inner side of the upper body in the internal space.

In the shoe according to one aspect of the present disclosure, the upper body may include a first bag-shaped portion in a form of a bag and a second bag-shaped portion in a form of a bag, the first bag-shaped portion being provided with an opening in a portion corresponding to the topline, the second bag-shaped portion being accommodated in the first bag-shaped portion, the second bag-shaped portion including at least a portion corresponding to an arch of the foot of the wearer, the second bag-shaped portion being provided with openings in a portion corresponding to the topline and in a portion other than the portion corresponding to the topline. In that case, preferably, the sole body is arranged between a portion of the first bag-shaped portion that corresponds to the sole of the foot of the wearer and a portion of the second bag-shaped portion that corresponds to the arch of the foot of the wearer.

In the shoe according to one aspect of the present disclosure, the sole body may be arranged between the bottom wall portion and a bottom portion of the upper body in the internal space.

In the shoe according to one aspect of the present disclosure, the bottom wall portion may include a projection that projects into the internal space and the sole body may include a recess in a lower surface. In that case, the shell and the sole body may be positioned by inserting the projection in the recess.

(Other Aspects)

In the first to eleventh embodiments of the present invention and modifications thereof described above, combination of the engaging portion in the form of the wire or the band and the engagement hole through which it is inserted, combination of the locking element and the engagement hole through which it is inserted, or sewing is illustrated and described as the fixed portion where the shell and the upper body are partially fixed. A fixing method of partially fixing the shell and the upper body, however, is not limited as such.

For example, a locking portion in a form of a hook may be provided in one of the shell and the upper body, and a locked portion which is locked by the locking portion may be provided in the other thereof. A projecting part may be provided in one of the shell and the upper body, and a recessed part that is fitted to the projecting part may be provided in the other thereof. The shell and the upper body may directly be fixed by a member like a clasp.

A specific shape or a specific construction of the sewn portion, the engaging portion, the engagement hole, the locking element, the welded portion, a bonding portion, or the like as the fixed portion illustrated in the first to eleventh embodiments and modifications thereof described above, a size or the number thereof, or a position where it is provided is not particularly restricted and can be modified as appropriate.

The first to eleventh embodiments and their exemplary variations disclose characteristic constructions, which can be combined with one another without departing from the gist of the present invention.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A method of manufacturing a shoe, the method comprising:
    preparing a flexible shell having an internal space;
    preparing an upper body in a form of a bag, the upper body being provided with an opening in a portion corresponding to a topline;
    preparing a sole body;
    accommodating the upper body in the shell;
    partially fixing the shell and the upper body in a portion of the upper body adjacent to the opening and in a portion of the shell adjacent to the topline through which a foot of a wearer is inserted;
    forming the upper body with a last located in the upper body;
    taking the last out of the formed upper body; and
    accommodating the sole body in the shell;
    wherein the partially fixing the shell and the upper body is performed after the forming the upper body;
    wherein in the preparing of the shell, the shell is made to consist of a single bag-shaped member including a bottom wall portion and a peripheral wall portion extending upward from a peripheral edge of the bottom wall portion to the topline, the bottom wall portion of the shell defining an outermost surface of the shoe located on a lower side of the shoe in the vertical direction; and
    wherein an outer surface of the bottom wall portion of the shell is a tread of the shoe.

2. The method of manufacturing a shoe according to claim 1, wherein
    the accommodating the upper body in the shell is performed after the forming the upper body and before the partially fixing the shell and the upper body.

3. The method of manufacturing a shoe according to claim 2, wherein
    the accommodating the sole body in the shell is performed after the partially fixing the shell and the upper body.

4. The method of manufacturing a shoe according to claim 2, wherein the accommodating the sole body in the shell is performed before the accommodating the upper body in the shell.

5. The method of manufacturing a shoe according to claim 1, wherein
the upper body comprises a heat-shrinkable member, and
in the forming the upper body, the upper body is thermally shrunk by being heated such that the upper body has an inner geometry in conformity with the last.

6. The method of manufacturing a shoe according to claim 1, wherein
in the partially fixing the shell and the upper body, the shell and the upper body are fixed by sewing.

7. The method of manufacturing a shoe according to claim 1, wherein
in the preparing the shell, the shell is provided with an engaging portion in a form of a wire or a band,
in the preparing the upper body, a hole is provided in the upper body, and
in the partially fixing the shell and the upper body, the shell and the upper body are fixed by engaging the engaging portion with the hole by inserting the engaging portion through the hole.

8. The method of manufacturing a shoe according to claim 1, wherein
in the preparing the shell, the shell is provided with a hole,
in the preparing the upper body, the upper body is provided with an engaging portion in a form of a wire or a band, and
in the partially fixing the shell and the upper body, the shell and the upper body are fixed by engaging the engaging portion with the hole by inserting the engaging portion through the hole.

9. The method of manufacturing a shoe according to claim 1, further comprising preparing a locking element that locks the shell and the upper body, wherein
in the partially fixing the shell and the upper body, the shell and the upper body are fixed by locking the shell and the upper body with the locking element.

10. The method of manufacturing a shoe according to claim 1, wherein
in the accommodating the sole body in the shell, the sole body is arranged on an inner side of the upper body in the internal space.

11. The method of manufacturing a shoe according to claim 1, wherein
in the accommodating the sole body in the shell, the sole body is arranged between a bottom wall portion of the shell and a bottom portion of the upper body in the internal space.

12. The method of manufacturing a shoe according to claim 11, wherein
in the preparing the shell, the shell is made such that the bottom wall portion includes a projection that projects into the internal space,
in the preparing the sole body, the sole body is made to include a recess in a lower surface, and
in the accommodating the sole body in the shell, the shell and the sole body are positioned by inserting the projection in the recess.

\* \* \* \* \*